US010542192B2

(12) United States Patent
Takahashi et al.

(10) Patent No.: US 10,542,192 B2
(45) Date of Patent: Jan. 21, 2020

(54) IMAGE TRANSFER SYSTEM, IMAGE RECEIVER, IMAGE TRANSMITTER, IMAGE TRANSFER METHOD, IMAGE RECEPTION METHOD, IMAGE TRANSMISSION METHOD, AND PROGRAM

(71) Applicant: OLYMPUS CORPORATION, Hachioji-shi, Tokyo (JP)

(72) Inventors: Tetsuyuki Takahashi, Tokyo (JP); Yasuhiro Hasegawa, Hanno (JP); Kiyoshi Toyoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/129,981

(22) Filed: Sep. 13, 2018

(65) Prior Publication Data

US 2019/0014237 A1 Jan. 10, 2019

Related U.S. Application Data

(63) Continuation of application No. PCT/JP2016/060075, filed on Mar. 29, 2016.

(51) Int. Cl.
*H04N 5/073* (2006.01)
*H04W 56/00* (2009.01)
*H04N 5/12* (2006.01)

(52) U.S. Cl.
CPC ............... *H04N 5/073* (2013.01); *H04N 5/12* (2013.01); *H04W 56/00* (2013.01)

(58) Field of Classification Search
None
See application file for complete search history.

(56) References Cited

U.S. PATENT DOCUMENTS

| 2012/0086814 A1* | 4/2012 | Tsubaki | H04N 5/247 348/192 |
| 2014/0081987 A1* | 3/2014 | Ojanpera | G06F 16/24578 707/748 |

FOREIGN PATENT DOCUMENTS

| EP | 2 687 147 A1 | 1/2014 |
| JP | 2010-136325 A | 6/2010 |

(Continued)

OTHER PUBLICATIONS

International Search Report dated Jun. 14, 2016, issued in counterpart International Application No. PCT/JP2016/060075, w/English translation (2 pages).

*Primary Examiner* — Samira Monshi
(74) *Attorney, Agent, or Firm* — Westerman, Hattori, Daniels & Adrian, LLP

(57) ABSTRACT

A synchronization signal generation function of an image transmitter is configured to generate an imaging synchronization signal. One or more processors of the image transmitter cause an imager of the image transmitter to perform new imaging every time the imaging synchronization signal is generated and cause communication data corresponding to captured image data output from the imager to be transmitted from a communicator of the image transmitter to an image receiver by radio waves. A synchronization signal generation function of the image receiver is configured to generate a display synchronization signal. One or more processors of the image receiver is configured to generate a display image corresponding to the captured image data from the communication data received by radio waves in a communicator of the image receiver and cause a monitor of the image receiver to display a newly generated display image every time the display synchronization signal is generated.

15 Claims, 36 Drawing Sheets

(56) References Cited

FOREIGN PATENT DOCUMENTS

| | | |
|---|---|---|
| JP | 2014-175870 A | 9/2014 |
| WO | 2013/128768 A1 | 9/2013 |

* cited by examiner

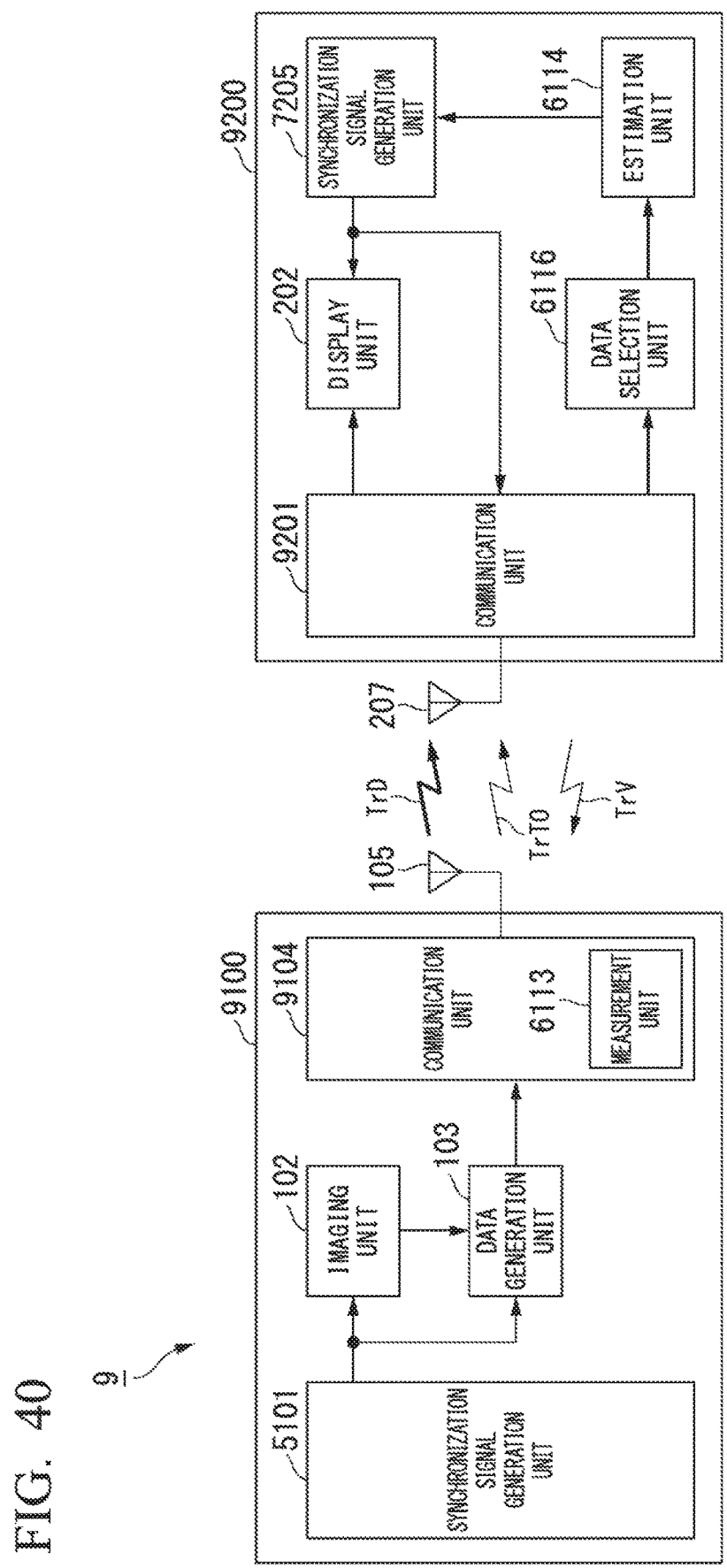

IMAGE TRANSFER SYSTEM, IMAGE RECEIVER, IMAGE TRANSMITTER, IMAGE TRANSFER METHOD, IMAGE RECEPTION METHOD, IMAGE TRANSMISSION METHOD, AND PROGRAM

This application is a continuation application based on PCT Patent Application No. PCT/JP 2016/060075, filed Mar. 29, 2015.

TECHNICAL FIELD

The present invention relates to an image transfer system, an image receiver, an image transmitter, an image transfer method, an image reception method, an image transmission method, and a program.

BACKGROUND ART

Conventionally, for example, an image transfer system for wirelessly transferring captured image data between an image transmitter and an image receiver by using a high-speed wireless communication technique typified by that of a wireless communication standard such as Institute of Electrical and Electronics Engineers (IEEE) 802.11, i.e., so-called WiFi (registered trademark), has been practically used. In the image transfer system, the image transmitter transmits captured image data obtained through photographing performed by an imaging unit provided in the image transmitter to the image receiver and the image receiver causes a display unit provided in the image receiver to display an image according to the transmitted captured image data.

In such an image transfer system, each of the image transmitter and the image receiver generates a synchronization signal such as a vertical synchronization signal based on, for example, a reference clock signal generated by a crystal oscillation IC or the like, and operates in accordance with a timing of the generated synchronization signal. In other words, in the image transmitter, the image is captured by the imaging unit in accordance with the timing of the synchronization signal generated in the image transmitter. Also, in the image receiver, an image according to the transmitted captured image data is displayed on the display unit in accordance with the timing of the synchronization signal generated in the image receiver.

Meanwhile, in wireless communication, for example, a delay in wireless transfer changes due to an influence such as radio signal interference and a change in an environment between the image transmitter and the image receiver which perform wireless communication. In other words, in wireless communication, a transfer time when captured image data is wirelessly transferred changes. Thus, in the image transfer system, the captured image data is not always transferred at the same timing (cycle) even after a wireless connection between the image transmitter and the image receiver is established and a time until the captured image data transmitted by the image transmitter reaches the image receiver changes. A change in the arrival time of the captured image data becomes a cause of disturbing a timing (a cycle) of displaying an image of each frame according to captured image data received by the image receiver, for example, when the image transmitter transmits captured image data of consecutive frames such as moving images. The disturbance of the timing (cycle) of displaying the images of the frames becomes a cause of making moving images displayed by the image receiver unnatural.

Therefore, for example, as disclosed in Japanese Unexamined Patent Application, First Publication No. 2010-136125, the technology of an image transfer device that performs feedback control so that a change in an arrival time of captured image data is minimized has been proposed. In the technology disclosed in Japanese Unexamined Patent Application, First Publication No. 2010-136325, an image transmitter adds a vertical synchronization marker to the captured image data and transmits the captured image data and an image receiver monitors whether or not a position of the vertical synchronization marker added to the received captured image data is in a predetermined range. In the technology disclosed in Japanese Unexamined Patent Application, First Publication No. 2010-136325, when the position of the monitored vertical synchronization marker is not in the predetermined range, the image receiver transmits an amount of synchronization adjustment for adjusting the timing to the image transmitter so that the position of the vertical synchronization marker is in the predetermined range. Thereby, in the image transfer device disclosed in Japanese Unexamined Patent Application, First Publication No. 2010-136325, it is conceivable that the position of the vertical synchronization marker monitored by the image receiver can be feedback-controlled, and the image transmitter can transmit the captured image data at a similar timing. In other words, in the technology disclosed in Japanese Unexamined Patent Application, First Publication No. 2010-136325, it is considered that the image transfer device in winch the image transmitter and the image receiver are synchronized can be implemented.

However, in the technology disclosed in Japanese Unexamined Patent Application, First Publication No. 2010-136325, the change in the arrival time of the captured image data in the wireless communication is determined on the basis of the vertical synchronization marker added to be captured image data and the image transmitter is synchronized with the image receiver. Thus, in the technology disclosed in Japanese Unexamined Patent Application, First Publication No. 2010-136325, for example, even when the arrival time of only specific captured image data suddenly increases, a timing at which the image transmitter transmits captured image data is adjusted. Also, in the technology disclosed in Japanese Unexamined Patent Application, First Publication No. 2010-136325, when a case in which data of only the vertical synchronization marker is wirelessly transferred at a predetermined timing (cycle) is considered, the arrival time of data of only the vertical synchronization marker is not necessarily short, and, in contrast, the arrival time of only the data of only the vertical synchronization marker may be suddenly prolonged. In this case, in the technology disclosed in Japanese Unexamined Patent Application, First Publication No. 2010-136325, the image transmitter may adjust the timing at which the captured image data is transmitted even if the arrival time of the captured image data is not prolonged.

In other words, in theory, in the image transfer system using wireless communication technology, even if it is not necessary to adjust a timing at which the captured image data is transmitted in response to a sudden change in the arrival time, the timing adjustment is performed in accordance with the sudden change in the arrival time in the technology disclosed in Japanese Unexamined Patent Application, First Publication No. 2010-136325. In other words, in the technology disclosed in Japanese Unexamined Patent Application, First Publication No. 2010-136325, the image transfer system may sensitively react to the change in the arrival time and frequently perform unnecessary timing adjustment in theory. Frequent timing adjustment according to sudden change in the arrival time becomes a cause of increasing a processing load in the image transfer system. Also, in the image transfer system in which the image transmitter transmits captured image data of consecutive frames (for example, moving images), frequent timing adjustment according to a sudden change in the arrival time becomes a cause of disturbance of an imaging timing (cycle) in the imaging unit provided in the image transmitter, i.e., disturbance of moving images.

SUMMARY OF INVENTION

Solution to Problem

According to a first aspect of the present invention, there is provided an image transfer system having an image transmitter and an image receiver, wherein the image transmitter includes a communicator, an imager, a synchronization signal generation function, and one or more processors, wherein the image receiver includes a communicator, a monitor, a synchronization signal generation function, and one or more processors, wherein the synchronization signal generation function of the image transmitter is configured to generate an imaging synchronization signal, wherein the one of more processors of the image transmitter cause the imager to perform new imaging every time the imaging synchronization signal is generated and cause communication data corresponding to captured image data output from the imager to be transmitted from the communicator of the image transmitter to the image receiver by radio waves, wherein the synchronization signal generation function of the image receiver is configured to generate a display synchronization signal, wherein the one or more processors of the image receiver is configured to generate a display image corresponding to the captured image data from the communication data received by radio waves in the communicator of the image receiver and cause the monitor to display a newly generated display image every time the display synchronization signal is generated, wherein the processor of one of the image transmitter and the image receiver causes specific communication data predetermined between the image transmitter and the image receiver to be transmitted from one of the communicator to the other by radio waves after the display synchronization signal is generated every time the imaging synchronization signal or the display synchronization signal is generated in the synchronization signal generation function of the one, wherein the processor of one of the image transmitter and the image receiver is configured to calculate a synchronization deviation time from a generation time-point of the imaging synchronization signal or the display synchronization signal to a reception time-point of the specific communication data for the communicator of the image transmitter or the image receiver with respect to each of the imaging synchronization signal or the display synchronization signal generated in the synchronization signal generation function of the image transmitter or the image receiver, wherein the processor of one of the image transmitter and the image receiver is configured to extract two pieces of the specific communication data from the specific communication data other than the specific communication data with a maximum synchronization deviation time, among a plurality of pieces of the specific communication data for which the synchronization deviation time is calculated, wherein the processor of one of the image transmitter and the image receiver is configured to calculate an adjustment value of a cycle of the imaging synchronization signal or the display synchronization signal generated in the synchronization signal generation function of the one or the other on the basis of a generation time interval of the imaging synchronization signal or the display synchronization signal of the two extracted pieces of the specific communication data and a difference between synchronization deviation times corresponding to the two extracted pieces of the specific communication data, and wherein the processor of one of the image transmitter and the image receiver causes a communication packet for adjusting a cycle of the imaging synchronization signal or the display synchronization signal of the one or adjusting a cycle of the imaging synchronization signal or the display synchronization signal of the other on the basis of the adjustment value to be transmitted from the communicator of the one to the other by radio waves.

According to a second aspect of the present invention, in the image transfer system according to the above-described first aspect, the processor which extracting the two pieces of the specific communication data may extract the specific communication data with a minimum synchronization deviation time as one of the two pieces of the specific communication data.

According to a third aspect of the present invention, in the image transfer system according to the above-described second aspect, the processor which extracting the two pieces of the specific communication data may extract the specific communication data having a minimum value obtained by dividing a difference between the synchronization deviation times by a frame interval in a relationship with the one extracted piece of the specific communication data as the other of the two extracted pieces of the specific communication data.

According to a fourth aspect, in the image transfer system according to the above-described first aspect, the specific communication data may be one piece of communication data which satisfies a predetermined criterion in communication data corresponding to the captured image data constituting one frame, the processor of the image transmitter may cause the specific communication data to be transmitted from the communicator of the image transmitter to the image receiver, and the processor of the image receiver may calculate the synchronization deviation time.

According to a fifth aspect of the present invention, in the image transfer system according to the above-described first aspect, the specific communication data may be communication data to be transmitted at a timing when the display synchronization signal has been generated, the processor of the image receiver may cause the specific communication data to be transmitted from the communicator of the image receiver to the image transmitter, and the processor of the image transmitter may calculate the synchronization deviation time.

According to a sixth aspect of the present invention, in the image transfer system according to the above-described first aspect, the processor which calculates the adjustment value may calculate the adjustment value of the cycle on the basis of a value obtained by dividing the difference between the synchronization deviation times of the extracted two pieces of the specific communication data by a frame interval of the captured image data corresponding to the specific communication data.

According to a seventh aspect of the present invention, in the image transfer system according to the above-described sixth aspect, the processor which calculates the adjustment value of the cycle may calculate an adjustment value of a phase on the basis of the synchronization deviation time of each of the two extracted pieces of the specific communication data and frame intervals of the two extracted pieces of the specific communication data.

According to an eighth aspect of the present invention, in the image transfer system according to the above-described seventh aspect, the processor which calculates the adjustment value of the cycle may calculate the adjustment value of the phase on the basis of a result of multiplying by a weight value based on a frame interval of the captured image data corresponding to the specific communication data at a reception time-point of each of the two extracted pieces of the specific communication data and the frame intervals of the two extracted pieces of the specific communication data, and set a value greater than the weight value by which a larger synchronization deviation time of the synchronization deviation times of reception time-points of the two pieces of the specific communication data is multiplied as the weight value by which a smaller synchronization deviation time thereof is multiplied.

According to a ninth aspect of the present invention, there is provided an image receiver for receiving communication data corresponding to captured image data output after imaging is newly performed every time an imaging synchronization signal is generated from an image transmitter by radio waves and displaying a display image corresponding to the captured image data, the image receiver including a communicator, a monitor, a synchronization signal generation function, and one or more processors, wherein the synchronization signal generation function is configured to generate a display synchronization signal, and generate a display image corresponding to the captured image data from the communication data received by radio waves in the communicator, and cause the monitor to display a newly generated display image every time the display synchronization signal is generated, wherein, when one piece of communication data satisfying a predetermined criterion among pieces of communication data corresponding to the captured image data is defined as specific communication data, the one or more processors calculate a synchronization deviation time from a generation time-point of the display synchronization signal to a reception time-point of the specific communication data for the communicator with respect to each of the display synchronization signal generated in the synchronization signal, generation function, extract two pieces of the specific communication data from the specific communication data other than the specific communication data with a maximum synchronization deviation time, among a plurality of pieces of the specific communication data for which the synchronization deviation time is calculated, calculate an adjustment value of a cycle of the imaging synchronization signal or the display synchronization signal on the basis of a generation time interval of the display synchronization signal of the two extracted pieces of the specific communication data and a difference between synchronization deviation times corresponding to the two extracted pieces of the specific communication data, and cause a communication packet for adjusting the cycle of the display synchronization signal or adjusting the cycle of the imaging synchronization signal to be transmitted from the communicator to the image transmitter by radio waves on the basis of the adjustment value.

According to a tenth aspect of the present invention, there is provided an image transmitter for transmitting communication data corresponding to a display image to an image receiver configured to display the display image newly generated every time a display synchronization signal is generated by radio waves, the image transmitter including a communicator, an imager, a synchronization signal generation function, and one or more processors, wherein the synchronization signal generation function is configured to generate an imaging synchronization signal, wherein the one or more processors cause the imager to perform new imaging every time the imaging synchronization signal is generated and cause communication data corresponding to captured image data output from the imager to be transmitted from the communicator to the image receiver by radio waves, and wherein, when communication data to be transmitted is defined as specific communication data at a timing when the display synchronization signal is generated by the image receiver, the one or more processors calculate a synchronization deviation time from a generation time-point of the imaging synchronization signal to a reception time-point of the specific communication data for the communicator with respect to each of the imaging synchronization signal generated in the synchronization signal generation function, extract two pieces of the specific communication data from the specific communication data other than the specific communication data with a maximum synchronization deviation time, among a plurality of pieces of the specific communication data for which the synchronization deviation time is calculated, calculate an adjustment value of a cycle of the imaging synchronization signal or the display synchronization signal on the basis of a generation time interval of the imaging synchronization signal of the two extracted pieces of the specific communication data and a difference between synchronization deviation times corresponding to the two extracted pieces of the specific communication data, and cause a communication packet for adjusting the cycle of the imaging synchronization signal or adjusting the cycle of the display synchronization signal to be transmitted from the communicator to the image receiver by radio waves on the basis of the adjustment value.

According to an eleventh aspect of the present invention, there is provided an image transfer method for use in an image transfer system having an image transmitter and an image receiver, the image transfer method including: generating, by a synchronization signal generation function of the image transmitter, an imaging synchronization signal; causing, by one or more processors of the image transmitter, an imager of the image transmitter to perform new imaging every time the imaging synchronization signal is generated and causing communication data corresponding to captured image data output from the imager to be transmitted from a communicator of the image transmitter to the image receiver by radio waves; generating, by a synchronization signal generation function of the image receiver, a display synchronization signal; generating, by one or more processors of the image receiver, a display image corresponding to the captured image data from the communication data received by radio waves in a communicator of the image receiver and causing a monitor of the image receiver to display a newly generated display image every time the display synchronization signal is generated; causing, by the processor of one of the image transmitter and the image receiver, specific communication data predetermined between the image transmitter and the image receiver to be transmitted from one of the communicator to the other by radio waves after the display synchronization signal is generated every time the imaging synchronization signal or the display synchronization signal is generated in the synchronization signal generation function of the one; calculating, by the processor of one of the image transmitter and the image receiver, a synchronization deviation time from a generation time-point of the imaging synchronization signal or the display synchronization signal to a reception time-point of the specific communication data for the communicator of the image transmitter or the image receiver with respect to each of the imaging synchronization signal or the display synchronization signal generated in the synchronization signal generation function of the image transmitter or the image receiver; extracting, by the processor of one of the image transmitter and the image receiver, two pieces of the specific communication data from the specific communication data other than the specific communication data with a maximum synchronization deviation time, among a plurality of pieces of the specific communication data for which the synchronization deviation time is calculated; calculating, by the processor of one of the image transmitter and the image receiver, an adjustment value of a cycle of the imaging synchronization signal or the display synchronization signal generated in the synchronization signal generation function of the one or the other on the basis of a generation time interval of the imaging synchronization signal or the display synchronization signal of the two extracted pieces of the specific communication data and a difference between synchronization deviation times corresponding to the two extracted pieces of the specific communication data; and causing, by the processor of one of the image transmitter and the image receiver, a communication packet for adjusting a cycle of the imaging synchronization signal or the display synchronization signal of the one or adjusting a cycle of the imaging synchronization signal or the display synchronization signal of the other on the basis of the adjustment value to be transmitted from the communicator of the one to the other by radio waves.

According to a twelfth aspect of the present invention, there is provided an image reception method for use in an image receiver for receiving communication data corresponding to captured image data output after imaging is newly performed every time an imaging synchronization signal is generated from an image transmitter by radio waves and displaying a display image corresponding to the captured image data, the image reception method including: generating, by a synchronization signal generation function, a display synchronization signal; generating, by the synchronization signal generation function, a display image corresponding to the captured image data from the communication data received by radio waves in a communicator, and causing a monitor to display a newly generated display image every time the display synchronization signal is generated; calculating, by the one or more processors, a synchronization deviation time from a generation time-point of the display synchronization signal to a reception time-point of the specific communication data for the communicator with respect to each of the display synchronization signal generated in the synchronization signal generation function, when one piece of communication data satisfying a predetermined criterion among pieces of communication data corresponding to the captured image data is defined as specific communication data; extracting, by the one or more processors, two pieces of the specific communication data from the specific communication data other than the specific communication data with a maximum synchronization deviation time, among a plurality of pieces of the specific communication data for which the synchronization deviation time is calculated calculating, by the one or more processors, an adjustment value of a cycle of the imaging synchronization signal or the display synchronization signal on the basis of a generation time interval of the display synchronization signal of the two extracted pieces of the specific communication data and a difference between synchronization deviation times corresponding to the two extracted pieces of the specific communication data; and causing, by the one or more processors, a communication packet for adjusting the cycle of the display synchronization signal or adjusting the cycle of the imaging synchronization signal to be transmitted from the communicator to the image transmitter by radio waves on the basis of the adjustment value.

According to a thirteenth aspect of the present invention, there is provided a program for causing a computer to execute an image reception method for use in an image receiver for receiving communication data corresponding to captured image data output after imaging is newly performed every time an imaging synchronization signal is generated from an image transmitter by radio waves and displaying a display image corresponding to the captured data, the program including: generating, by a synchronization signal generation function, a display synchronization signal; generating, by the synchronization signal generation function, a display image corresponding to the captured image data from the communication data received by radio waves in a communicator, and causing a monitor to display a newly generated display image every time the display synchronization signal is generated; calculating, by the one or more processors, a synchronization deviation time from a generation time-point of the display synchronization signal to a reception time-point of the specific communication data for the communicator with respect to each of the display synchronization signal generated in the synchronization signal generation function, when one piece of communication data satisfying a predetermined criterion among pieces of communication data corresponding to the captured image data is defined as specific communication data; extracting, by the one or more processors, two pieces of the specific communication data from the specific communication data other than the specific communication data with a maximum synchronization deviation time, among a plurality of pieces of the specific communication data for which the synchronization deviation time is calculated; calculating, by the one or more processors, an adjustment value of a cycle of the imaging synchronization signal or the display synchronization signal on the basis of a generation time interval of the display synchronization signal of the two extracted pieces of the specific communication data and a difference between synchronization deviation times corresponding to the two extracted pieces of the specific communication data; and causing, by the one or more processors, a communication packet for adjusting the cycle of the display synchronization signal or adjusting the cycle of the imaging synchronization signal to be transmitted from the communicator to the image transmitter by radio waves on the basis of the adjustment value.

According to a fourteenth aspect of the present invention, there is provided an image transmission method for use in an image transmitter for transmitting communication data corresponding to a display image to an image receiver configured to display the display image newly generated every time a display synchronization signal is generated by radio waves, the image transmission method including: generating, by a synchronization signal generation function, an imaging synchronization signal; causing, by one or more processors, an imager to perform new imaging every time the imaging synchronization signal is generated and causing communication data corresponding to captured image data output from the imager to be transmitted from a communicator to the image receiver by radio waves; calculating, by the one or more processors, a synchronization deviation time from a generation time-point of the imaging synchronization signal to a reception time-point of the specific communication data for the communicator of the image receiver with respect to each of the imaging synchronization signal generated in the synchronization signal generation function when communication data to be transmitted is defined as specific communication data at a timing when the display synchronization signal is generated by the image receiver; extracting, by the one or more processors, two pieces of the specific communication data from the specific communication data other than the specific communication data with a maximum synchronization deviation time, among a plurality of pieces of the specific communication data for which the synchronization deviation time is calculated; calculating, by the one or more processors, an adjustment value of a cycle of the imaging synchronization signal or the display synchronization signal on the basis of a generation time interval of the imaging synchronization signal of the two extracted pieces of the specific communication data and a difference between synchronization deviation times corresponding to the two extracted pieces of the specific communication data, and causing, by the one or more processors, a communication packet for adjusting a cycle of the imaging synchronization signal or adjusting cycle of the display synchronization signal to be transmitted from the communicator to the image receiver by radio waves on the basis of the adjustment value.

According to a fifteenth aspect of the present invention, there is provided a program for causing a compute to execute an image transmission method for use in an image transmitter for transmitting communication data corresponding to a display image to an image receiver configured to display the display image newly generated every time a display synchronization signal is generated by radio waves, the program including: generating, by a synchronization signal generation function, an imaging synchronization signal; causing, by one or more processors, an imager to perform new imaging every time the imaging synchronization signal is generated and causing communication data corresponding to captured image data output from the imager to be transmitted from a communicator to the image receiver by radio waves calculating, by the one or more processors, a synchronization deviation time from a generation time-point of the imaging synchronization signal to a reception time-point of the specific communication data for the communicator of the image receiver with respect to each of the imaging synchronization signal generated in the synchronization signal generation function, when communication data to be transmitted is defined as specific communication data at a timing when the display synchronization signal is generated by the image receiver; extracting, by the one or more processors, two pieces of the specific communication data from the specific communication data other than the specific communication data with a maximum synchronization deviation time, among a plurality of pieces of the specific communication data for which the synchronization deviation time is calculated; calculating, by the one or more processors, an adjustment value of a cycle of the imaging synchronization signal or the display synchronization signal on the basis of a generation time interval of the imaging synchronization signal of the two extracted pieces of the specific communication data and a difference between synchronization deviation times corresponding to the two extracted pieces of the specific communication data, and causing, by the one or more processors, a communication packet for adjusting a cycle of the imaging synchronization signal or adjusting a cycle of the display synchronization signal to be transmitted from the communicator to the image receiver by radio waves on the basis of the adjustment value.

BRIEF DESCRIPTION OF DRAWINGS

FIG. 40 is a block diagram showing a schematic configuration of an image transfer system according to an eighth embodiment of the present invention.

DESCRIPTION OF EMBODIMENTS

First Embodiment

Figure 1:
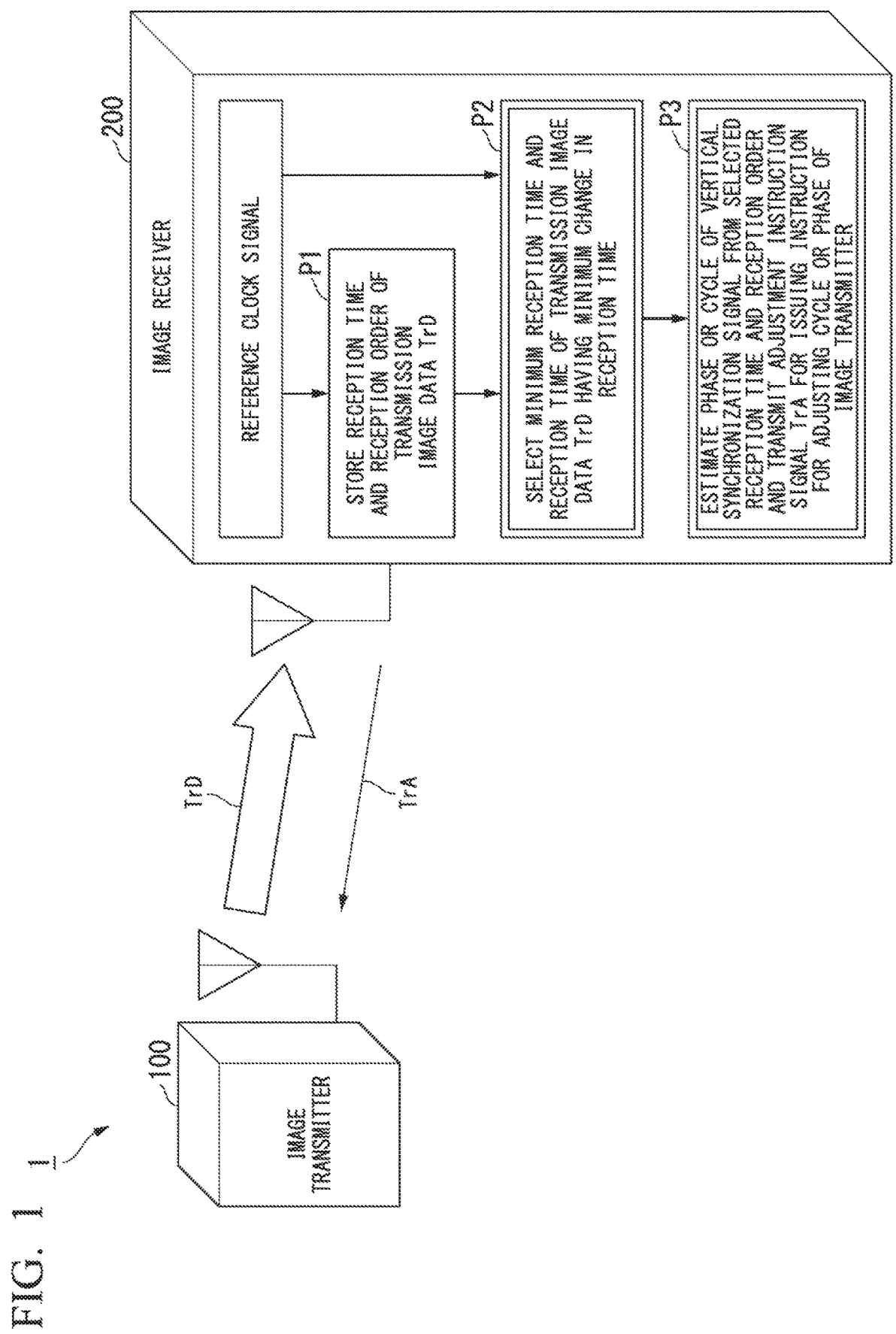
FIG. 1 is a diagram showing a schematic operation of an image transfer system according to a first embodiment of the present invention.

Hereinafter, embodiments of the present invention will be described with reference to the drawings. FIG. 1 is a diagram showing a schematic operation of an image transfer system according to the first embodiment of the present invention. In FIG. 1, an image transmitter 100 and an image receiver 200 constituting an image transfer system 1 according to the first embodiment of the present invention are shown in a bird's-eye view.

The image transfer system 1 is an image display system in which the image transmitter 100 wirelessly transfers (transmits) captured image data of an image captured by an imaging unit to the image receiver 200 by using wireless communication technology and the image receiver 200 causes a display unit to display an image (a display image) according to captured image data wirelessly transferred (transmitted) from the image transmitter 100.

In the image transfer system 1, an operation of establishing a wireless connection is first performed between the image transmitter 100 and the image receiver 200. At this time, the image receiver 200 transmits a response signal according to a connection request from the image transmitter 100 to the image transmitter 100 until the wireless connection with the image transmitter 100 is established.

Thereafter, when the wireless connection with the image transmitter 100 is established, the image receiver 200 waits for the captured image data to be received until the wireless transfer (transmission) of the captured image data by the image transmitter 100 is started. At this time, the image receiver 200 sets a time when the wireless connection with the image transmitter 100 is established as a reference time (for example, time 0) and subsequent elapsed time measurement is started on the basis of a clock signal of a reference (hereinafter referred to as a "reference clock signal"). Also, each of the image transmitter 100 and the image receiver 200 monitors interference from other wireless communication devices or the like with respect to a channel of currently used wireless communication after the wireless connection is established, i.e., the quality of wireless communication, and operates continuously to perform selection or switching of a wireless communication channel so that the wireless transfer is performed using a channel with a high communication quality.

Then, when the captured image data is transmitted from the image transmitter 100, the image receiver 200 receives the transmitted captured image data. Captured image data obtained through imaging performed by the imaging unit provided in the image transmitter 100 and a vertical synchronization signal indicating a start or an end of a valid period of the captured image data are transmitted from the image transmitter 100. Accordingly, the image receiver 200 receives the captured image data and the vertical synchronization signal transmitted from the image transmitter 100. Also, the image transmitter 100 is not limited to a configuration in which captured image data is transmitted in units of frames obtained through imaging performed by the imaging unit. For example, the image transmitter 100 may be configured to divide captured image data of one frame obtained through imaging performed by the imaging unit into a plurality of blocks and sequentially transmit packets corresponding to blocks after the dividing (hereinafter referred to as "image data packets"). In the case of this configuration, instead of the vertical synchronization signal, the image transmitter 100 transmits one synchronization packet indicating a specific point in time during the valid period of the captured image data at any timing at which image data packets are sequentially transmitted (e.g., a timing at which the transmission of the first image data packet starts, a timing at which the transmission of the last image data packet ends, or the like).

Also, in the following description, the image transmitter 100 transmitting captured image data in units of frames captured by the imaging unit will be described. In the following description, the captured image data and the vertical synchronization signal transmitted by the image transmitter 100 are referred to as "transmission image data" if they are represented without distinction. In FIG. 1, a state in which the image transmitter 100 is transmitting transmission image data TrD to the image receiver 200 is shown.

When the transmission image data TrD transmitted from the image transmitter 100 is received, the image receiver 200 estimates a timing at which the image transmitter 100 captures an image with the imaging unit according to the following procedure, and transmits an adjustment instruction signal for adjusting a timing of imaging in the image transmitter 100 to the image transmitter 100 on the basis of an estimation result. In FIG. 1, a state in which the image receiver 200 is transmitting an adjustment instruction signal TrA to the image transmitter 100 is shown.

(Procedure P1): Every time the image receiver 200 receives the transmission image data TrD transmitted from the image transmitter 100, the image receiver 200 sets a time at which the transmission image data TrD has been received as a reception time of captured image data on the basis of a vertical synchronization signal included in the transmission image data TrD. More specifically, the image receiver 200 sets an elapsed time from a time at which a wireless connection with the image transmitter 100 has been established is set as a reference time (e.g., time 0) until the vertical synchronization included in the transmission image data TrD is received as a reception time of the currently received captured image data. At this time, the image receiver 200 associates an order of the captured image data (hereinafter referred to as a "captured image data order") transmitted from the image transmitter 100 in the transmission image data TrD with the reception time thereof. If the captured image data included in the transmission image data TrD is divided into a plurality of image data packets and transmitted from the image transmitter 100, the image receiver 200 uses an elapsed time until the synchronization packet included in the transmission image data TrD transmitted from the image transmitter 100 has been received as the reception time at which the captured image data has been received. At this time, instead of the elapsed time until the synchronization packet has been received, an elapsed time until a predetermined number of image data packets have been received may be used as the reception time at which the captured image data has been received.

(Procedure P2): The image receiver 200 selects a minimum reception time and a reception time of captured image data with a minimum change in the reception time (hereinafter referred to as a "minimum change reception time") on the basis of information of the captured image data order of the captured image data and the reception time associated with the captured image data order. More specifically, if the captured image data of the first frame has been received, the image receiver 200 sets the reception time of the captured image data of the first frame as the minimum reception time. Thereafter, if captured image data of the second frame has been received, the image receiver 200 sets a time difference between the reception time of the captured image data of the second frame and the reception time of the captured image data of the first frame as the minimum change reception time. Thereafter, if captured image data of a third frame has been received, the image receiver 200 compares a time difference between the reception time of the captured image data of the third frame and the reception time of the captured image data of the second frame with the minimum change reception time. If the time difference between the reception time of the captured image data of the third frame and the reception time of the captured image data of the second frame is less than the minimum change reception time, the image receiver 200 updates the minimum change reception time to the time difference between the reception time of the captured image data of the third frame and the reception time of the captured image data of the second frame and selects the minimum change reception time. On the other hand, if the time difference between the reception time of the captured image data of the third frame and the reception time of the captured image data of the second frame is greater than the minimum change reception time, the image receiver 200 does not update the minimum change reception time. In other words, the time difference between the reception time of the captured image data of the second frame and the reception time of the captured image data of the first frame is kept as the minimum change reception time and the minimum change reception time is selected.

(Procedure P3): The image receiver 200 estimates a cycle or a phase in which the image transmitter 100 has captured an image with the imaging unit on the basis of information of the reception time of each of the selected minimum reception time and minimum change reception time and the captured image data order associated with each reception time. On the basis of the estimated cycle or phase, the image receiver 200 transmits the adjustment instruction signal TrA for issuing an instruction for adjusting the cycle or the phase in which the image transmitter 100 captures the image to the image transmitter 100. More specifically, the image receiver 200 represents the reception time of the captured image data of each frame on the basis of information of a captured image data order on a time axis representing an elapsed time by designating the reference time when the wireless connection with the image transmitter 100 is established as the origin and connects the selected minimum reception time and minimum change reception time with a straight line. A slope of this straight line represents the cycle of the vertical synchronization signal included in transmission image data TrD. Also, an intercept between the straight line and the time axis indicates the phase of the vertical synchronization signal included in the transmission image data TrD for transmitting the captured image data of the first frame after the wireless connection with the image transmitter 100 is established. Thereby, the image receiver 200 can estimate an influence due to a cause other than a delay of a wireless transfer such as, for example, an error between a reference clock signal generated by a crystal oscillation IC provided in the image transmitter 100 and a reference clock signal generated by a crystal oscillation IC provided in the image receiver 200, included when an image of a frame other than an image of a frame indicated by the captured image data corresponding to each of the selected minimum reception time and the selected minimum change reception time is captured. In other words, the image receiver 200 represents the reception time of the captured image data on the time axis and estimates the cycle or the phase of the vertical synchronization signal in the image transmitter 100 on the basis of the slope and the intercept of the straight line connecting the selected minimum reception time and minimum change reception time. On the basis of the estimated cycle or phase of the vertical synchronization signal, the image receiver 200 transmits the adjustment instruction signal TrA for adjusting the cycle or the phase of the vertical synchronization signal generated by the image transmitter 100 to the image transmitter 100.

Thereby, the image transmitter 100 can adjust a cycle or a phase of the vertical synchronization signal generated on the basis of the reference clock signal generated by the crystal oscillation IC provided in the image transmitter 100 in accordance with the adjustment instruction signal TrA transmitted from the image receiver 200 and cause the adjusted cycle or phase to match a timing at which the image receiver 200 displays the wirelessly transferred captured image data on the display unit.

Figure 2:
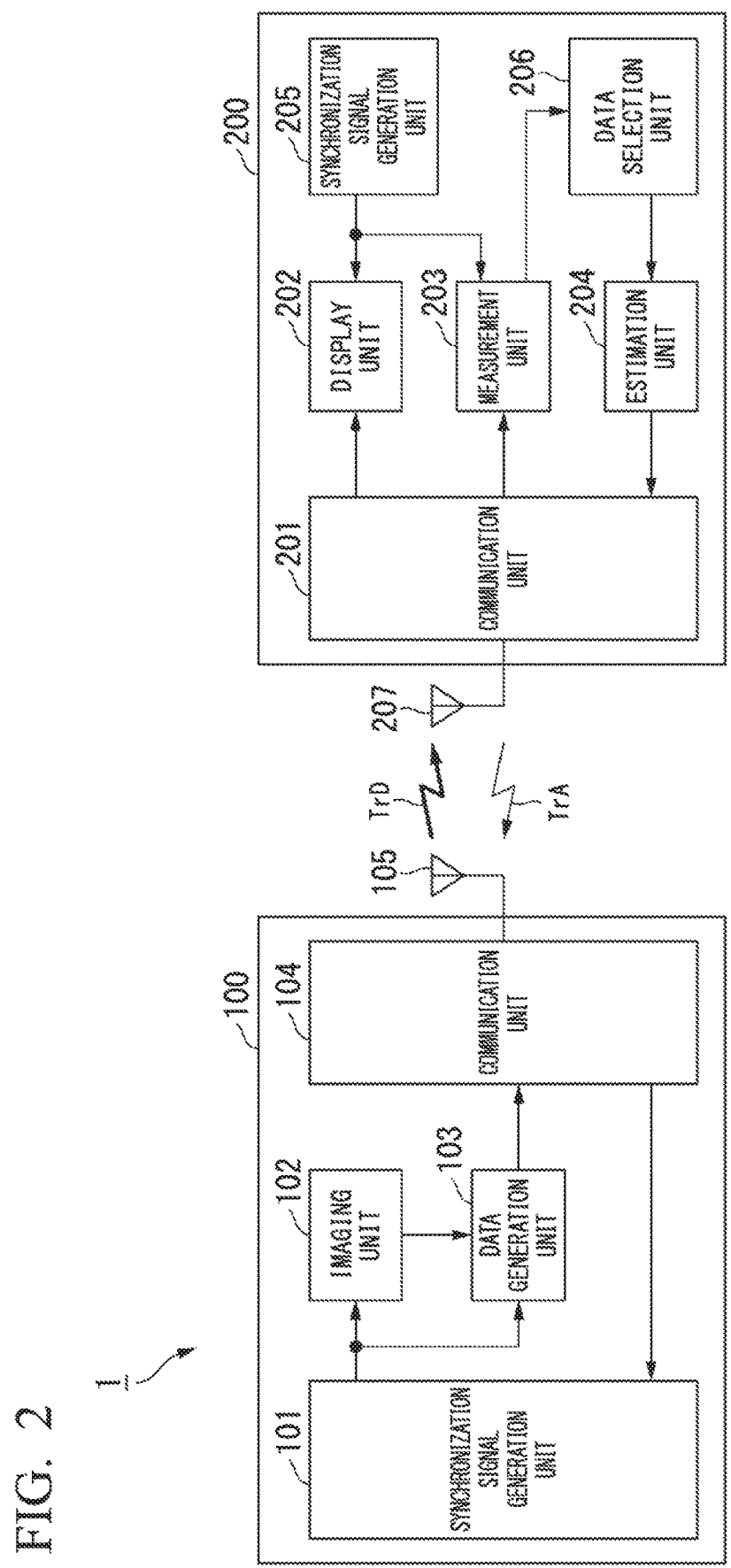
FIG. 2 is a block diagram showing a schematic configuration of the image transfer system according to the first embodiment of the present invention.

Next, the configuration of the image transfer system 1 will be described. FIG. 2 is a block diagram showing a schematic configuration of the image transfer system 1 according to the first embodiment of the present invention. As described above, the image transfer system 1 includes the image transmitter 100 and the image receiver 200. The image transmitter 100 includes a synchronization signal generation unit 101, an imaging unit 102, a data generation unit 103, a communication unit 104, and an antenna 105. Also, the image receiver 200 includes a communication unit 201, a display unit 202, a measurement unit 203, an estimation unit 204, a synchronization signal generation unit 205, a data selection unit 206, and an antenna 207.

First, each component included in the image transmitter 100 will be described.

On the basis of the reference clock signal generated by the crystal oscillation IC (not shown) provided in the image transmitter 100, the synchronization signal generation unit 101 generates a vertical synchronization signal indicating a start or an end of the valid period of the captured image data captured and output by the imaging unit 102. The synchronization signal generation unit 101 outputs the generated vertical synchronization signal to the imaging unit 102 and the data generation unit 103. If an instruction for adjusting the cycle or the phase of the vertical synchronization signal according to the adjustment instruction signal TrA transmitted from the image receiver 200 is input from the communication unit 104, the synchronization signal generation unit 101 corrects the cycle or the phase of the vertical synchronization signal to be generated in accordance with the input adjustment instruction and outputs the corrected vertical synchronization signal to each of the imaging unit 102 and the data generation unit 103. The synchronization signal generation unit 101 may be configured to include the crystal oscillation IC (not shown) configured to generate the reference clock signal.

The imaging unit 102 sequentially performs an imaging process at a timing based on (synchronized with) the vertical synchronization signal output from the synchronization signal generation unit 101. More specifically, for example, a solid-state imaging device (not shown) such as a complementary metal-oxide semiconductor (CMOS) image sensor is connected to the imaging unit 102. On the basis of the vertical synchronization signal output from the synchronization signal generation unit 101, the imaging unit 102 controls the driving of the connected solid-state imaging device (not shown), i.e., controls an operation of capturing an image in the solid-state imaging device (not shown), and sequentially outputs captured image data of images of frames captured by the solid-state imaging device (not shown) to the data generation unit 103. Also, in the following description, for ease of description, the imaging unit 102 performing imaging and sequentially outputting captured image data of images of frames to the data generation unit 103 will be described.

The data generation unit 103 generates captured image data for wireless transfer of one frame in which the vertical synchronization signal output from the synchronization signal generation unit 101 is included in the captured image data output from the imaging unit 102. The data generation unit 103 outputs the generated captured image data for wireless transfer of the one frame to the communication unit 104. Also, if the image transmitter 100 is configured to divide captured image data of one frame into a plurality of image data packets and wirelessly transfer the plurality of image data packets, the data generation unit 103 generates each of image data packets obtained by dividing the captured image data of each frame output from the imaging unit 102 and one synchronization packet indicating a specific point in time during a valid period of the captured image data indicated by the vertical synchronization signal output from the synchronization signal generation unit 101. The data generation unit 103 outputs the generated synchronization packet to the communication unit 104 immediately before the first image data packet is output to the communication unit 104 or immediately after the last image data packet is output to the communication unit 104.

The communication unit 104 transmits the captured image data for wireless transfer output from the data generation unit 103 as transmission image data TrD to be transferred by wireless transfer based on a wireless connection established with the image receiver 200 to the image receiver 200 via the antenna 105 for wireless communication. Also, if the image transmitter 100 is configured to divide the captured image data of one frame into a plurality of image data packets and wirelessly transfer the plurality of image data packets, the communication unit 104 transmits the transmission image data TrD corresponding to a synchronization packet or the image data packets included in the captured image data for wireless transfer output from the data generation unit 103 as one packet to the image receiver 200 via the antenna 105 for wireless communication.

Also, the communication unit 104 receives the adjustment instruction signal TrA transmitted from the image receiver 200 via the antenna 105 during, a period in which the transmission image data TrD is not transmitted to the image receiver 200 and outputs an instruction for adjusting the cycle or phase of the vertical synchronization signal indicated by the received adjustment instruction signal TrA to the synchronization signal generation unit 101.

The antenna 105 is an antenna for wireless communication for performing wireless communication with the image receiver 200. The antenna 105 transmits a radio signal according to the transmission image data TrD output from the communication unit 104 to the image receiver 200. Also, the antenna 105 receives a radio signal corresponding to the adjustment instruction signal TrA transmitted from the image receiver 200 and outputs the received adjustment instruction signal TrA to the communication unit 104.

According to such a configuration, the image transmitter 100 transmits the captured image data of the image captured by the imaging unit 102 to the image receiver 200. Also, some or all of the functions of the synchronization signal generation unit 101 and the data generation unit 103 provided in the image transmitter 100 and the function of controlling the connected solid-state imaging device (not shown) in the imaging unit 102 may be integrated into a processor or may be implemented by a single processor or individual processors corresponding to functions, i.e., a plurality of processors. Also, some or all of the above-described functions in the image transmitter 100 may be implemented by an integrated circuit such as dedicated large scale integration (LSI), i.e., a so-called application specific integrated circuit (ASIC), or the like.

Subsequently, the components provided in the image receiver 200 will be described.

On the basis of a reference clock signal generated by the crystal oscillation IC (not shown) provided in the image receiver 200, the synchronization signal generation unit 205 generates a reference timing signal when an image is displayed (hereinafter referred to as a "display timing signal") such as a clock signal or a display synchronization signal having a frequency resolution which is a refresh rate resolution for enabling the entire frame of the captured image data transmitted from the image transmitter 100 to be processed. The synchronization signal generation unit 205 outputs the generated display timing signal to each of the display unit 202 and the measurement unit 203. If the image transmitter 100 is configured to divide captured image data of one frame into a plurality of image data packets and wirelessly transfer the plurality of image data packets, the synchronization signal generation unit 205 generates a display timing signal such as a clock signal or a display synchronization signal having a frequency resolution which is a refresh rate resolution in which processing is possible for each block of the captured image data included in each image data packet and outputs the display timing signal to each of the display unit 202 and the measurement unit 203. The synchronization signal generation unit 205 may be configured to include the crystal oscillation IC (not shown) that generates the reference clock signal.

The communication unit 201 receives the transmission image data TrD transmitted from the image transmitter 100 via the antenna 207. The communication unit 201 outputs captured image data included in the received transmission image data TrD to the display unit 202. Also, the communication unit 201 outputs the vertical synchronization signal included in the received transmission image data TrD to the measurement unit 203. Also, if the image transmitter 100 is configured to divide the captured image data of one frame into a plurality of image data packets and wirelessly transfer the plurality of image data packets, the communication unit 201 outputs each image data packet included in the received transmission image data TrD to the display unit 202, and outputs the synchronization packet included in the received transmission image data TrD to the measurement unit 201.

Also, during a period in which the transmission image data TrD is not received from the image transmitter 100, the communication unit 201 transmits the adjustment instruction signal TrA for wirelessly transferring an adjustment instruction signal for issuing an instruction for adjusting the cycle or the phase of the vertical synchronization signal output from the estimation unit 204 to the image transmitter 100 via the antenna 207. Also, the communication unit 201 performs an operation of establishing a wireless connection response to a connection request transmitted from the communication unit 104 provided in the image transmitter 100 and outputs a connection establishment signal indicating that the wireless connection has been established to the measurement unit 203 when the wireless connection with the image transmitter 100 has been established.

The antenna 207 is an antenna for wireless communication for performing wireless communication with the image transmitter 100. The antenna 207 receives a radio signal according to the transmission image data TrD transmitted from the image transmitter 100, and outputs the received transmission image data TrD to the communication unit 201. Also, the antenna 207 transmits a radio signal according to the adjustment instruction signal TrA output from the communication unit 201 to the image transmitter 100.

The display unit 202 displays an image according to the captured image data (a display image output from the communication unit 201 on the basis of the display timing signal output from the synchronization signal generation unit 205. More specifically, for example, a display device (not shown) such as a liquid crystal display (LCD) is connected to the display unit 202. The display unit 202 causes the liquid crystal display (not shown) to display a display image according to the captured image data by outputting the data of the display image according to the captured image data output from the communication unit 201 to the liquid crystal display (not shown) at the timing of the display timing signal output from the synchronization signal generation unit 205. In the following description, for ease of description, the display unit 202 displaying the display image according to the captured image data will be described.

When the connection establishment signal is input from the communication unit 201, the measurement unit 203 designates a timing at which the connection establishment signal is input as a reference time, and starts measurement of the elapsed time after the wireless connection with the image transmitter 100 is established on the basis of the display timing signal output from the synchronization signal generation unit 205. Then, after the wireless connection with the image transmitter 100 is established, i.e., after the measurement of the elapsed time is started, the measurement unit 203 measures a time until the vertical synchronization signal is input from the communication unit 201, i.e. a time until the captured image data transmitted from the image transmitter 100 is received. Then, the measurement unit 203 outputs a time until each measured vertical synchronization signals is input as information of a reception time of the captured image data to the data selection unit 206. After the wireless connection with the image transmitter 100 is established, the measurement unit 203 counts the number of vertical synchronization signals output from the communication unit 201, i.e., the number of pieces of captured image data transmitted from the image transmitter 100. Then, the measurement unit 203 outputs the counted number of pieces of captured image data to the data selection unit 206 in association with the reception time information as information of the captured image data order.

Also, when the image transmitter 100 is configured to divide the captured image data of one frame into a plurality of image data packets and wirelessly transfer the plurality of image data packets, the measurement unit 203 measures a time until a synchronization packet is input from the communication unit 201 after the wireless connection with the image transmitter 100 is established and outputs the measured time as information of the reception time of the captured image data to the data selection unit 206. Also, after the wireless connection with the image transmitter 100 is established, the measurement unit 203 counts the number of synchronization packets output from the communication unit 201 and associates the counted number of synchronization packets serving as information of the captured image data order with the information of the reception time and outputs an association result to the data selection select unit 206.

The data selection unit 206 selects a minimum reception time from information of a predetermined number of reception times associated with the information of the captured image data order output from the measurement unit 203. Furthermore, when the selected minimum reception time and the other reception times are connected by a straight line with respect to each of the remaining reception times other than the selected minimum reception time, the data selection unit 206 selects a reception time for which a magnitude of the slope of the straight line is minimized, i.e., a minimum change reception time for which a magnitude of the cycle of the reception time is minimized. Then, the data selection unit 206 outputs information of each of the selected minimum reception time and minimum change reception time, and the captured image data order corresponding to each of the minimum reception time and the minimum change reception time, as a selected set of information (hereinafter referred to as "selection data") to the estimation unit 204. In other words, the data selection unit 206 selects one set of captured image data with a small delay in wireless transfer within captured image data transmitted from the image transmitter 100 and outputs information of each of a reception time and a captured image data order corresponding to the selected set of captured image data as the selection data to the estimation unit 204.

On the basis of information of each of the reception time and the captured image data order corresponding to the set of captured image data (the selection data) output from the data selection unit 206, the estimation unit 204 estimates a cycle or a phase of a vertical synchronization signal indicating a timing at which the image transmitter 100 has captured an image with the imaging unit 102. The estimation unit 204 outputs are adjustment instruction signal for adjusting the cycle or phase of the vertical synchronization signal generated by the synchronization signal generation unit 101 provided in the image transmitter 100 serving as a reference when the image transmitter 100 captures an image with the imaging unit 102 thereafter on the basis of the estimated cycle or phase of the vertical synchronization signal to the communication limit 201. Here, the adjustment instruction signal output by the estimation unit 204 to the communication unit 201 includes a cycle adjustment instruction signal for issuing an instruction for adjusting the cycle of the vertical synchronization signal and a phase adjustment instruction signal for issuing an instruction for adjusting the phase of the vertical synchronization signal. Accordingly, the estimation unit 204 can issue an instruction for adjusting either or both of the cycle and the phase of the vertical synchronization signal.

Thereby, the communication unit 201 wirelessly transfers the adjustment instruction signal TrA to the image transmitter 100 via the antenna 207 and the synchronization signal generation unit 101 adjusts the cycle or the phase of the vertical synchronization signal when the imaging unit 102 captures an image thereafter in accordance with the adjustment instruction signal TrA transmitted from the image receiver 200 in the image transmitter 100. Thereby, the timing of the vertical synchronization signal generated by the synchronization signal generation unit 101 and the timing at which the display image according to the captured image data transmitted from the image transmitter 100 is displayed on the display unit 202 can be matched. Thereby, in the image transfer system 1, a display image according to captured image data obtained through imaging performed by the imaging unit 102 and transmitted by the image transmitter 100 can be stably displayed by the display unit 202 provided in the image receiver 200.

According to such a configuration, the image receiver 200 displays the captured image data of the image captured by the imaging unit 102 provided in the image transmitter 100 on the display unit 202 (more specifically the liquid crystal display (not shown) connected to the display unit 202). Also, some or all of the function of the synchronization signal generation unit 205 provided in the image receiver 200, the functions of the measurement unit 203, the data selection unit 206, and the estimation unit 204, and a function of outputting the data of the display image according to the captured image data output to the connected liquid crystal display (not shown) in the display unit 202 may be integrated into a processor or may be implemented by a single processor or individual processors corresponding to the functions, i.e., a plurality of processors. Also, some or all of the above-described functions in the image receiver 200 may be implemented by an integrated circuit such as dedicated LSI (a so-called ASIC).

Figure 3:
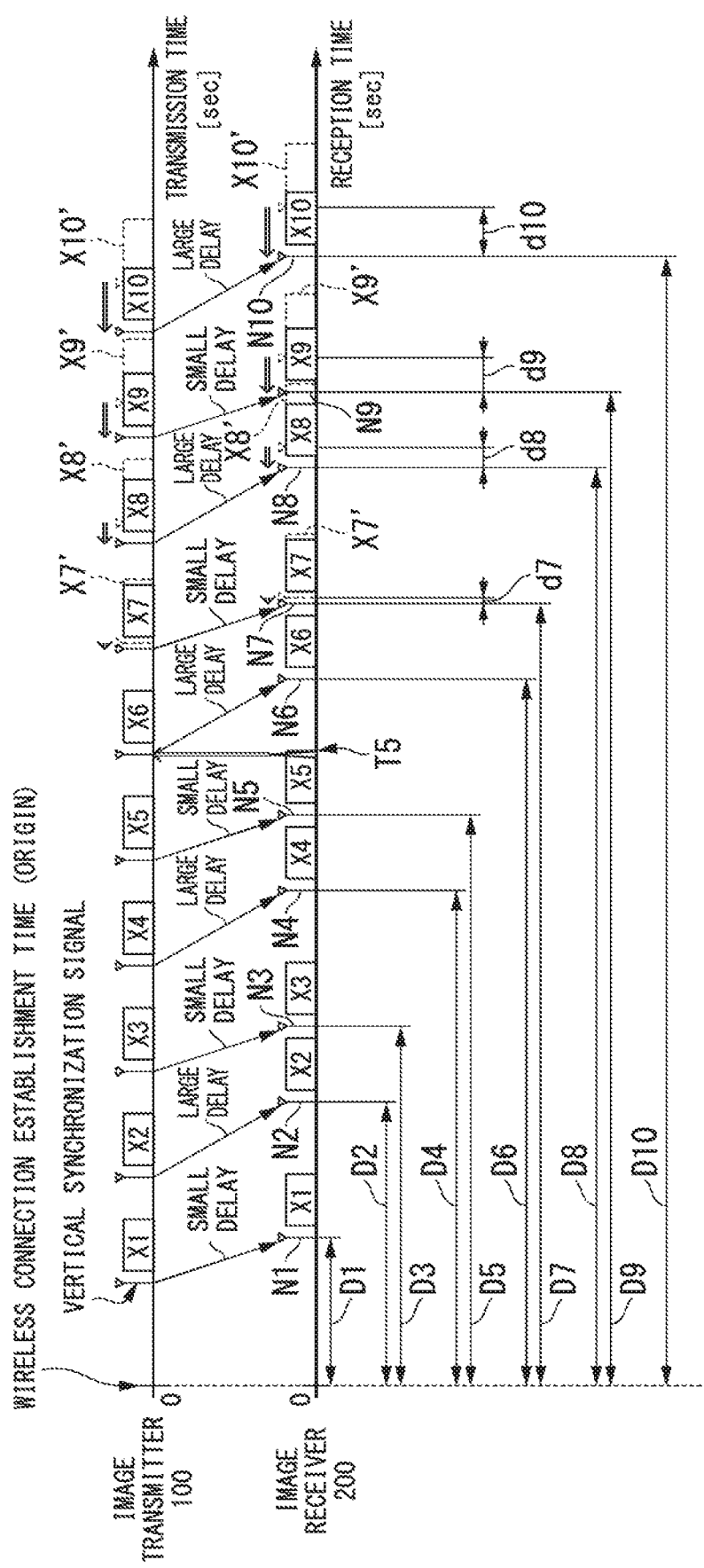
FIG. 3 is a timing chart showing an example of a reception time of captured image data wirelessly transferred in the image transfer system according to the first embodiment of the present invention.
Figure 4:
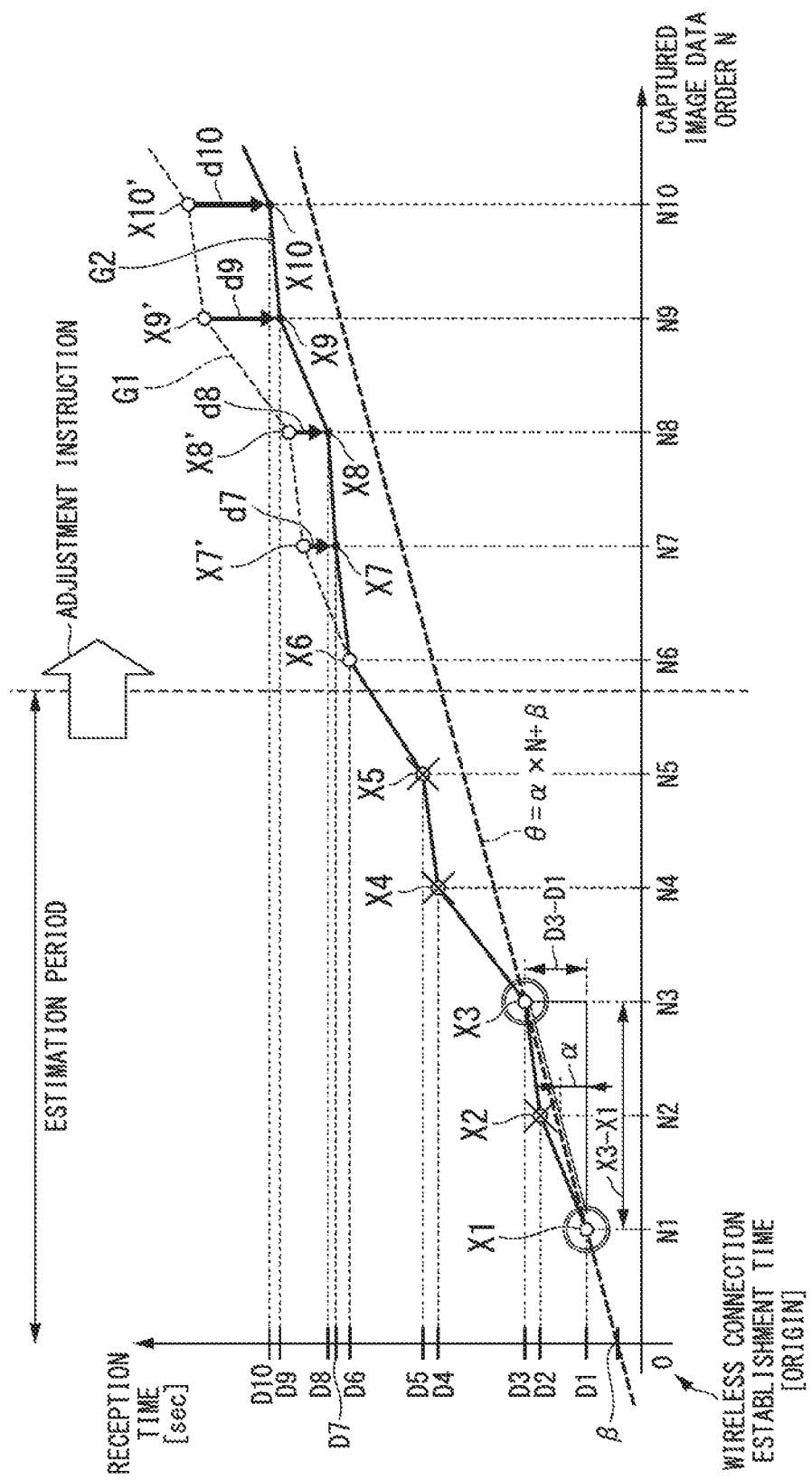
FIG. 4 is a diagram showing an example of a relationship between an order and a reception time of captured image data wirelessly transferred in the image transfer system according to the first embodiment of the present invention.

Here, a method of measuring the reception time and a method of estimating the cycle or the phase of the vertical synchronization signal in the image receiver 200 will be described. FIG. 3 is a timing chart showing an example of a reception time of captured image data wirelessly transferred in the image transfer system 1 according to the first embodiment of the present invention. Also, FIG. 4 is a diagram showing an example of a relationship between an order and a reception time of captured image data wirelessly transferred in the image transfer system 1 according to the first embodiment of the present invention.

In FIG. 3, an example of a state in which the image transmitter 100 transmits 10 pieces of transmission image data TrD including the vertical synchronization signal and the captured image data is shown. As described above, the measurement unit 203 provided in the image receiver 200 sets a timing at which a connection establishment signal has been input, i.e., a timing at which the wireless connection with the image transmitter 100 has been established, as a reference time, and measures a time until the vertical synchronization signal included in the transmission image data TrD is received as a reception time.

In the example shown in FIG. 3, the timing at which the wireless connection with the image transmitter 100 has been established is set as the reference time=0, a time at which the vertical synchronization signal included in the transmission image data TrD has been received is measured and the measured time is set as one of reception times D1 to D10 of captured image data X1 to X10 included in the transmission image data TrD. More specifically, the reception time of the first vertical synchronization signal is set as the reception time D1 of the captured image data X1, the reception time of the second vertical synchronization signal is set as the reception time D2 of the captured image data X2, . . . , the reception time of the tenth vertical synchronization signal is set as the reception time D10 of the captured image data X10.

Also, as described above, the measurement unit 203 counts the number of received vertical synchronization signals as the order of the captured image data X included in the transmission image data TrD from the timing at which the connection establishment signal has been input. In the example shown in FIG. 3, the number of received vertical synchronization signals is sequentially counted and the counted number of vertical synchronization signals is set as captured image data orders N1 to N10 of the captured image data X1 to X10 included in the transmission image data TrD. More specifically, a count value of the first vertical synchronization signal=1 is set as the captured image data order N1 of the captured image data X1, a count value of the second vertical synchronization signal=2 is set as the captured image data order N2 of the captured image data X2, . . . , a count value of the tenth vertical synchronization signal=10 is set as the captured image data order N10 of the captured image data X10.

As described above, the measurement unit 203 associates each reception time D with the captured image data order N and outputs an association result to the data selection unit 206.

Then, as described above, the data selection unit 206 selects the captured image data of the minimum reception time and the captured image data of the minimum change reception time on the basis of information in which the reception time D and the captured image data order N output from the measurement unit 203 are associated. For example, a case in which the data selection unit 206 sets a period during which the transmission image data TrD corresponding to five pieces of the captured image data X1 to X5 is received as an estimation period for a cycle or a phase of the vertical synchronization signal may be considered. In this case, the captured image data of the minimum reception time and captured image data of the minimum change reception time are selected from the reception times D1 to D5 and the captured image data orders N1 to N5 corresponding to the five pieces of captured image data X1 to X5. In the example shown in FIG. 3, the first captured image data X1 is selected as the captured image data of the minimum reception time, and the third captured image data X3 with a small delay is selected as the captured image data of the minimum change reception time.

The data selection unit 206 outputs the reception time D1 and the captured image data order N1 corresponding to the selected first captured image data X1 and the reception time D3 and the captured image data order N3 corresponding to the third captured image data X3 as selection data to the estimation unit 204.

Then, as described above, the estimation unit 204 estimates the cycle or the phase of the vertical synchronization signal when the image transmitter 100 captures the image of each frame by the imaging unit 102 on the basis of the information of the minimum reception time, the captured image data order corresponding to the minimum reception time, the minimum change reception time, and the captured image data order corresponding to the minimum change reception time included in the selection data output from the data selection unit 206. Here, the estimation unit 204 estimates the cycle or the phase of the vertical synchronization signal on the basis of information of the reception time D1 and the captured image data order N1 corresponding to the first captured image data X1 and the reception time D3 and the captured image data order N3 corresponding to the third captured image data X3 output from the data selection unit 206. In other words, the estimation unit 204 estimates the cycle or phase of the vertical synchronization signal generated by the synchronization signal generation unit 101 provided in the image transmitter 100. At this time, the estimation unit 204 indicates the selection data on a graph with the captured image data order represented by the X-axis and the reception time represented by the Y-axis as shown in FIG. 4.

More specifically, the estimation unit 204 indicates positions of (captured image data order, reception time) corresponding to the first captured image data X1=(N1, D1) and (captured image data order, reception time) corresponding to the third captured image data X3=(N3, D3) on the graph as shown in FIG. 4. Also, in FIG. 4, the reception times D1 to D10 of the 10 pieces of captured image data X1 to X10 are shown to facilitate understanding of a relationship between the reception time D and the captured image data order N in the received captured image data X.

Then, the estimation unit 204 performs a process of calculating the cycle or the phase of the reception time in the selection data for obtaining an intercept β formed by a slope α of a straight line θ indicated by the following Equation (1) connecting (N1, D1) and (N3, D3) and the Y-axis. Here, the straight line θ represented by the following Equation (1) represents the reception time in the selection data.

$$\theta = \alpha \times N + \beta \qquad (1)$$

In the above Equation (1), N represents the captured image data order. Also, the slope α of the straight line θ represented by the above Equation (1) represents a change in the reception time D with respect to the number of pieces of captured image data X. The intercept β of the straight line θ related to the Y axis represents a phase of the reception time when the captured image data order=0. Here, as described above, the slope α of the straight line θ represents the estimated cycle of the vertical synchronization signal, and is obtained by dividing a time difference between the reception times D, i.e., a difference between synchronization deviation times, by a difference between captured image data orders N, i.e., a frame interval. In the example shown in FIG. 3, the slope α of the straight line θ is represented by the following Equation (2). In the following Equation (2), the slope α is obtained by dividing a difference between the reception time D3 and the reception time D1 (a time difference between reception times D) by a difference between the captured image data order N3 and the captured image data order N1 (the frame interval). As described above, the intercept β of the straight line θ related to the Y axis represents the estimated phase of the vertical synchronization signal and is obtained by dividing a difference between results of multiplying each reception time D by the captured image data order N corresponding to another reception time D as a weight (a weight of a frame interval) by a difference between the captured image data orders N (the frame interval). In the example shown in FIG. 3, the intercept β of the straight line θ with the Y-axis is represented by the following Equation (3). In the following Equation (3), the intercept β is obtained by dividing a difference between a result of multiplying the small reception time D1 by the captured image data order N3 corresponding to the large reception time D3 as a weight of a frame interval and a result of multiplying the large reception time D3 by the captured image data order N1 corresponding to the small reception time D1 as a weight of a frame interval by a difference between the captured image data order N3 and the captured image data order N1 (the frame interval).

$$\alpha = (D3-D1)/(N3-N1) \quad (2)$$

$$\beta = (N3 \times D1 - N1 \times D3)/(N3-N1) \quad (3)$$

In the following description, the slope α of the straight line θ is also referred to as a "cycle α" and the intercept β of the straight line θ related to the Y-axis is also referred to as a "phase β".

Thereafter, the estimation unit 204 calculates a difference between the calculated cycle α and a predetermined target cycle αt on the basis of the following Equation (4), and sets a value of the calculated difference as a cycle adjustment instruction signal γ for issuing an instruction for adjusting the cycle of the vertical synchronization signal. Also, the estimation unit 204 calculates the difference between the calculated phase β and a predetermined target phase βt (=0) on the basis of the following Equation (5) and sets a value of the calculated difference as a phase adjustment instruction signal δ for issuing an instruction for adjusting the phase of the vertical synchronization signal.

$$\gamma = \alpha - \alpha t \quad (4)$$

$$\delta = \beta - \beta t = \beta \quad (5)$$

Here, for example, when the image transfer system 1 displays a display image according to captured image data with a cycle at 60 frames/second (fps) on the display unit 202 provided in the image receiver 200, the target cycle αt and phase βt are set so that the image transmitter 100 transmits the captured image data X obtained through imaging performed by the imaging unit 102 with a cycle of 16.667 ms to the image receiver 200. Accordingly, in this case, a target is the cycle αt=16.667 ms and the phase βt=0 ms.

The estimation unit 204 outputs the cycle adjustment instruction signal γ calculated by the above Equation (4) and the phase adjustment instruction signal δ calculated by the above Equation (5) to the communication unit 201.

Thereby, the communication unit 201 transmits the adjustment instruction signal TrA including the cycle adjustment instruction signal γ and the phase adjustment instruction signal δ output from the estimation unit 204 to the image transmitter 100 via the antenna 207. The synchronization signal generation unit 101 included in the image transmitter 100 adjusts the cycle and the phase of the vertical synchronization signal generated in accordance with the cycle adjustment instruction signal γ and the phase adjustment instruction signal δ included in the adjustment instruction signal TrA transmitted from the image receiver 200.

Thereby, in the image transfer system 1, the cycle or the phase of the display image of each frame corresponding to the captured image data X displayed on the display unit 202 by the image receiver 200 is synchronized with the cycle or the phase of the captured image data X of the frame obtained through imaging performed by the imaging unit 102 and transmitted by the image transmitter 100 after the adjustment instruction signal TrA is transmitted. Thereby, in the image transfer system 1, a timing at which the image transmitter 100 captures an image with the imaging unit 102 is closer to a target timing for the image receiver 200 to cause the display unit 202 to display a display image according to captured image data and the image receiver 200 can stably display the display image according to the captured image data on the display unit 202.

In FIG. 3 and FIG. 4, an example in which the image receiver 200 transmits the adjustment instruction signal TrA to the image transmitter 100 at time T5 after the fifth captured image data X5 is received and therefore the cycle or the phase of the vertical synchronization signal for obtaining seventh captured image data X7 and subsequent captured image data through imaging performed by the imaging unit 102 in the image transmitter 100 is adjusted is shown. As shown in FIG. 3 and FIG. 4, the synchronization signal generation unit 101 is configured so that the transmission image data TrD corresponding to the captured image data X is transmitted at a timing earlier than that when the cycle and the phase of the vertical synchronization signal are not adjusted if the cycle and the phase of the vertical synchronization signal generated in accordance with the cycle adjustment instruction signal γ and the phase adjustment instruction signal δ included in the adjustment instruction signal TrA are adjusted. In the examples shown in FIG. 3 and FIG. 4, a case in which the reception time D7 at which the captured image data X7 obtained through imaging using the vertical synchronization signal for which the cycle or the phase is adjusted as a reference is received is a time d7 earlier than a reception time at which captured image data X7' obtained through imaging using the vertical synchronization signal for which the cycle or the phase is not adjusted as a reference is received in the image receiver 200 is shown. Likewise, in the examples shown in FIG. 3 and FIG. 4, a case in which the reception times D8 to D10 at which the captured image data X8 to X10 obtained through imaging using the vertical synchronization signal for which the cycle or the phase is adjusted as a reference is received are times d8 to d10 earlier than reception times at which captured image data X8' to X10' obtained through imaging using the vertical synchronization signal for which the cycle or the phase is not adjusted as a reference is received in the image receiver 200 is shown.

Also, in FIG. 4, an example of transition of the reception time D in each case is shown so that a case in which the image receiver 200 does not adjust the cycle or the phase of the vertical synchronization signal and a case in which the image receiver 200 adjusts the cycle or the phase of the vertical synchronization signal are more easily understood. More specifically, an example of transition of the reception time D when the image receiver 200 receives the captured image data X7' to X10' obtained by performing imaging using a vertical synchronization signal for which the cycle or the phase is not adjusted as a reference is shown in a graph G1 in FIG. 4. Also, an example of transition of the reception time D when the image receiver 200 receives the captured image data X7 to X10 obtained by performing imaging using a vertical synchronization signal for which the cycle or the phase is adjusted as a reference is shown in a graph G2 in FIG. 4. As shown in FIG. 4, the reception times D7 to D10 of the captured image data X7 to X10 are brought closer to the straight line θ by adjusting the cycle and phase of a vertical synchronization signal generated by the synchronization signal generation unit 101 included in the image transmitter 100 in accordance with the cycle adjustment instruction signal γ and the phase adjustment instruction signal δ included in the adjustment instruction signal TrA.

Next, the operation of each component constituting the image transfer system 1 will be described. First, the operation of each component included in the image transmitter 100 constituting the image transfer system 1 will be described.

Figure 5:
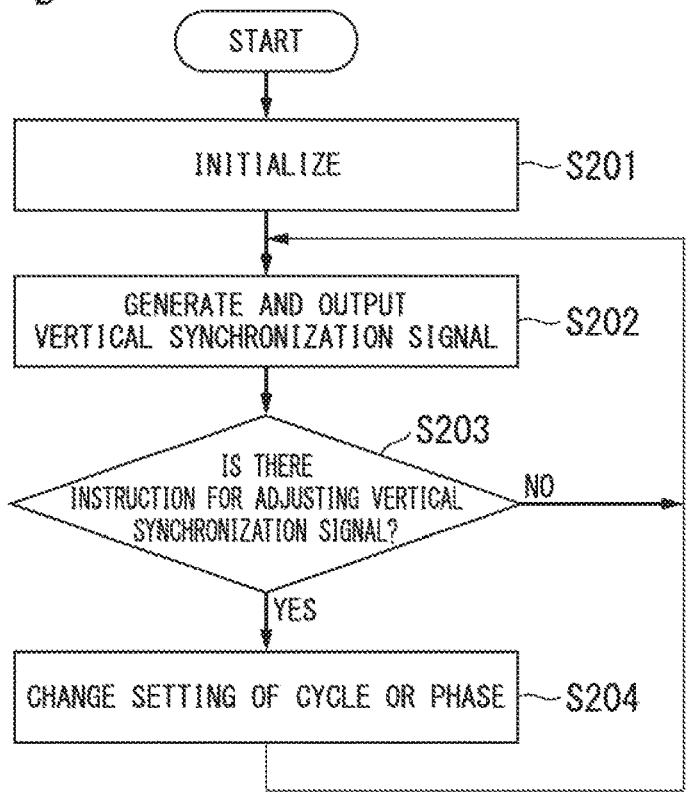
FIG. 5 is a flowchart showing a processing procedure of a synchronization signal generation unit provided in an image transmitter constituting an image transfer system according to the first embodiment of the present invention.

First, the operation of the synchronization signal generation unit 101 provided in the image transmitter 100 will be described. FIG. 5 is a flowchart showing a processing procedure of the synchronization signal generation unit 101 provided in the image transmitter 100 constituting the image transfer system 1 according to the first embodiment of the present invention. The synchronization signal generation unit 101 generates and outputs a vertical synchronization signal in the following processing procedure.

When the image transmitter 100 is activated, the synchronization signal generation unit 101 first initializes the components within the synchronization signal generation unit 101 (step S201).

Subsequently, the synchronization signal generation unit 101 generates a vertical synchronization signal on the basis of a reference clock signal generated by the crystal oscillation IC (not shown) provided in the image transmitter 100. Then, the synchronization signal generation unit 101 outputs the generated vertical synchronization signal to each of the imaging unit 102 and the data generation unit 103 (step S202). At this time, the vertical synchronization signal generated and output by the synchronization signal generation unit 101 is a vertical synchronization signal according to the setting of a predetermined cycle or phase.

Subsequently, the synchronization signal generation unit 101 checks whether or not the adjustment instruction signal TrA has been transmitted from the image receiver 200 (step S203). In other words, the synchronization signal generation unit 101 checks whether or not it is necessary to correct the cycle or the phase of the vertical synchronization signal to be generated.

If a result of the checking in step S203 indicates that the adjustment instruction. TrA has not been transmitted ("NO" M step S203), the synchronization signal generation unit 101 returns to step S202 to generate the next vertical synchronization signal according to the setting of the predetermined cycle or phase and output the generated next vertical synchronization signal to each of the imaging unit 102 and the data generation unit 103.

On the other hand, if a result of the checking in step S203 indicates that the adjustment instruction signal TrA has been transmitted ("YES" in step S203), the synchronization signal generation unit 101 changes the setting of the cycle or the phase of the vertical synchronization signal to be generated to the setting according to the cycle adjustment instruction signal γ and the phase adjustment instruction signal δ included in the adjustment instruction signal TrA (step S204). Then, the synchronization signal generation unit 101 returns to step S202 to iterate the generation of the next vertical synchronization signal according to the changed setting of the cycle or the phase and the output of the generated next vertical synchronization signal to each of the imaging unit 102 and the data generation unit 103.

According to such processing, the synchronization signal generation unit 101 sequentially iterates the generation of the vertical synchronization signals and sequentially outputs the generated vertical synchronization signals to each of the imaging unit 102 and the data generation unit 103.

Figure 6:
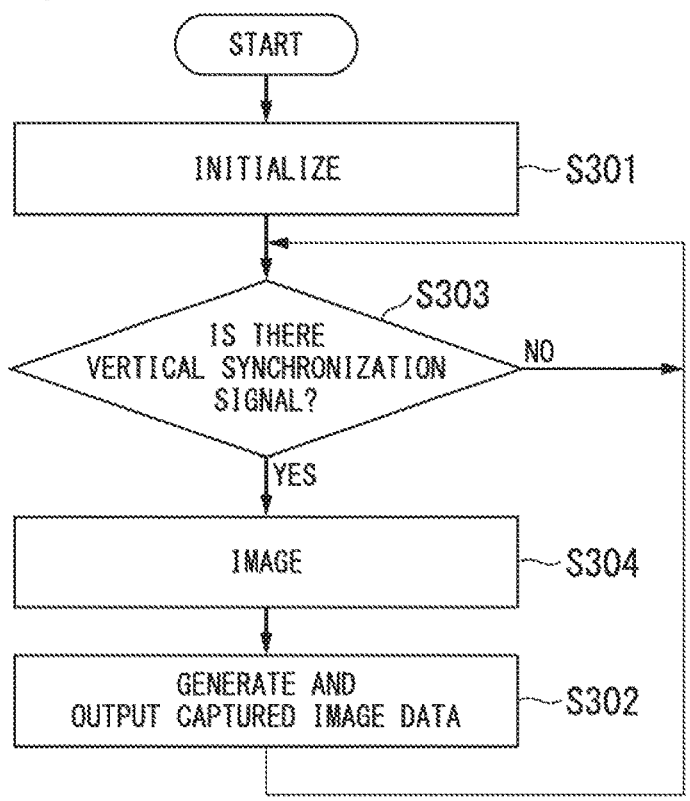
FIG. 6 is a flowchart showing a processing procedure of an imaging unit provided in an image transmitter constituting the image transfer system according to the first embodiment of the present invention.

Next, the operation of the imaging unit 102 provided in the image transmitter 100 will be described. FIG. 6 is a flowchart showing a processing procedure of the imaging unit 102 provided in the image transmitter 100 constituting the image transfer system 1 according to the first embodiment of the present invention. The imaging unit 102 captures an image in the following processing procedure and outputs captured image data.

When the image transmitter 100 is activated, the imaging unit 102 first initializes the components within the imaging unit 102 (step S301).

Subsequently, the imaging unit 102 checks whether or not the vertical synchronization signal has been output from the synchronization signal generation unit 101 (step S303). In other words, the imaging unit 102 checks whether or not it is a timing to capture an image.

If a result of the checking in step S303 indicates that the vertical synchronization signal has not been output from the synchronization signal generation unit 101 ("NO" in step S303), the imaging unit 102 returns to step S303 to wait for the vertical synchronization signal to be output from the synchronization signal generation unit 101.

On the other hand, if a result of the checking in step S303 indicates that the vertical synchronization signal has been output from the synchronization signal generation unit 101 ("YES" in step S303), the imaging unit 102 captures an image (step S304). More specifically, the imaging unit 102 drives a solid-state imaging device (not shown) at a timing using the vertical synchronization signal as a reference, and executes an image capturing operation of the solid-state imaging device (not shown).

Subsequently, the imaging unit 102 generates captured image data according to the captured image. Then, the imaging unit 102 outputs the generated captured image data to the data generation unit 103 (step S302). Thereafter, the imaging unit 102 returns to step S303 to iterate the capturing of an image at the timing using the vertical synchronization signal as a reference, the generation of captured image data according to the captured image, and the output of the generated captured image data to the data generation unit 103.

According to such processing, the imaging unit 102 sequentially iterates the capturing of the image at the timing using the vertical synchronization signal as the reference and sequentially outputs the generated captured image data to the data generation unit 103.

Figure 7:
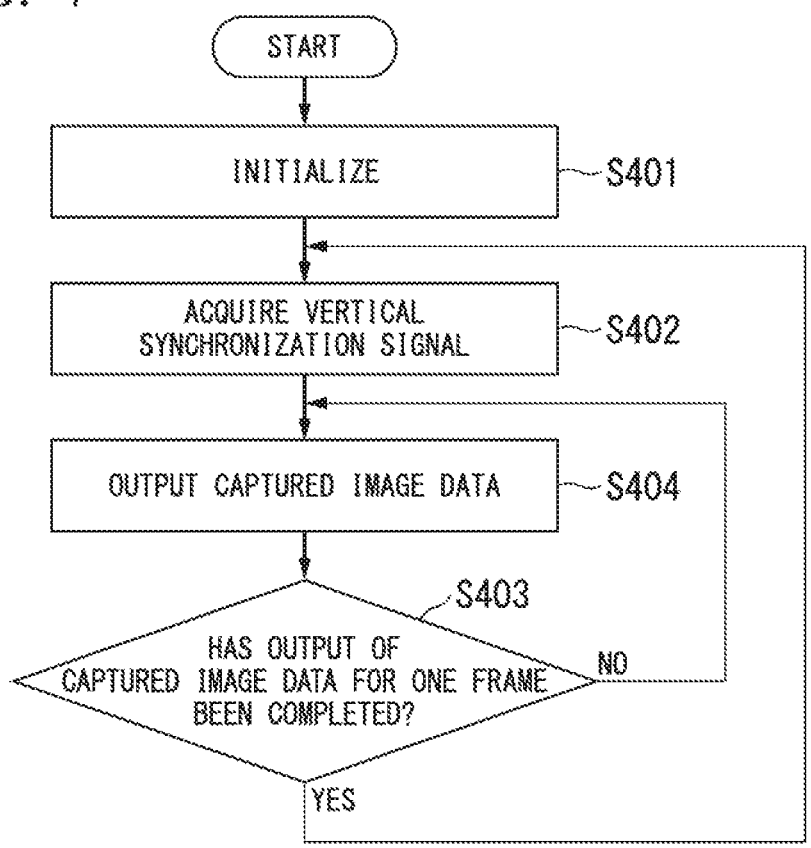
FIG. 7 is a flowchart showing a processing procedure of a data generation unit provided in the image transmitter constituting the image transfer system according to the first embodiment of the present invention.

Next, the operation of the data generation unit 103 provided in the image transmitter 100 will be described. FIG. 7 is a flowchart showing the processing procedure of the data generation unit 103 provided in the image transmitter 100 constituting the image transfer system 1 according to the first embodiment of the present invention. The data generation unit 103 generates and outputs captured image data for wireless transfer in the following processing procedure.

When the image transmitter 100 is activated, the data generation unit 103 first initializes the components within the data generation unit 103 (step S401).

Subsequently, the data generation unit 103 acquires the vertical synchronization signal output from the synchronization signal generation unit 101 (step S402).

Subsequently, the data generation unit 103 acquires the captured image data output from the imaging unit 102 and generates captured image data for wireless transfer of one frame including the vertical synchronization signal acquired in step S402. Then, the data generation unit 103 outputs the generated captured image data for wireless transfer of the one frame to the communication unit 104 (step S404). If the image transmitter 100 is configured to divide the captured image data of one frame into a plurality of image data packets and wirelessly transfer the plurality of image data packets, the data generation unit 103 generates each of image data packets obtained by dividing the captured image data of one frame output from the imaging unit 102 and one synchronization packet indicating a timing of the vertical synchronization signal output from the synchronization signal generation 101. Then, the data generation unit 103 sequentially outputs captured image data for wireless transfer of one frame in which the synchronization packet is added to the generated image data packets to the communication unit 104.

Subsequently, the data generation unit 103 checks whether or not the output of all the generated captured image data for wireless transfer of the one frame has been completed (step S403). In other words, it is checked whether or not the output of all captured image data for the one frame obtained through imaging performed by the imaging unit 102 has been completed using the vertical synchronization signal generated by the synchronization signal generation unit 101 as the reference.

If a result of the checking in step S403 indicates that the output of all the generated captured image data for wireless transfer of the one frame has not been completed ("NO" in step S403), the data generation unit 103 returns to step S404 to continue to output the generated captured image data for wireless transfer of the one frame to the communication unit 104.

On the other hand, if a result of the checking in step S403 indicates that all the output of the generated captured image data for wireless transfer of the one frame has been completed ("YES" in step S403), the data generation unit 103 returns to step S402 to acquire the vertical synchronization signal corresponding to the next frame from the synchronization signal generation unit 101. In other words, the data generation unit 103 performs a process of generating and outputting captured image data for wireless transfer of the next frame in steps S402 and S404.

According to such processing, the data generation unit 103 iterates the generation of the captured image data for wireless transfer of each frame in which the vertical synchronization signal output from the synchronization signal generation unit 101 is included in the captured image data output from the imaging unit 102 and the output of the generated captured image data to the communication unit 104.

Figure 8:
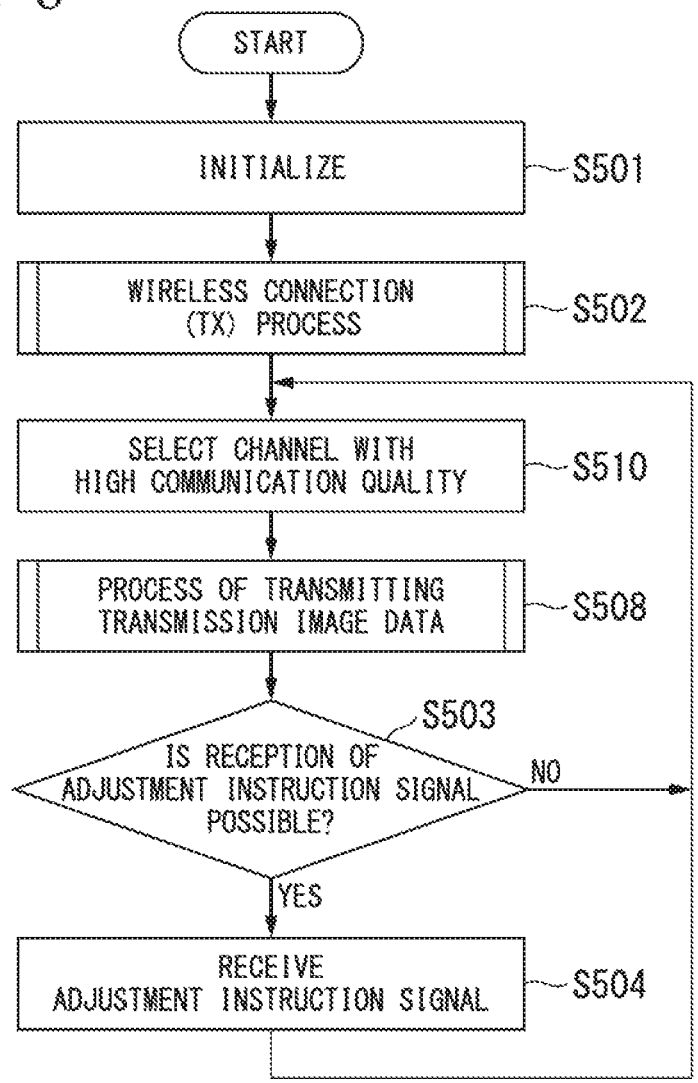
FIG. 8 is a flowchart showing a processing procedure of a communication unit provided in the image transmitter constituting the image transfer system according to the first embodiment of the present invention.

Next, the operation of the communication unit 104 provided in the image transmitter 100 will be described. FIG. 8 is a flowchart showing a processing procedure of the communication unit 104 provided in the image transmitter 100 constituting the image transfer system 1 according to the first embodiment of the present invention. The communication unit 104 performs the transmission of the captured image data for wireless transfer, i.e., the transmission image data TrD, to the image receiver 200, and the transmission of the adjustment instruction signal TrA transmitted from the image receiver 200 in the following processing procedure.

When the image transmitter 100 is activated, the communication unit 104 first initializes the components within the communication unit 104 (step S501).

Subsequently, the communication unit 104 performs a wireless connection (TX) process on a wireless communication channel with the image receiver 200 (more specifically, the communication unit 201 provided in the image receiver 200) via the antenna 105 (step S502). Also, a detailed description of the processing procedure of the wireless connection (TX) process performed by the communication unit 104 in step S502 will be described below.

Subsequently, after the wireless connection with the communication unit 201 is established, the communication unit 104 selects a (relatively good) channel with high communication quality from among currently available, i.e., free, channels (step S510).

Subsequently, the communication unit 104 performs a transmission image data TrD transmission process of wirelessly transferring captured image data for wireless transfer output from the data generation unit 103 to the communication unit 201 via the antenna 105 by using a selected wireless communication channel (step S508). In other words, the communication unit 104 wirelessly transfers the captured image data output through imaging performed by the imaging unit 102 and the vertical synchronization signal generated by the synchronization signal generation unit 101 to the communication unit 201 by using a wireless communication channel with high communication quality. Also, a detailed description of the processing procedure of the process of transmit the transmission image data TrD performed by the communication unit 104 in step S508 will be described below.

Subsequently, the communication unit 104 determines whether or not it is possible to receive the adjustment instruction signal TrA transmitted from the image receiver 200 (more specifically, the communication unit 201 provided in the image receiver 200) (step S503). In other words, the communication unit 104 checks whether or not the present time is a period during which the transmission image data TrD is not being transmitted to the image receiver 200.

If a result of the determination in step S503 indicates that the adjustment instruction signal TrA transmitted from the communication unit 201 cannot be received ("NO" in step S503), the communication unit 104 returns to step S510 to select a channel with higher communication quality. In other words, the communication unit 104 performs a transmission image data TrD transmission process corresponding to the captured image data of the next frame in the wireless communication channel with higher communication quality in steps S510 and S508.

On the other hand, if a result of the determination in step S503 indicates that the adjustment instruction signal TrA transmitted from the communication unit 201 can be received ("YES" in step S503), the communication unit 104 receives the adjustment instruction signal TrA transmitted from the communication unit 201 (step S504). Then, the communication unit 104 outputs an instruction for adjusting the cycle or the phase of the vertical synchronization signal included in the received adjustment instruction signal TrA. i.e., the cycle adjustment instruction signal γ or the phase adjustment instruction signal δ, to the synchronization signal generation unit 101. Thereafter, the communication unit 104 returns to step S510.

Thereby, in step S204 in the processing procedure of the synchronization signal generation unit 101 shown in FIG. 5, the synchronization signal generation unit 101 changes the setting of the cycle or the phase of the vertical synchronization signal to be generated to the setting according to each of the cycle adjustment instruction signal γ and the phase adjustment instruction signal δ, and sets the cycle or the phase of the vertical synchronization signal to be generated to the cycle or the phase according to the cycle adjustment instruction signal γ or the phase adjustment instruction signal δ.

According to such processing, the communication unit 104 iterates a process of wirelessly transferring the captured image data for wireless transfer output from the data generation unit 103 as the transmission image data TrD, and a process for receiving the adjustment instruction signal TrA transmitted from the image receiver 200 and outputting the received adjustment instruction signal TrA to the synchronization signal generation unit 101.

Also, in the process of transmitting the captured image data (transmission image data TrD) for wireless transfer shown in FIG. 8 to the image receiver 200, a processing procedure in which the communication unit 104 determines whether or not it is possible to receive the adjustment instruction signal TrA in step S503 and performs a process of receiving the transmitted adjustment instruction signal TrA in step S504 if it is possible to receive the adjustment instruction signal TrA ("YES" in step S503) is shown. In other words, the processing procedure in which the communication unit 104 receives the adjustment instruction signal TrA transmitted from the image receiver 200 during a period in which the transmission image data TrD is not being transmitted to the image receiver 200 is shown. However, for example, there may be a case in which the transmission of the transmission image data TrD and the reception of the adjustment instruction signal TrA can be performed in the same period such as a case in which the image transmitter 100 and the image receiver 200 are wirelessly connected by a plurality of channels. In other words, the channel for transmitting the transmission image data TrD from the image transmitter 100 to the image receiver 200 and the channel for transmitting the adjustment instruction signal TrA from the image receiver 200 to the image transmitter 100 may be different wireless communication channels. In this case, in the process of transmitting the captured image data (transmission image data TrD) for wireless transfer to the image receiver 200, the communication unit 104 may perform the transmission of the transmission image data TrD and the reception of the adjustment instruction signal TrA in the same period.

Figure 9:
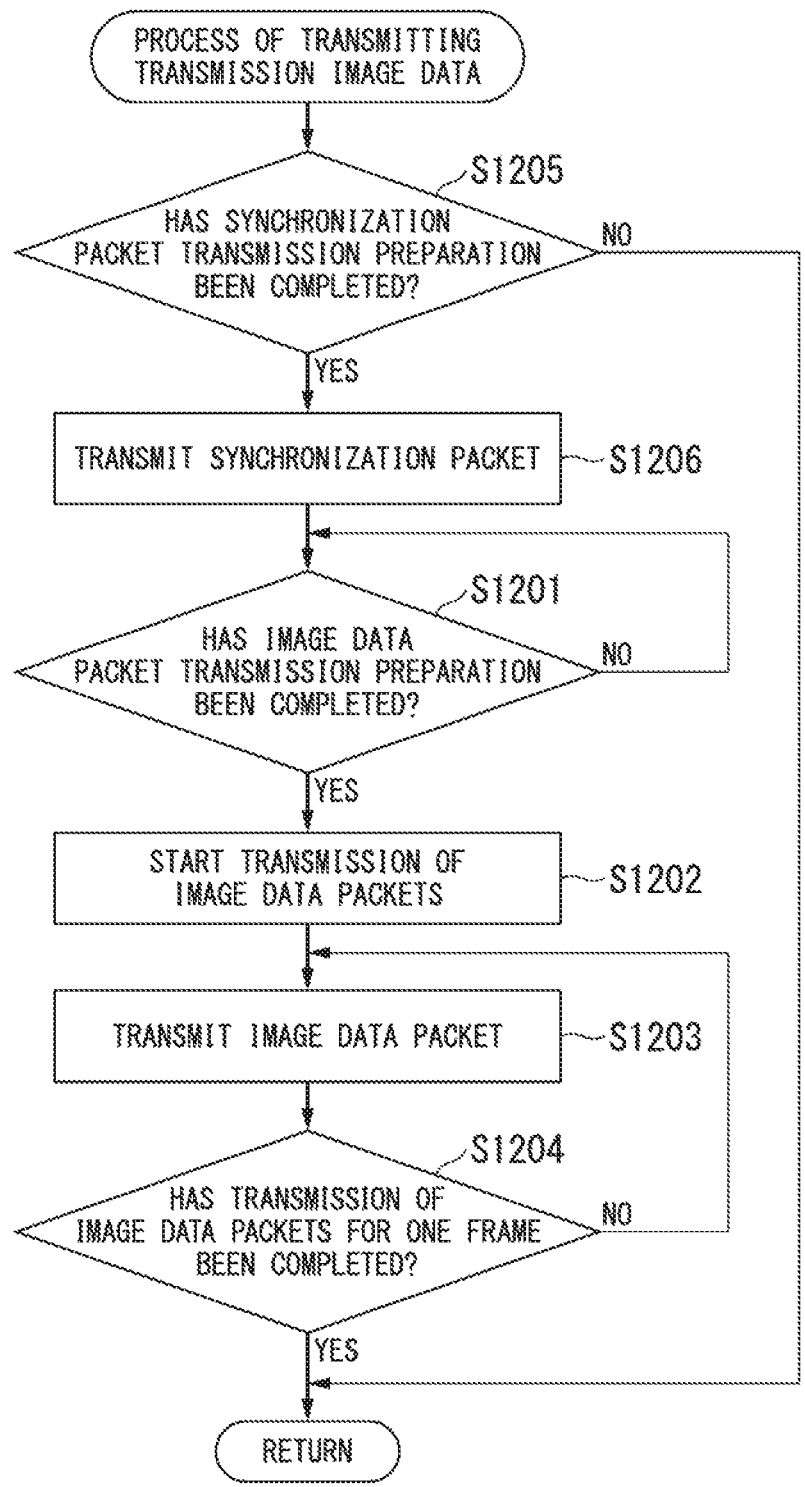
FIG. 9 is a flowchart showing a processing procedure of a transmission process in which the communication unit provided in the image transmitter constituting the image transfer system according to the first embodiment of the present invention transmits transmission image data.

Subsequently, the processing procedure of the transmission image data TrD transmission process to be performed by the communication unit 104 in step S508 will described. FIG. 9 is a flowchart showing the processing procedure of transmission processing in which the communication unit 104 provided in the image transmitter 100 constituting the image transfer system 1 according to the first embodiment of the present invention transmits the transmission image data TrD. The communication unit 104 transmits the transmission image data TrD to the image receiver 200 in the following processing procedure.

Also, for a detailed description of the processing procedure of the transmission image data TrD transmission process in the communication unit 104 in the following description, the image transmitter 100 configured to divide the captured image data of one frame into a plurality of image data packets and wirelessly transfer the plurality of image data packets will be described. Thus, the captured image data for wireless transfer output from the data generation unit 103 including image data packets obtained by dividing the captured image data of one frame output from the imaging unit 102 and one synchronization packet indicating the timing of the vertical synchronization signal output from the synchronization signal generation unit 101 will be described. In the transmission image data TrD transmission process in the communication unit 104, a case in which a synchronization packet is transmitted before the transmission of the first image data packet output from the data generation unit 103 will be described.

When the transmission image data TrD transmission process is started in step S508, the communication unit 104 first checks whether or not a preparation fix transmitting the synchronization packet included in the captured image data for wireless transfer output from the data generation unit 103 to the image receiver 200 (more specifically, the communication unit 201 provided in the image receiver 200) has been completed (step S1205).

If a result of the checking in step S1205 indicates that the preparation for transmitting the synchronization packet included in the captured image data for wireless transfer output from the data generation unit 103 to the communication unit 201 has not been completed ("NO" in step S1205), the communication unit 104 terminates the transmission image data TrD transmission process and returns to the subsequent step S503 in the process of transmitting the captured image data for wireless transfer (the transmission image data TrD) shown in FIG. 8 to the image receiver 200.

On the other hand, if a result of the checking in step S1205 indicates that the preparation for transmitting the synchronization packet included in the captured image data for wireless transfer output from the data generation unit 103 to the communication unit 201 has been completed ("YES" in step S1205), the communication unit 104 transmits the transmission image data TrD corresponding to the synchronization packet included in the captured image data for wireless transfer output from the data generation unit 103 as one packet to the communication unit 201 (step S1206).

Subsequently, the communication unit 104 checks whether or not a preparation for transmitting the image data packets included in the captured image data for wireless transfer output from the data generation 103 to the communication unit 201 has been completed (step S1201).

If a result of the checking in step S1201 indicates that the preparation for transmitting the image data packets included in the captured image data for wireless transfer output from the data generation unit 103 to the communication unit 201 has not been completed ("NO" in step S1201), the communication unit 104 returns to step S1201 to wait for the preparation for transmitting the image data packets to be completed.

On the other hand, if a result of the checking in step S1201 indicates that the preparation for transmitting the image data packets included in the captured image data for wireless transfer output from the data generation unit 103 to the communication unit 201 has been completed ("YES" in step S1201), the communication unit 104 starts the transmission of the transmission image data TrD corresponding to the image data packets included in the captured image data for wireless transfer output from the data generation unit 103 (step S1202).

Subsequently, the communication unit 104 transmits the transmission image data TrD corresponding to the image data packets included in the captured image data for wireless transfer output from the data generation unit 103 as one packet to the communication unit 201 (step S1203). Here, the communication unit 104 sequentially transmits the packets of the transmission image data TrD to the communication unit 201 from the first image data packet included in the captured image data for wireless transfer output from the data generation unit 103.

Subsequently, the communication unit 104 checks whether or not the transmission of the transmission image data TrD corresponding to all the image data packets included in the captured image data for wireless transfer output from the data generation unit 103 has been completed (step S1204). In other words, it is checked whether or not the transmission of all captured image data for one frame obtained through imaging performed by the imaging unit 102 to the communication unit 201 has been completed using the vertical synchronization signal generated by the synchronization signal generation unit 101 as a reference.

If a result of the checking in step S1204 indicates that the transmission of the transmission image data TrD corresponding to all the image data packets included in the captured image data for wireless transfer output from the data generation unit 103 has not been completed ("NO" in step S1204), the communication unit 104 returns to step S1203 to transmit the packet of the transmission image data TrD corresponding to the next image data packet to the communication unit 201.

On the other hand, if a result of the checking in step S1204 indicates that the transmission of the transmission image data TrD corresponding to all image data packets included in the captured image data for wireless transfer output from the data generation unit 103 has been completed ("YES" in step S1204), the communication unit 104 terminates the transmission image data TrD transmission process and returns to the subsequent step S503 in the process of transmitting the captured image data for wireless transfer (the transmission image data TrD) shown in FIG. 8 to the image receiver 200.

According to such processing, the communication unit 104 performs a transmission process of wirelessly transferring the captured image data for wireless transfer output from the data generation unit 103 as the transmission image data TrD.

In the transmission image data TrD transmission process shown in FIG. 9, a case in which the image transmitter 100 divides the captured image data of one frame into a plurality of image data packets and wirelessly transfers the plurality of image data packets has been described. On the other hand, when the image transmitter 100 is configured to wirelessly transfer captured image data in units of images of one frame obtained through imaging performed by the imaging unit 102 provided in the image transmitter 100, the transmission image data TrD corresponding to the captured image data is transmitted to the communication unit 201 after the preparation for transmitting the captured image data for wireless transfer of one frame including the vertical synchronization signal output from the data generation unit 103 to the image receiver 200 is completed. In this case, for example, the transmission image data TrD transmission process in the communication unit 104 can be easily understood in consideration of the image data packets as the captured image data of one frame in a process of step S1201 and subsequent steps without performing steps S1205 and S1206 in the transmission image data TrD transmission process shown in FIG. 9. More specifically, the transmission image data TrD transmission process in the communication unit 104 can be easily understood in consideration of the checking of whether or not the preparation for transmitting captured image data for wireless transfer of one frame including the vertical synchronization signal output from the data generation unit 103 to the communication unit 201 has been completed in step S1201 and the transmission of the transmission image data TrD corresponding to the captured image data of one frame to the communication unit 201 in a subsequent process in the communication unit 104. Accordingly, a detailed description of a case in which the image transmitter 100 wirelessly transfers captured image data in units of images of one frame will be omitted.

Figure 10:
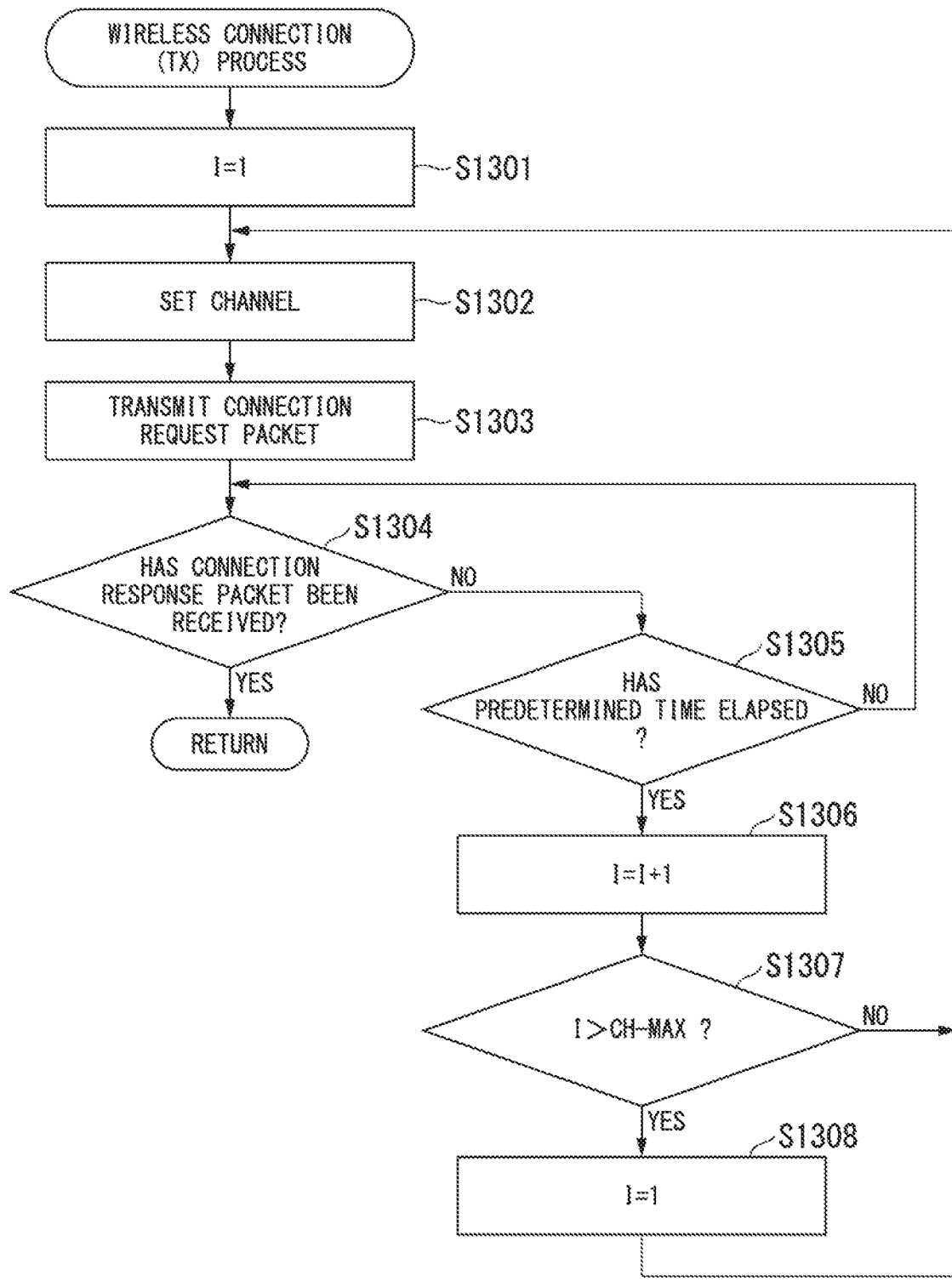
FIG. 10 is a flowchart showing a processing procedure of a wireless connection process in which the communication unit provided in the image transmitter constituting the image transfer system according to the first embodiment of the present invention establishes a wireless connection with the image receiver constituting the image transfer system.

Next, the processing procedure of the wireless connection (TX) process performed by the communication unit 104 in step S502 will be described. FIG. 10 is a flowchart showing a processing procedure of a wireless connection process in which the communication unit 104 provided in the image transmitter 100 constituting the image transfer system 1 according to the first embodiment of the present invention establishes a wireless connection with the image receiver 200 constituting the image transfer system 1. The communication unit 104 establishes a wireless connection with the image receiver 200 in the following processing procedure.

When the wireless connection (TX) process in step S502 is started, the communication unit 104 first initializes a channel number of a wireless communication channel available in the wireless transfer between the image transmitter 100 and the image receiver 200 (step S1301). Here, the communication unit 104 initializes a channel number to a smallest channel number (here, the channel number I=1) among wireless communication channels available in the wireless transfer between the image transmitter 100 and the image receiver 200.

Subsequently, the communication unit 104 sets the channel number I of the channel of the wireless communication for which the wireless connection is attempted (step S1301). Here, the communication unit 104 sets the channel number I of the channel of the wireless communication for which the wireless connection is attempted to the initialized current channel number I=1.

Subsequently, the communication unit 104 transmits a connection request packet firm requesting a wireless connection to the image receiver 200 by using the wireless communication channel of the set channel number I (step S1303).

Subsequently, the communication unit 104 checks whether or not a connection response packet indicating the reception of the connection request transmitted from the image receiver 200 in accordance with the connection request packet transmitted in step S1303 has been received (step S1304).

If a result of the checking in step S1304 indicates that the connection response packet has been received from the image receiver 200 ("YES" in step S1304), the communication unit 104 determines that the wireless connection with the image receiver 200 has been established, completes the wireless connection (TX) process, and returns to the subsequent step S510 in the process of transmitting the captured image data for wireless transfer (transmission image data TrD) shown in FIG. 8 to the image receiver 200.

On the other hand, if a result of the checking in step S1304 indicates that the connection response packet from the image receiver 200 has not been received ("NO" in step S1304), the communication unit 104 determines whether or not a predetermined time period, i.e., a so-called timeout period, has elapsed after the transmission of the connection request packet in step S1303 (step S1305).

If a result of the determination in step S1305 indicates that the predetermined time has not elapsed ("NO" in step S1305), the communication unit 104 returns to step S1304 to check again whether or not the connection response packet has been received.

On the other hand, if a result of the determination in step S1305 indicates that the predetermined time has elapsed ("YES" in step S1305), the communication unit 104 determines that it is not possible to establish a wireless connection with the image receiver 200 by using the currently set wireless communication channel and changes the channel number I of the wireless communication channel to another channel number (here, the channel number I=I+1) such as a larger channel number (step S1306).

Subsequently, the communication unit 104 determines whether or not the channel number I changed to in step S1306 exceeds a largest channel number available for wireless transfer between the image transmitter 100 and the image receiver 200 (here, the channel number I=CH−MAX) (step S1307). In other words, in step S1307, the communication unit 104 determines whether or not the channel number I changed to in step S1306 is a channel number I available for wireless transfer from and to the image receiver 200.

If a result of the determination in step S1307 indicates that the changed channel number I does not exceed the largest channel number I=CH−MAX available for wireless transfer between the image transmitter 100 and the image receiver 200 (step "NO" in step S1307), the communication unit 104 returns to step S1302 to set the changed channel number I=I+1 as the channel number I of the wireless communication channel for which the wireless connection is attempted and attempt to establish a wireless connection with the image receiver 200 again.

On the other hand, if a result of the determination in step S1307 indicates that the changed channel number I exceeds the largest channel number I=CH−MAX available for wireless transfer between the image transmitter 100 and the image receiver 200 ("YES" in step S1307), the communication unit 104 immediately changes the channel number I of the wireless communication channel to the smallest channel number, i.e., the channel number I=1 (step S1308). Then, the communication unit 104 returns to step S1302 to set the changed channel number I=1 as the channel number I of the wireless communication channel for which the wireless connection is attempted and attempt to establish the wireless connection with the image receiver 200.

According to such processing, the communication unit 104 performs a wireless connection (TX) process of establishing a wireless connection with the image receiver 200 (more specifically the communication unit 201 provided in the image receiver 200).

Next, the operation of each component included in the image receiver 200 constituting the image transfer system 1 will be described.

Figure 11:
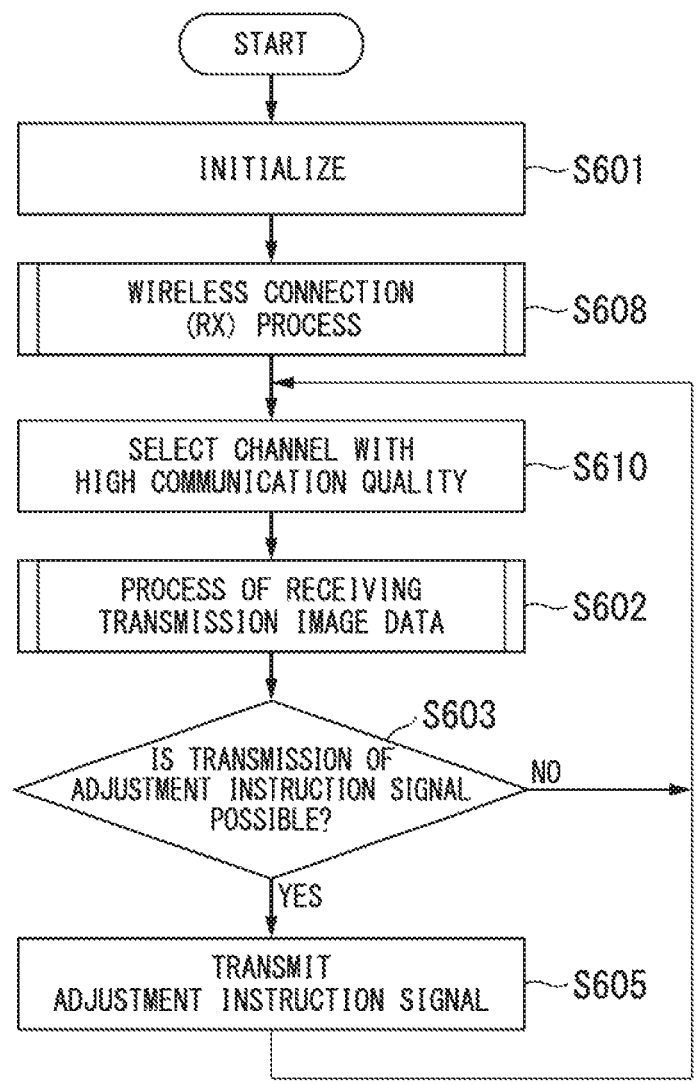
FIG. 11 is a flowchart showing a processing procedure of a communication unit provided in the image receiver constituting the image transfer system according to the first embodiment of the present invention.

First, the operation of the communication unit 201 provided in the image receiver 200 will be described. FIG. 11 is a flowchart showing a processing procedure of the communication unit 201 provided in the image receiver 200 constituting the image transfer system 1 according to the first embodiment of the present invention. The communication unit 201 performs the reception of the transmission image data TrD transmitted from the image transmitter 100 in the following processing procedure, i.e., the reception of the vertical synchronization signal and the captured image data, and the transmission of the adjustment instruction signal TrA for issuing an instruction for adjusting the cycle or the phase of the vertical synchronization signal to the image transmitter 100.

When the image receiver 200 is activated, the communication unit 201 first initializes the components within the communication unit 201 (step S601).

Subsequently, the communication unit 201 performs a wireless connection (RX) process on the wireless communication channel with the image transmitter 100 (more specifically, the communication unit 104 provided in the image transmitter 100) via the antenna 207 (step S608). Also, a detailed description of the processing procedure of the wireless connection (RX) process performed by the communication unit 201 in step S608 will be described below.

Subsequently, after the wireless connection with the communication unit 104 is established, the communication unit 201 selects a (relative good) channel with high communication quality among currently available channels, i.e., free channels (step S610). Also, the processing of step S610 is executed in cooperation with the channel selection process of step S510 in the communication unit 104 shown in FIG. 8. For example, when the communication unit 104 mainly selects a channel with high communication quality, the communication unit 201 changes a channel to be used on the basis of information of a channel with high communication quality selected and transmitted by the communication unit 104. On the other hand, when the communication unit 201 mainly selects a channel with high communication quality, the communication unit 201 selects a channel with high communication quality and transmits information of the selected channel with high communication quality to the communication unit 104. Thereby, the communication unit 104 changes the channel to be used on the basis of information of the channel with high communication quality transmitted from the communication unit 201 in the channel selection process of step S510 in the communication unit 104 shown in FIG. 8.

Subsequently, the communication unit 201 performs a transmission image data TrD reception process of receiving the transmission image data TrD transmitted from the communication unit 104 via the antenna 207 by using the selected wireless communication channel (step S602). In other words, the communication unit 201 receives the captured image data output through imaging performed by the imaging unit 102 provided in the image transmitter 100 and the vertical synchronization signal generated by the synchronization signal generation unit 101 wirelessly transferred from the communication unit 104 by using the wireless communication channel with high communication quality. Then, the communication unit 201 outputs the captured image data included in the received transmission image data TrD to the display unit 202, and outputs the vertical synchronization signal included in the received transmission image data TrD to the measurement unit 203. Also, a detailed description of the processing procedure of the process of receive the transmission image data TrD performed by the communication unit 201 in step S602 will be described below.

Subsequently, the communication unit 201 determines whether or not it is possible to transmit the adjustment instruction signal output from the estimation unit 204 as the adjustment instruction signal TrA to the image transmitter 100 (more specifically; the communication unit 104 provided in the image transmitter 100) (step S603). In other words, the communication unit 201 checks whether or not the present time is a period during which the transmission image data TrD transmitted from the image transmitter 100 is not received.

If a result of the determination in step S603 indicates that the adjustment instruction signal TrA cannot be transmitted to the communication unit 104 ("NO" in step S603), the communication unit 201 returns to step S610 to select a channel with higher communication quality. In other words, the communication unit 201 performs the process of receiving the transmission image data TrD corresponding to the captured image data of the next frame on the wireless communication channel with higher communication quality in steps S610 and S602.

On the other hand, if a result of the determination in step S603 indicates that the adjustment instruction signal TrA can be transmitted to the communication unit 104 ("YES" in step S603), the communication unit 201 transmits the adjustment instruction signal TrA according to the adjustment instruction signal output from the estimation unit 204 to the communication unit 104 (step S605). More specifically, the communication unit 201 transmits an instruction for adjusting a cycle or a phase of the vertical synchronization signal output from the estimation unit 204, i.e. an adjustment instruction signal TrA according to the cycle adjustment instruction signal γ or the phase adjustment instruction signal δ, to the communication unit 104. Thereafter, the communication unit 201 returns to step S610.

Thereby, in step S204 in the processing procedure of the synchronization signal generation unit 101 shown in FIG. 5, the synchronization signal generation unit 101 provided in the image transmitter 100 changes the setting of the cycle or the phase of the vertical synchronization signal to be generated to the setting according to the cycle adjustment instruction signal γ or the phase adjustment instruction signal δ, and sets the cycle or the phase of the vertical synchronization signal to be generated to the cycle or the phase according to the cycle adjustment instruction signal γ or the phase adjustment instruction signal δ.

According to such processing, the communication unit 201 iterates a process of receiving the transmission image data TrD transmitted from the image transmitter 100, outputting the captured image data included in the received transmission image data TrD to the display unit 202, and outputting the vertical synchronization signal to the measurement unit 203 and a process of wirelessly transferring the adjustment instruction signal output from the estimation unit 204 as the adjustment instruction signal TrA.

Also, in the process of receiving the transmission image data TrD (captured image data for wireless transfer) transmitted from the image transmitter 100 shown, in FIG. 11, a processing procedure in which the communication unit 201 determines whether or not it is possible to transmit the adjustment instruction signal TrA in step S603 and performs a process of transmitting the adjustment instruction signal TrA according to the adjustment instruction signal output from the estimation unit 204 to the communication unit 104 in step S605 if it is possible to transmit the adjustment instruction signal TrA ("YES" in step S603) is shown. In other words, the processing procedure when the communication unit 201 transmits the adjustment instruction signal TrA to the communication unit 104 in a period during which the transmission image data TrD transmitted from the image transmitter 100 is not received is shown. However, as described above, for example, when the image transmitter 100 and the image receiver 200 are wirelessly connected via a plurality of channels, there is also a case in which the reception of the transmission image data TrD and the transmission of the adjustment instruction signal TrA can also be performed in the same period by using different wireless communication channels. In this case, in the process of receiving the transmission image data TrD (captured image data for wireless transfer) transmitted from the image transmitter 100, the communication unit 201 performs the reception of the transmission image data TrD and the transmission of the adjustment instruction signal TrA in the same period.

Figure 12:
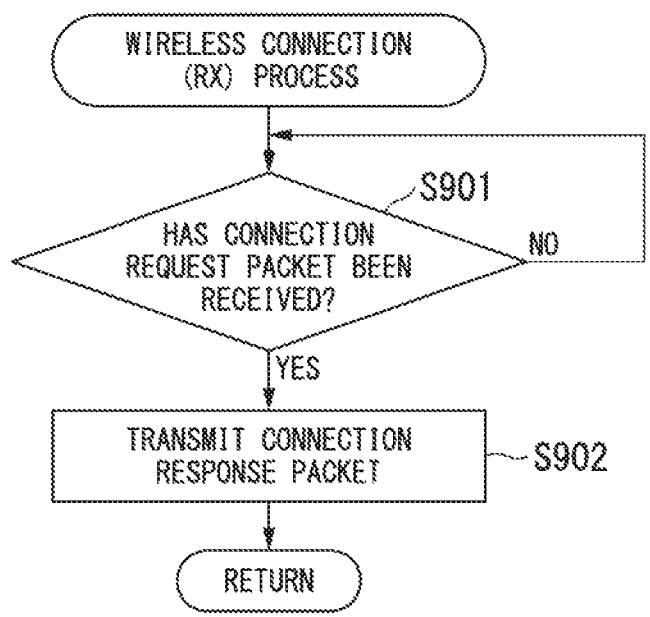
FIG. 12 is a flowchart showing a processing procedure of a wireless connection process in which the communication unit provided in the image receiver constituting the image transfer system according to the first embodiment of the present invention establishes a wireless connection with the image transmitter constituting the image transfer system.

Next, the processing procedure of the wireless connection (RX) process performed by the communication unit 201 in step S608 will be described. FIG. 12 is a flowchart showing a processing procedure of a wireless connection process in which the communication unit 201 provided in the image receiver 200 constituting the image transfer system 1 according to the first embodiment of the present invention establishes a wireless connection with the image transmitter 100 constituting the image transfer system 1. The communication unit 201 establishes a wireless connection with the image transmitter 100 in the following processing procedure.

When the wireless connection (RX) process in step S608 is started, the communication unit 201 first checks whether or not a connection request packet transmitted from the image transmitter 100 has been received (step S901).

If a result of the checking in step S901 indicates that the connection request packet from the image transmitter 100 has not been received ("NO" in step S901), the communication unit 201 returns to step S901 to wait for a connection request packet transmitted from the image transmitter 100 to be received.

On the other hand, if a result of the checking in step S901 indicates that the connection request packet from the image transmitter 100 has been received ("YES" in step S901), the communication unit 201 transmits a connection response packet indicating that the connection request according to the received connection request packet has been received to the image transmitter 100 (step S902). At this time, the communication unit 201 outputs a connection establishment signal indicating that the wireless connection with the image transmitter 100 has been established to the measurement unit 203.

According to such processing, the communication unit 201 performs a wireless connection (RX) process of establishing a wireless connection with the image transmitter 100 (more specifically, the communication unit 104 provided in the image transmitter 100).

Figure 13:
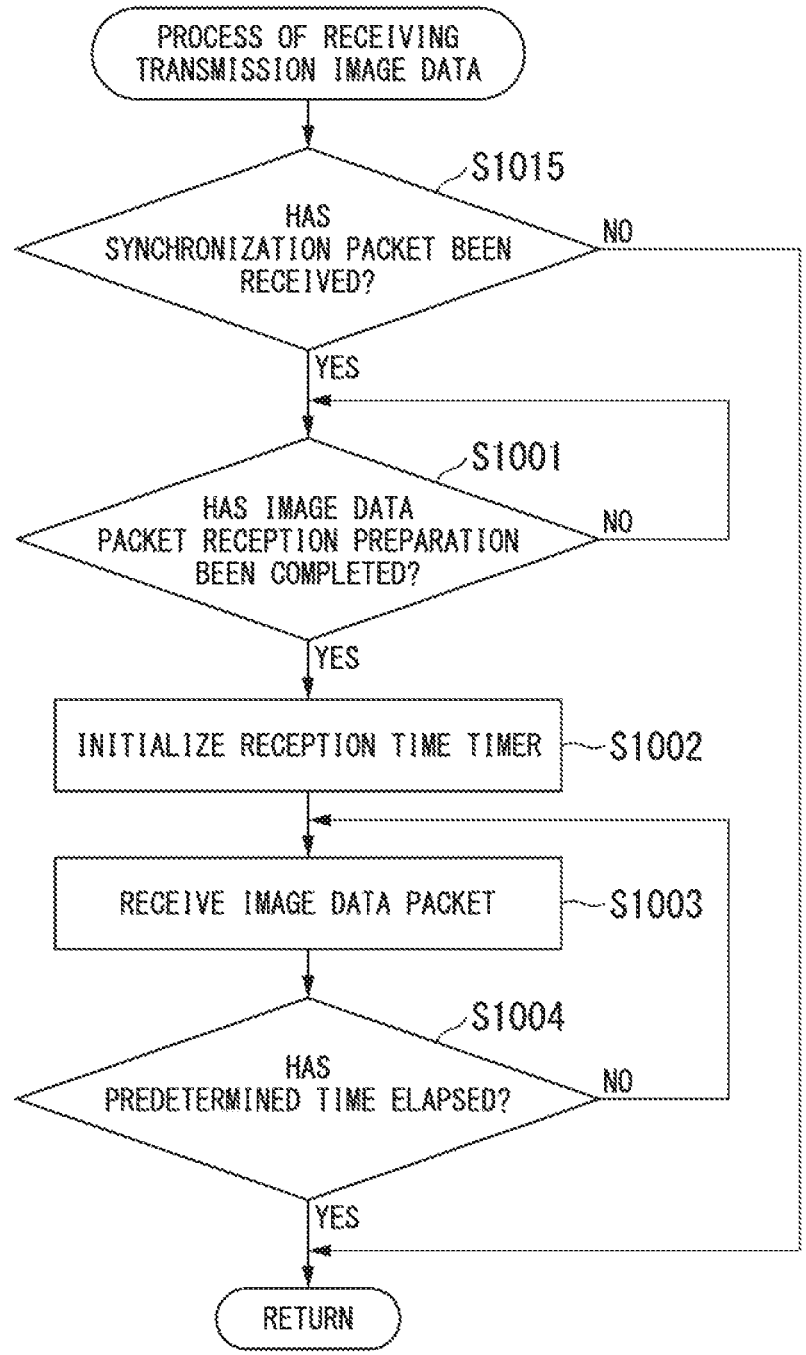
FIG. 13 is a flowchart showing a processing procedure of a reception process in which the communication unit provided in the image receiver constituting the image transfer system according to the first embodiment of the present invention receives transmission image data.

Subsequently, the processing procedure of the process of receiving the transmission image data TrD performed by the communication unit 201 in step S602 will be described. FIG. 13 is a flowchart showing a processing procedure of a reception process in which the communication unit 201 provided in the image receiver 200 constituting the image transfer system 1 according to the first embodiment of the present invention receives the transmission image data TrD. The communication unit 201 receives the transmission image data TrD transmitted from the communication unit 104 provided in the image transmitter 100 in the following processing procedure.

Also, for a detailed description of the processing procedure of the transmission image data TrD reception process in the communication unit 201 in the following description, the image transmitter 100 configured to divide the captured image data of one frame into a plurality of image data packets and wirelessly transfer the plurality of image data packets will be described. Thus, each packet in the transmission image data TrD transmitted from the communication unit 104 for the communication unit 201 being any one of image data packets obtained by dividing captured image data of one frame obtained through imaging performed by the imaging unit 102 provided in the image transmitter 100 and one synchronization packet indicating the timing of the vertical synchronization signal output by the synchronization signal generation unit 101 will described. In the transmission image data TrD reception process in the communication unit 201, a case in which a synchronization packet is received before the reception of the first image data packet will be described.

When the transmission image data TrD reception process in step S602 is started, the communication unit 201 first receives a packet of the transmission image data TrD transmitted from the image transmitter 100 (more specifically, the communication unit 104 provided in the image transmitter 100) and checks whether or not the packet of the received transmission image data TrD is a synchronization packet (step S1015).

If a result of the checking in step S1015 indicates that the packet of the received transmission image data TrD is not a synchronization packet ("NO" in step S1015), the communication unit 201 terminates the transmission image data TrD reception process and returns to the subsequent step S603 in the process of receiving the transmission image data TrD (captured image data for wireless transfer) transmitted from the image transmitter 100 shown in FIG. 11.

On the other hand, if a result of the checking in step S1015 indicates that the packet of the received transmission image data TrD is a synchronization packet ("YES" in step S1015), the communication unit 201 transmits the received synchronization packet, the vertical synchronization signal, to the measurement unit 203. Then, the communication unit 201 checks whether or not a preparation for receiving the image data packets transmitted as the packets of the next transmission image data TrD from the communication unit 104 has been completed (step S1001).

If a result of the checking in step S1001 indicates that the preparation for receiving the image data packets transmitted as the packets of the transmission image data TrD from the communication unit 104 has not been completed ("NO" in step S1001), the communication unit 201 returns to step S1001 to wait for the preparation for receiving the image data packets to be completed.

On the other hand, if a result of the checking in step S1001 indicates that the preparation for receiving the image data packets transmitted as the packets of the transmission image data TrD from the communication unit 104 has been completed ("YES" in step S1001), the communication unit 201 initializes (clears) a reception time timer provided for measuring an upper limit value of a time required for wireless transfer of captured image data for one frame and starts the measurement of the reception time (step S1002). Also, the upper limit value of the time required for wireless transfer of captured image data for one frame is, for example, a time of 16.667 ms when the image receiver 200 causes the display unit 202 to display the display image according to the captured image data in a cycle of 60 frames/second (fps).

Subsequently, the communication unit 201 receives a first image data packet transmitted as one packet of the transmission image data TrD from the communication unit 104, i.e., a first image data packet obtained by dividing captured image data of one frame obtained through imaging performed by the imaging unit 102 provided in the image transmitter 100 (step S1003).

Subsequently, the communication unit 201 determines whether or not a predetermined time, i.e., an upper limit time available in wireless transfer of the captured image data for one frame, has elapsed after the start of the measurement of the reception time in step S1002 on the basis of a reception time measured by the reception time timer (step S1004). For example, when the image receiver 200 causes the display unit 202 to display a display image according to captured image data in a cycle of 60 frames/second (fps), the communication unit 201 determines whether or not the time of 16.667 ms has elapsed.

If a result of the determination in step S1004 indicates that the predetermined time has not elapsed ("NO" in step S1004), the communication unit 201 returns to step S1003 to receive the next image data packet to be transmitted as one packet of the transmission image data TrD from the communication unit 104.

On the other hand, if a result of the determination in step S1004 indicates that a predetermined time has elapsed ("YES" in step S1004), the communication unit 201 outputs all the image data packets received in step S1003, the captured image data of one frame, to the display unit 202. Then, the communication unit 201 completes the transmission image data TrD reception process and returns to the subsequent step S603 in the process of receiving the transmission image data TrD (captured image data for wireless transfer) transmitted from the image transmitter 100 shown in FIG. 11.

According to such processing, the communication unit 201 performs a reception process of sequentially receiving image data packets obtained by dividing captured image data of one frame obtained through imaging performed by the imaging unit 102 provided in the image transmitter 100 wirelessly transferred as packets of the transmission image data TrD from the communication unit 104 from a first image data packet.

Also, in the transmission image data TrD reception process shown in FIG. 13, a case in which the image transmitter 100 is configured to divide the captured image data of one frame into a plurality of image data packets and wirelessly transfer the image data packets has been described. On the other hand, when the image transmitter 100 is configured to wirelessly transfer the captured image data in units of images of one frame captured by the imaging unit 102 provided in the image transmitter 100, the communication unit 201 receives the transmission image data TrD corresponding to the captured image data for wireless transfer of one frame including the vertical synchronization signal transmitted from the communication unit 104. In this case, for example, the transmission image data TrD reception process in the communication unit 201 can be easily understood in consideration of image data packets as captured image data of one frame in the processing of step S1003 in the transmission image data TrD reception process shown in FIG. 13. More specifically, the transmission image data TrD reception process in the communication unit 201 can be easily understood in consideration of the reception of the transmission image data TrD corresponding to the captured image data of one frame in the communication unit 201 after the start of the measurement of the reception time in step S1002. Accordingly, a detailed description of the image receiver 200 when the image transmitter 100 is configured to wirelessly transfer captured image data in units of images of one frame be omitted.

Figure 14:
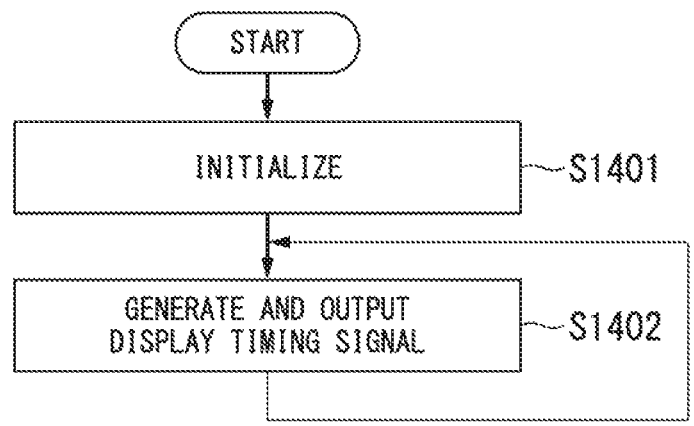
FIG. 14 is a flowchart showing a processing procedure of a synchronization signal generation unit provided in the image receiver constituting the image transfer system according to the first embodiment of the present invention.

Next, the operation of the synchronization signal generation unit 205 provided in the image receiver 200 will be described. FIG. 14 is a flowchart showing the processing procedure of the synchronization signal generation unit 205 provided in the image receiver 200 constituting the image transfer system 1 according to the first embodiment of the present invention. The synchronization signal generation unit 205 generates and outputs a display timing signal in the following processing procedure.

When the image receiver 200 is activated, the synchronization signal generation unit 205 first initializes the components within the synchronization signal generation unit 205 (step S1401).

Subsequently, the synchronization signal generation unit 205 generates a display timing signal on the basis of a reference clock signal generated by the crystal oscillation IC (not shown) provided in the image receiver 200. Then, the synchronization signal generation unit 205 outputs the generated display timing signal to each of the display unit 202 and the measurement unit 203 (step S1402). Thereafter, the synchronization signal generation unit 205 returns to step S1402 to iterate the process of generating and outputting the display timing signal. Also, at this time, the display timing signal generated and output by the synchronization signal generation unit 205 may be a signal of a predetermined cycle or phase corresponding to the vertical synchronization signal for the display image according to the captured image data displayed on the liquid crystal display (not shown) connected to the display unit 202.

According to such processing, the synchronization signal generation unit 205 outputs a generated display timing signal to each of the display unit 202 and the measurement unit 203 by iterating the generation of a display timing signal as a reference for causing the liquid crystal display (not shown) to display a display image according to captured image data.

Figure 15:
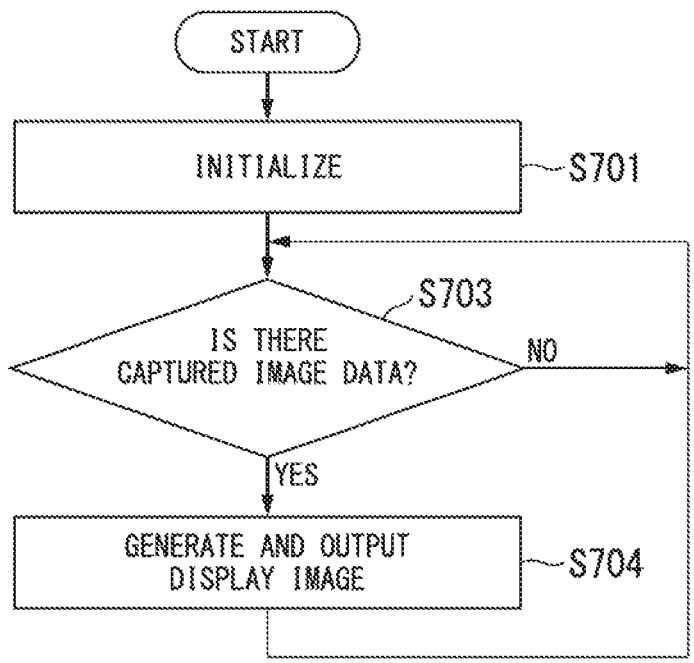
FIG. 15 is a flowchart showing a processing procedure of a display unit provided in the image receiver constituting the image transfer system according to the first embodiment of the present invention.

Next, the operation of the display unit 202 provided in the image receiver 200 will be described. FIG. 15 is a flowchart showing a processing procedure of the display unit 202 provided in the image receiver 200 constituting the image transfer system 1 according to the first embodiment of the present invention. The display unit 202 displays the display image according to the captured image data in the following processing procedure.

When the image receiver 200 is activated, the display unit 202 first initializes the components within the display unit 202 (step S701).

Subsequently, the display unit 202 checks whether or not the captured image data received from the communication unit 201 has been output (step S703). In other words, the display unit 202 checks whether or not there is captured image data of the display image to be displayed on the connected liquid crystal display (not shown).

If a result of the checking in step S703 indicates that the captured image data has not been output from the communication unit 201 ("NO" in step S703), the display unit 202 returns to step S703 to wait for the captured image data to be output from the communication unit 201.

On the other hand, if a result of the checking in step S703 indicates that the captured image data has been output from the communication unit 201 ("YES" in step S703), the display unit 202 generates a display image of one frame according to captured image data output from the communication unit 201 and outputs the data of the generated display image to the liquid crystal display (not shown) at a timing using the display timing signal output from the synchronization signal generation unit 205 as a reference (step S704). Thereby, the liquid crystal display (not shown) displays an image corresponding to the data of the display image output from the display unit 202. Thereafter, the display unit 202 returns to step S703 to iterate the generation of a display image of one frame according to the next captured image data output from the communication unit 201 and the output of generated display image data to the liquid crystal display (not shown).

According to such processing, the display unit 202 sequentially outputs data of a generated display image to the liquid crystal display (not shown) by iterating the generation of the display image according to the captured image data output from the communication unit 201 for every frame at a timing using the display timing signal output from the synchronization signal generation unit 205 as a reference.

Figure 16:
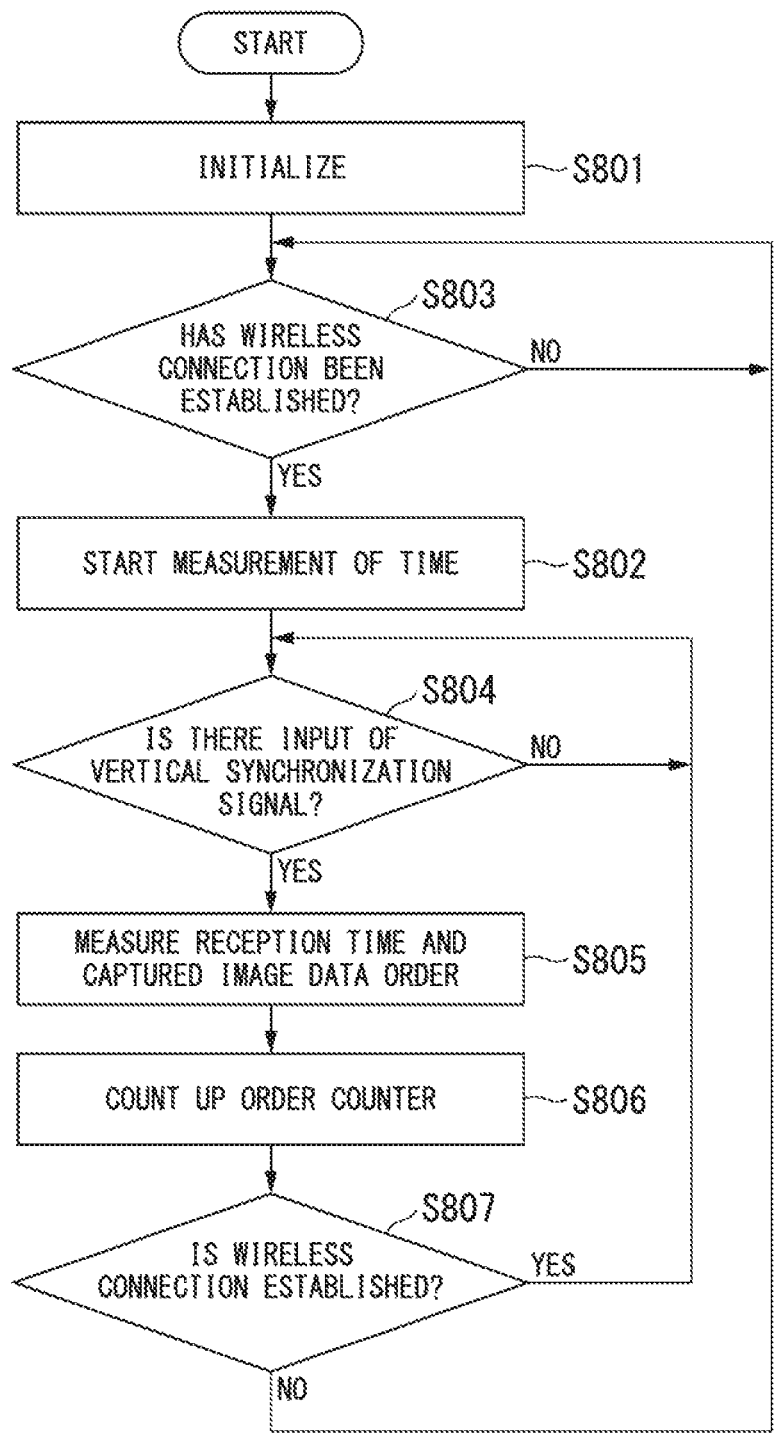
FIG. 16 is a flowchart showing a processing procedure of a measurement unit provided in the image receiver constituting the image transfer system according to the first embodiment of the present invention.

Next, the operation of the measurement unit 203 provided in the image receiver 200 will be described. FIG. 16 is a flowchart showing a processing procedure of the measurement unit 203 provided in the image receiver 200 constituting the image transfer system 1 according to the first embodiment of the present invention. The measurement unit 203 measures the reception time and the captured image data order of the captured image data included in the transmission image data TrD transmitted from the communication unit 104 provided in the image transmitter 100 in the following processing procedure. In the following description, a time measured by the measurement unit 203 is referred to as a time T, and a counter configured to count the number of vertical synchronization signals to measure the captured image data order by the measurement unit 203 will be described as an order counter C.

When the image receiver 200 is activated, the measurement unit 203 first initializes the components within the measurement unit 203 (step S801). In step S801, the measurement unit 203 performs initialization to the time T=0 and the order counter C=0.

Subsequently, the measurement unit 203 checks whether not the wireless connection with the image transmitter 100 is established (step S803). More specifically, the measurement unit 203 checks whether or not a connection establishment signal has been input from the communication unit 201.

If a result of the checking in step S803 indicates that the wireless connection with the image transmitter 100 has not been established ("NO" in step S803), the measurement unit 203 returns to step S803 to wait for a wireless connection with the image transmitter 100 to be established.

On the other hand, if a result of the checking in step S803 indicates that the wireless connection with the image transmitter 100 has been established ("YES" in step S803), the measurement unit 203 starts time measurement (step S802). More specifically, the measurement unit 203 updates the time T every time a certain time elapses. For example, the measurement unit 203 may set the time T=T+1 every time 0.1 ms elapses.

Subsequently, the measurement unit 203 checks whether or not there is an input of the vertical synchronization signal (step S804). More specifically, the measurement unit 203 checks whether or not the vertical synchronization signal has been input from the communication unit 201.

If a result of the checking in step S804 indicates that there is no input of the vertical synchronization signal ("NO" in step S804), the measurement unit 203 returns to step S804 to wait for the vertical synchronization signal to be input.

On the other hand, if a result of the checking in step S804 indicates that there is an input of the vertical synchronization signal ("YES" in step S804), the measurement unit 203 measures the reception time and the captured image data order and associates the reception time with the captured image data order to output an association result to the data selection unit 206 (step S805). More specifically, the measurement unit 203 acquires the current time T as the reception time D. Also, the measurement unit 203 acquires a count value of the current order counter C, and sets a value obtained by adding 1 to the acquired count value of the order counter C as the captured image data order N. Then, the measurement unit 203 associates the reception time D with the captured image data order N and outputs an association result to the data selection unit 206.

Subsequently, the measurement unit 203 counts up the count value of the order counter C (step S806). More specifically, the measurement unit 203 updates the order counter C to an order counter C+1.

Subsequently, the measurement unit 203 checks whether or not a wireless connection with the image transmitter 100 is established (step S807). In other words, the measurement unit 203 checks whether or not the state in which the wireless connection with the image transmitter 100 has been established continues.

If a result of the checking in step S807 indicates that the wireless connection with the image transmitter 100 is established ("YES" in step S807), the measurement unit 203 returns to step S804 to wait for the next vertical synchronization signal to be input.

On the other hand, if a result of the checking in step S807 indicates that the wireless connection with the image transmitter 100 is not established, i.e., when the wireless connection with the image transmitter 100 has been disconnected ("NO" in step S807), the measurement unit 203 returns to step S803 to wait for the wireless connection with the image transmitter 100 to be established.

According to such processing, the measurement unit 203 sequentially iterates the measurement of the reception time of the captured image data and the captured image data order included in the transmission image data TrD transmitted from the communication unit 104 provided in the image transmitter 100 and sequentially outputs information of the measured reception time and captured image data order to the data selection unit 206.

Also, in the process of measuring the reception time of the captured image data and the captured image data order in the measurement unit 203 shown in FIG. 16, a case in which the image transmitter 100 is configured to wirelessly transfer captured image data in units of images of one frame captured by the imaging unit 102 provided in the image transmitter 100 has been described. On the other hand, if the image transmitter 100 is configured to divide captured image data of one frame into a plurality of image data packets and wirelessly transfer the plurality of image data packets, the reception time of the captured image data and the captured image data order are measured on the basis of the synchronization packet output from the communication unit 201. In this case, the process of measuring the reception time of the captured image data and the captured image data order in the measurement unit 203 can be easily understood in consideration of checking of whether or not a synchronization packet has been input from the communication unit 201 in the processing of step S804. Accordingly, a detailed description of a case in which the image transmitter 100 is configured to divide the captured image data of one frame into a plurality of image data packets and wirelessly transfer the plurality of image data packets will be omitted.

Figure 17:
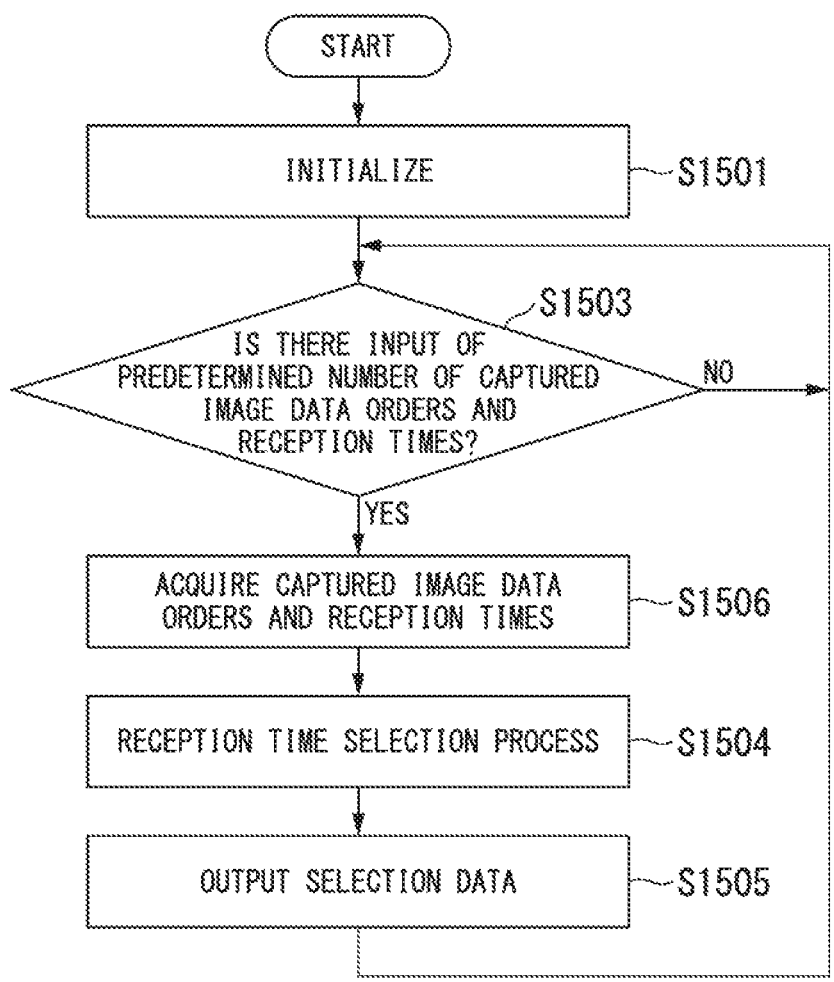
FIG. 17 is a flowchart showing a processing procedure of a data selection unit provided in the image receiver constituting the image transfer system according to the first embodiment of the present invention.

Next, the operation of the data selection unit 206 provided in the image receiver 200 will be described. FIG. 17 is a flowchart showing a processing procedure of the data selection unit 206 provided in the image receiver 200 constituting the image transfer system 1 according to the first embodiment of the present invention. The data selection unit 206 selects information of each piece of selection data from information of a predetermined number of reception times associated with information of captured image data orders in the following processing procedure.

When the image receiver 200 is activated, the data selection unit 206 first initializes the components within the data selection unit 206 (step S1501).

Subsequently, the data selection unit 206 checks whether or not there is an input of information of a predetermined number of reception times with which the information of the captured image data order is associated from the measurement unit 203 (step S1503). If a result of the checking in step S1503 indicates that there is no input of information of a predetermined number of reception times associated with the information of the captured image data order ("NO" in step S1503), the data, selection unit 206 returns to step S1503 to wait for the information of the predetermined number of reception times associated with the information of the captured image data order to be input.

On the other hand, if a result of the checking in step S1503 indicates that there is an input of the information of the predetermined number of reception times associated with the information of the captured image data order ("YES" in step S1503), the data selection unit 206 acquires the information of the predetermined number of reception times associated with the information of the captured image data order output from the measurement unit 203 (step S1506).

Subsequently, the data selection unit 206 performs a reception time selection process of selecting each piece of information of a minimum reception time and a captured image data order corresponding thereto and information of a minimum change reception time and a captured image data order corresponding thereto on the basis of the information of the predetermined number of reception times associated with the information of the captured image data order acquired in step S1506 (step S1504). More specifically, the data selection unit 206 first selects the minimum reception time and the captured image data order corresponding to the minimum reception time on the basis of information of a predetermined number of reception times associated with information of captured image data orders output from the measurement unit 203. Further, the data selection unit 206 sequentially applies the above Equation (2) to information of the selected minimum reception time and captured image data order and information of a predetermined number of reception times associated with information of the remaining captured image data orders and selects a minimum change reception time for which a magnitude of a slope $\alpha$ (=a cycle $\alpha$) of a straight line $\theta$ connecting the minimum reception time and each reception time is minimized and a captured image data order corresponding to the minimum change reception time.

Subsequently, the data selection unit 206 outputs information of each of the minimum reception time, the captured image data order corresponding to the minimum reception time, the minimum change reception time, and the captured image data order corresponding to the minimum change reception time selected in the reception time selection process in step S1504 as selection data to be output to the estimation unit 204 (step S1505). Thereafter, the data selection unit 206 returns to step S1503 to iterate the selection of the next minimum reception time, the next captured image data order corresponding to the next minimum reception time, the next minimum change reception time, and the next captured image data order corresponding to the next minimum change reception time, and the output of the next selection data to the estimation unit 204 based on the information of the predetermined number of reception times associated with the information of the captured image data orders output from the measurement unit 203 thereafter.

Also, the data selection unit 206 may set information of a predetermined number of reception times associated with information of captured image data orders unused in the selection of the selection data between information of a reception time associated with information of a captured image data, order already used in selection of the selection data and information of a reception time associated with information of a captured image data order to be used in selection of the next selection data when a process related to the next selection data is performed. Thereby, it is possible to prevent information of a reception time associated with information of a captured image data order for which a cycle or a phase of a vertical synchronization signal based on first output selection data is not adjusted from being included in information of a reception time associated with information of a captured image data order to be used in selection of the next selection data.

According to such processing, the data selection unit 206 selects the minimum reception time, the minimum change reception time, and the captured image data orders corresponding thereto from information of a predetermined number of reception times associated with information of captured image data orders output from the measurement unit 203 and outputs information of the selected times and orders as selection data to the estimation unit 204.

Figure 18:
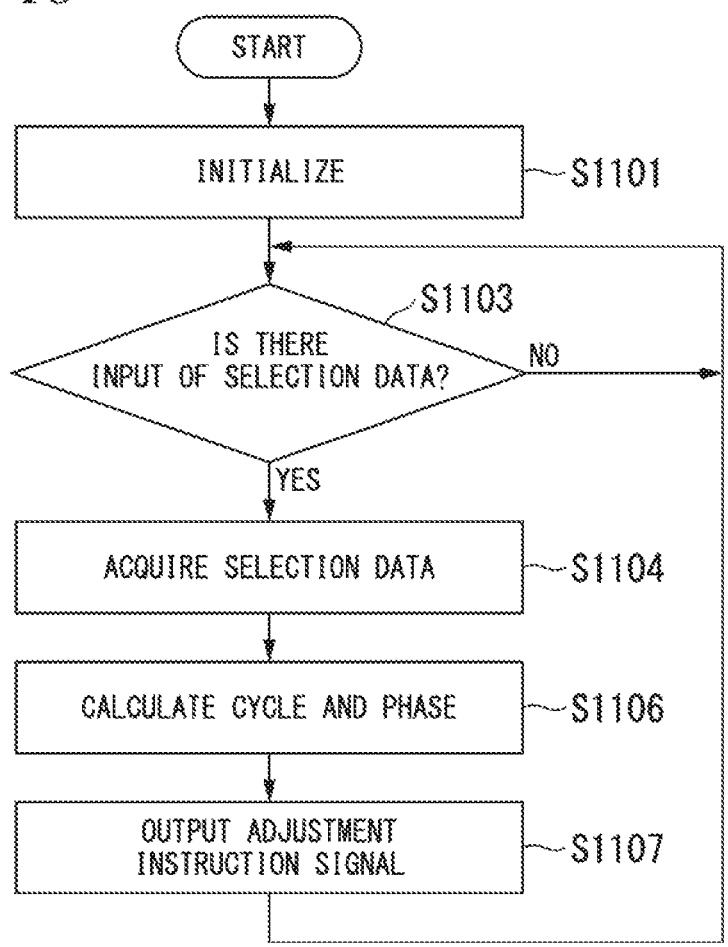
FIG. 18 is a flowchart showing a processing procedure of an estimation unit provided in the image receiver constituting the image transfer system according to the first embodiment of the present invention.

Next, the operation of the estimation unit 204 provided in the image receiver 200 will be described. FIG. 18 is a flowchart showing a processing procedure of the estimation unit 204 provided in the image receiver 200 constituting the image transfer system 1 according to the first embodiment of the present invention. The estimation unit 204 estimates a cycle or a phase of the vertical synchronization signal when the imaging unit 102 of the image transmitter 100 captures an image on the basis of the selection data in the following processing procedure.

When the image receiver 200 is activated, the estimation unit 204 first initializes the components within the estimation unit 204 (step S1101).

Subsequently, the estimation unit 204 checks whether or not there is an input of selection data from the data selection unit 206 (step S1103). If a result of the checking in step S1103 indicates that there is no input of selection data ("NO" in step S1103), the estimation unit 204 returns to step S1103 to wait for the selection data to be input.

On the other hand, if a result of the checking in step S1103 indicates that there is an input of selection data ("YES" in step S1103), the estimation unit 204 acquires the selection data output from the data selection unit 206 (step S1104).

Subsequently, the estimation unit 204 calculates a cycle and a phase of the vertical synchronization signal when the image transmitter 100 captures an image with the imaging unit 102 on the basis of the selection data acquired in step S1106 (step S1106). More specifically, the estimation unit 204 calculates a cycle α by applying the above Equation (2) to information of each of a minimum reception time, a minimum change reception time, and captured image data orders corresponding thereto included in the selection data output from the data selection unit 206. Also, the estimation unit 204 calculates a phase β by applying the above Equation (3) to information of each of a minimum reception time, a minimum change reception time, and captured image data orders corresponding thereto included in the selection data output from the data selection unit 206.

Subsequently, the estimation unit 204 calculates a cycle adjustment instruction signal and a phase adjustment instruction signal for issuing an instruction for adjusting the vertical synchronization signal on the basis of the cycle α and the phase β calculated in the step S1106 and outputs each of the calculated cycle adjustment instruction signal and phase adjustment instruction signal as an adjustment instruction signal to the communication unit 201 (step S1107). More specifically, the estimation unit 204 calculates the cycle adjustment instruction signal γ by applying the above Equation (4) to the cycle α calculated in step S1106. Also, the estimation unit 204 calculates the phase adjustment instructing signal δ by applying the above Equation (5) to the phase β calculated in step S1106. Then, the estimation unit 204 outputs information of each of the calculated cycle adjustment instruction signal γ and phase adjustment instruction signal δ as an adjustment instruction signal to the communication unit 201. Thereafter, the estimation unit 204 returns to step S1103 to iterate the calculation of each of a cycle adjustment instruction signal and a phase adjustment instruction signal for issuing an instruction for adjusting the next vertical synchronization signal and the output of the next adjustment instruction signal to the communication unit 201 on the basis of the selection data output from the data selection unit 206 thereafter.

According to such processing, the estimation unit 204 estimates the cycle and the phase of the vertical synchronization signal then the imaging unit 102 provided in the image transmitter 100 captures an image on the basis of the selection data output from the data selection unit 206. On the basis of the estimated cycle or phase, the estimation unit 204 outputs an adjustment instruction signal for adjusting the cycle or the phase of the vertical synchronization signal when the image transmitter 100 captures an image with the imaging unit 102 to a target cycle or phase to the communication unit 201.

Thereby, the communication unit 201 sequentially transmits the adjustment instruction signal TrA including the adjustment instruction signal output from the estimation unit 204 to the image transmitter 100 and sequentially adjusts the cycle and the phase of the vertical synchronization signal when the image transmitter 100 captures an image with the imaging unit 102.

Also, a configuration in which a reception time of captured image data is measured as a reference time when a wireless connection between the image transmitter 100 and the image receiver 200 has been established in the image transfer system 1 has been described. However, various methods other than a method in which a time when the wireless connection between the image transmitter 100 and the image receiver 200 is established is set as a reference time can be conceived for a method of measuring the reception time of captured image data. For example, the image receiver 200 may have a configuration in which the synchronization signal generation unit 205 sets a display timing signal, which is a timing signal serving as a reference for causing the display unit 202 to display a display image according to captured image data, as a reference time when the reception time of captured image data is measured.

Figure 19:
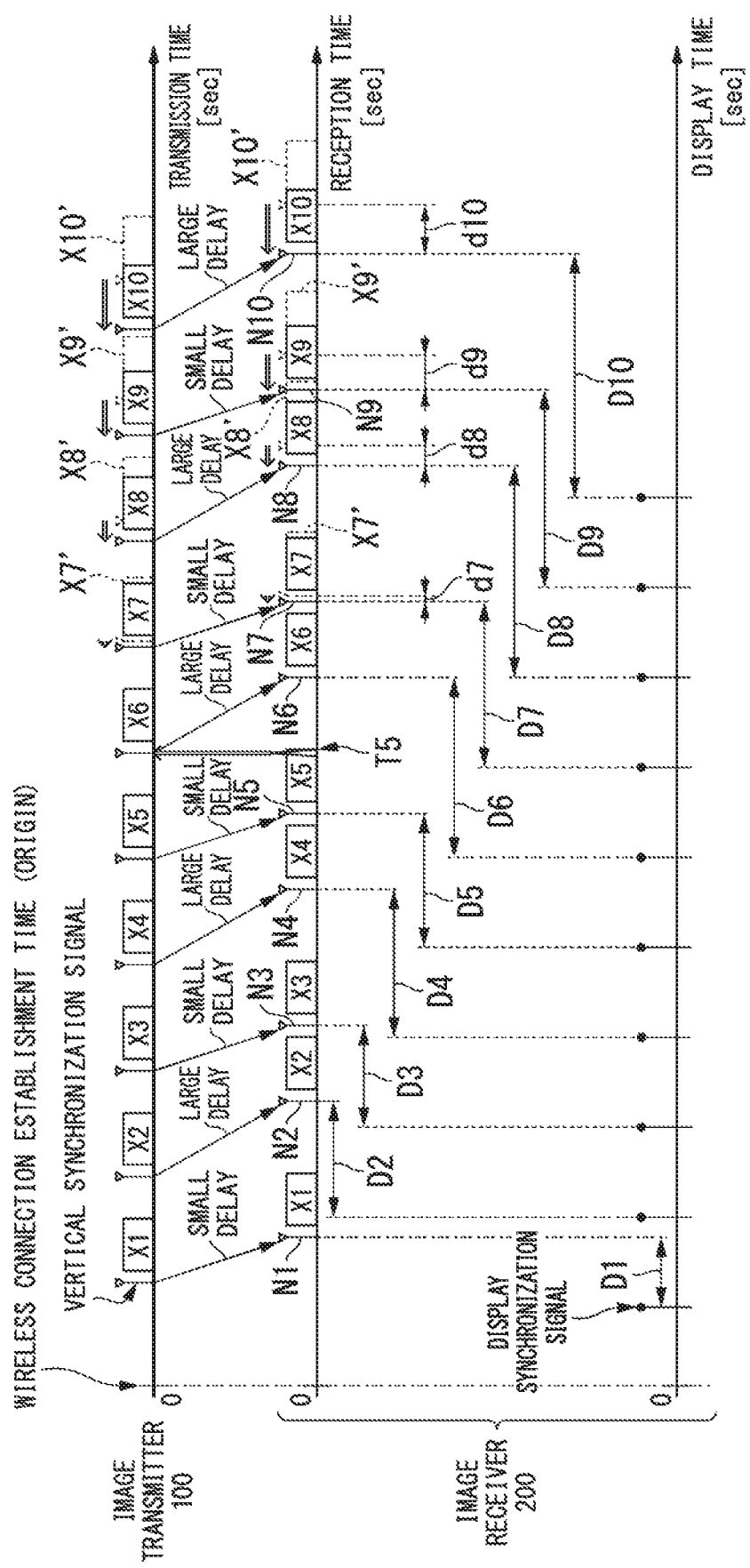
FIG. 19 is a timing chart showing another example of the reception time of captured image data wirelessly transferred in the image transfer system according to the first embodiment of the present invention.
Figure 20:
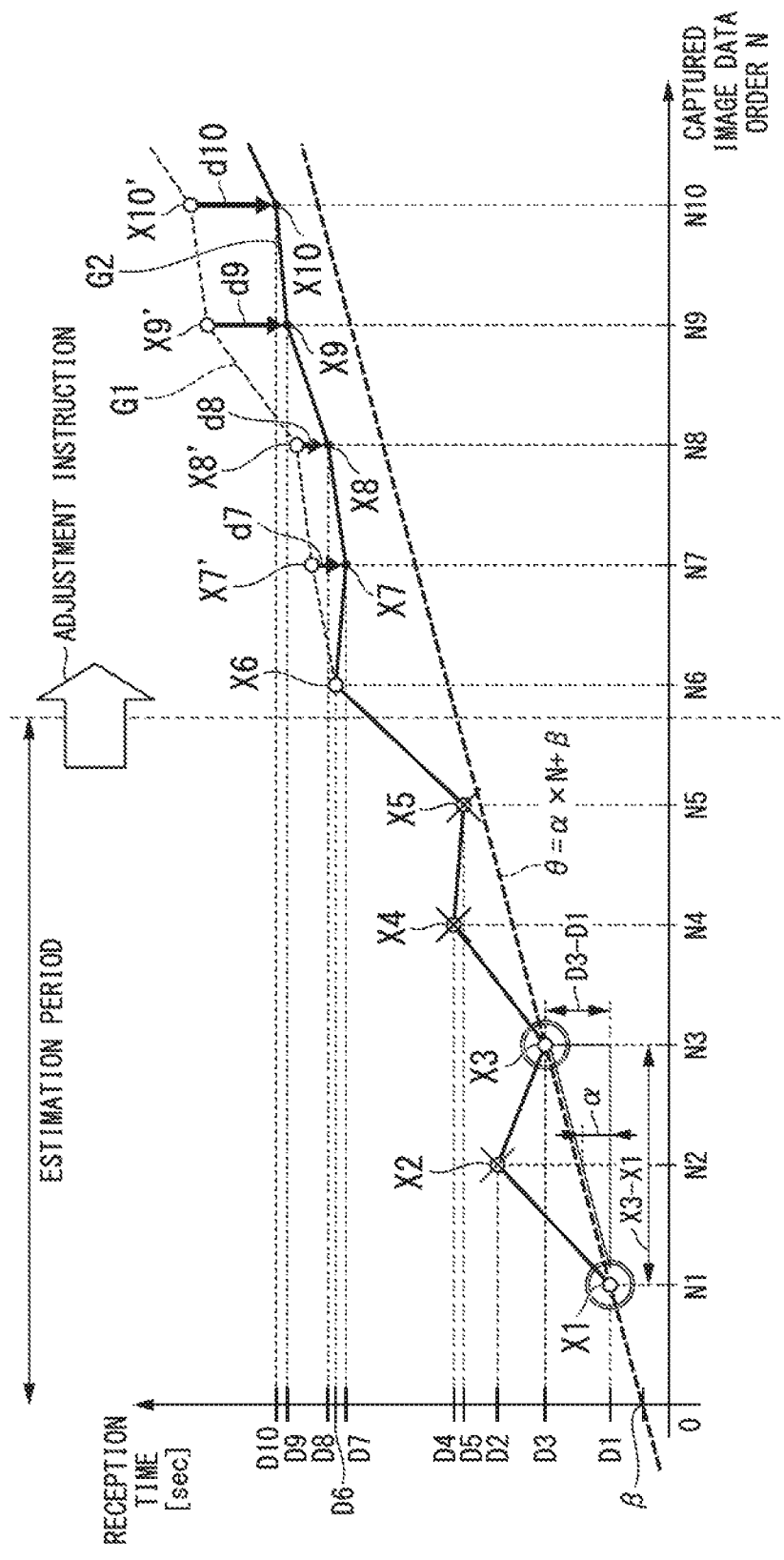
FIG. 20 is a diagram showing another example of the relationship between the order and the reception time of the captured image data wirelessly transferred in the image transfer system according to the first embodiment of the present invention.

Here, a method of measuring a reception time in the image receiver 200 having a configuration in which the display timing signal is set as a reference time when a reception time of captured image data is measured and a method of estimating the cycle or the phase of the vertical synchronization signal will be described. FIG. 19 is a timing chart showing another example of the reception time of captured image data wirelessly transferred in the image transfer system 1 according to the first embodiment of the present invention. Also, FIG. 20 is a diagram showing another example of the relationship between the order and the reception time of the captured image data wirelessly transferred in the image transfer system 1 according to the first embodiment of the present invention.

In FIG. 19, as in the example of the reception time of the captured image data shown in FIG. 3, an example of a state in which the image transmitter 100 transmits 10 pieces of transmission image data TrD including a vertical synchronization signal and captured image data is shown. After the connection establishment signal indicating that the wireless connection between the image transmitter 100 and the image receiver 200 has been established is input from the communication unit 201, the measurement unit 203 provided in the image receiver 200 sets a timing of a vertical synchronization signal for display (hereinafter referred to as "display synchronization signal") included in the display timing signal output by the synchronization signal generation unit 205 to a reference time=0 corresponding to the captured image data of each frame. Then, the measurement unit 203 measures a time until the vertical synchronization signal included in transmission image data TrD is received from the reference time as a reception time.

In an example shown in FIG. 19, an example of a timing of the display synchronization signal corresponding to the captured image data of each frame generated by the synchronization signal generation unit 205 is shown. In the example shown in FIG. 19, after the wireless connection with the image transmitter 100 is established, a timing of the display synchronization signal generated by the synchronization signal generation unit 205 is set to the reference time=0, a time at which the vertical synchronization signal included in transmission image data TrD has been received is measured, and the measured time is set as the reception times D1 to D10 of the captured image data X1 to X10 included in the transmission image data TrD. More specifically, the reception time of the first vertical synchronization signal received after the timing of the first display synchronization signal is set as the reception time D1 of the captured image data X1, the reception time of the second vertical synchronization signal received after the timing of the second display synchronization signal is set as the reception time D2 of the captured image data X2, . . . , the reception time of the tenth vertical synchronization signal received after the timing of the tenth display synchronization signal is set as the reception time D10 of the captured image data X10.

At this time, the measurement unit 203 counts the number of display synchronization signals or received vertical synchronization signals from a display synchronization signal first output by the synchronization signal generation unit 205 or a first received vertical synchronization signal after the wireless connection with the image transmitter 100 is established and sets the counted number as an order of the captured image data X included in the transmission image data TrD, i.e., a captured image data order. In the example shown in FIG. 19, after the wireless connection with the image transmitter 100 is established, the number of display synchronization signals is sequentially counted from the display synchronization signal first output by the synchronization signal generation unit 205 and the counted number of display synchronization signals is set as the captured image data orders N1 to N10 of the captured image data X1 to X10 included in the transmission image data TrD. More specifically, after the wireless connection with the image transmitter 100 is established, the count value of the first display synchronization signal=1 is set as the captured image data order N1 of the captured image data X1, the count value of the second display synchronization signal=2 is set as the captured image data order N2 of the captured image data X2, . . . , the count value of the tenth display synchronization signal=10 is set as the captured image data order N10 of the captured image data X10.

As in the above-described case of the configuration in which the time at which the wireless connection with the image transmitter 100 has been established is set as the reference time, the measurement unit 203 associates reception times D with captured image data orders N and outputs an association result to the data selection unit 206.

As in the above-described case of the configuration in which the time at which the wireless connection with the image transmitter 100 has been established is set as the reference time, the data selection unit 206 selects information of each piece of selection data on the basis of a predetermined number of pieces of information in which the reception times D and the captured image data orders N output from the measurement unit 203 are associated. For example, also in the example shown in FIG. 19, as in the example of the reception time of the captured image data shown in FIG. 3, a case in which the data selection unit 206 sets a period during which the transmission image data TrD corresponding to five pieces of captured image data X1 to X5 is received as an estimation period of the cycle or the phase of the vertical synchronization signal is considered. In this case, as in the above-described case of the configuration in which the time at which the wireless connection with the image transmitter 100 has been established is set as the reference time, the data selection unit 206 selects information of each piece of selection data from the reception times D1 to D5 and the captured image data orders N1 to N5 corresponding to the five pieces of the captured image data X1 to X5. In the example shown in FIG. 19, as in the example of the reception time of the captured image data shown in FIG. 3, the first captured image data X1 is selected as captured image data of the minimum reception time and the third captured image data X3 with a small delay is selected as captured image data of the minimum change reception time.

As in the above-described case of the configuration in which the time at which the wireless connection with the image transmitter 100 has been established is set as the reference time, the data selection unit 206 outputs each of the reception time D1 and the captured image data order N1 corresponding to the selected first captured image data X1 and the reception time D3 and the captured image data order N3 corresponding to the selected third captured image data X3 as selection data to the estimation unit 204.

As in the above-described case of the configuration in which the time at which the wireless connection with the image transmitter 100 has been established is set as the reference time, the estimation unit 204 estimates the cycle or the phase of the vertical synchronization signal when the image transmitter 100 captures an image of each frame by the imaging unit 102 on the basis of information included in the selection data output from the data selection unit 206. Here, the estimation unit 204 estimates the cycle or the phase of the vertical synchronization signal generated by the synchronization signal generation unit 101 included in the image transmitter 100 on the basis of information of the reception time D1 and the captured image data order N1 corresponding to the first captured image data X1 and the reception time D3 and the captured image data order N3 corresponding to the third captured image data X3 output from the data selection unit 206. At this time, as in the example of the relationship between the order and the reception time of the captured image data shown in FIG. 4, the estimation unit 204 represents selection data on a graph in which the X-axis represents a captured image data order and the Y-axis represents a reception time as shown in FIG. 20.

More specifically, as shown in FIG. 20, the estimation unit 204 indicates positions of (captured image data order, reception time)=(N1, D1) corresponding to the first captured image data X1 and (captured image data order, reception time)=(N3, D3) corresponding to the third captured image data X3 on the graph as shown in FIG. 20. Also, in FIG. 20, as in the example of the relationship between the order and the reception time of the captured image data shown in FIG. 4, an example in which reception times D1 to D10 of 10 pieces of captured image data X1 to X10 are represented is shown so that the relationship between the reception time D and the captured image data order N in received captured image data X can be easily understood.

Then, as in an example of the relationship between the order and the reception time of the captured image data shown in FIG. 4, the estimation unit 204 performs a process of calculating the cycle and the phase of the reception time in the selection data from an intercept β=a phase β of a straight line θ with a slope α=a cycle α and the Y-axis indicated by the above Equation (1) connecting (N1, D1) and (N3, D3). More specifically, as in the above-described case of the configuration in which the time at which the wireless connection with the image transmitter 100 has been established is set as the reference time, the estimation unit 204 calculates the cycle α by applying the above Equation (2) to information included in the selection data output from the data selection unit 206. Also, as in the above-described case of the configuration in which the time at which the wireless connection with the image transmitter 100 has been established is set as the reference time, the estimation unit 204 calculates the phase β by applying the above Equation (3) to information included in the selection data output from the data selection unit 206. Here, the estimation unit 204 calculates (estimates) the cycle α and the phase β of the vertical synchronization signal generated by the synchronization signal generation unit 101 provided in the image transmitter 100 by applying the above Equation (2) and the above Equation (3) to information of the reception time D1 and the captured image data order N1 corresponding to the first captured image data X1 and the reception time D3 and the captured image data order N3 corresponding to the third captured image data X3 output from the data selection unit 206.

Thereafter, as in the above-described case of the configuration in which the time which the wireless connection with the image transmitter 100 has been established is set as the reference time, the estimation unit 204 calculates the cycle adjustment instruction signal γ by applying the above Equation (4) to the calculated cycle α and calculates the phase adjustment instruction signal δ by applying the above Equation (5) to the calculated phase β.

As in the case of the configuration in which the reference time is the time at which the wireless connection with the image transmitter 100 has been established as described above, the estimation unit 204 outputs information of each of the calculated cycle adjustment instruction signal γ and phase adjustment instruction signal δ as an adjustment instruction signal to the communication unit 201.

Thereby, the communication unit 201 transmits the adjustment instruction signal TrA including the adjustment instruction signal output from the estimation unit 204 to the image transmitter 100 and adjusts the cycle and the phase of the vertical synchronization signal when the image transmitter 100 captures an image with the imaging unit 102.

More specifically, as shown in FIG. 19 and FIG. 20, the image receiver 200 transmits the adjustment instruction signal TrA to the image transmitter 100 at time T5 after the fifth captured image data X5 is received and therefore the cycle and phase of the vertical synchronization signal for obtaining seventh captured image data X7 and subsequent captured image data through imaging performed by the imaging unit 102 in the image transmitter 100 are adjusted.

Thereby, as shown in FIG. 19 and FIG. 20, the transmission image data TrD corresponding to captured image data X is transmitted at a timing earlier than that when the cycle and phase of the vertical synchronization signal are not adjusted. More specifically, as in the examples shown in FIG. 19 and FIG. 20, a case in which the reception time D7 at which the captured image data X7 obtained through imaging using the vertical synchronization signal whose cycle and phase are adjusted as a reference is received is a time d7 earlier than a reception time at which captured image data X7' obtained through imaging rising the vertical synchronization signal whose cycle and phase are not adjusted as a reference is received in the image receiver 200 is shown. Likewise, as in the examples shown in FIG. 19 and FIG. 20, a ease in which the reception times D8 to D10 at which the captured image data X8 to X10 obtained through imaging using the vertical synchronization signal whose cycle and phase are adjusted as a reference is received are times d8 to d10 earlier than reception times at which captured image data X8' to X10' obtained through imaging using the vertical synchronization signal whose cycle and phase are not adjusted as a reference is received in the image receiver 200 is shown.

Thereby, in the image transfer system 1, as shown in FIG. 20, the reception times D7 to D10 of the captured image data X7 to X10 are also closer to the straight line θ in the image receiver 200 configured to set the display timing signal as the reference time when the reception time of captured image data is measured. In other words, in the image receiver 200 configured to set the display timing signal as the reference time when the reception time of captured image data is measured, as in the image receiver 200 of the configuration in which the time at which the wireless connection with the image transmitter 100 has been established is set as the reference time, the cycle and phase of the display image of each frame are synchronized with the cycle and phase of the captured image data X of the frame to be captured and transmitted in the image transfer system 1. Thereby, in the image transfer system 1, the image receiver 200 can stably display the display image according to the captured image data obtained through imaging performed by the imaging unit 102 in the image transmitter 100 on the display unit 202.

Also, in FIG. 20, as in the example of the relationship between the order and the reception time of the captured image data shown in FIG. 4, to further facilitate understanding of the case in which the image receiver 200 adjusts the cycle and the phase of the vertical synchronization signal and the case in which the image receiver 200 does not adjust the cycle and the phase of the vertical synchronization signal, an example of transition of the reception time D in each case is shown. More specifically, in FIG. 20, an example of transition of the reception time D when captured image data X7' to X10' obtained through imaging using a vertical synchronization signal for which the image receiver 200 does not adjust the cycle or the phase as a reference is received is shown in a graph G1. Also, in FIG. 20, an example of transition of the reception time D when captured image data X7 to X10 obtained through imaging using a vertical synchronization signal for which the image receiver 200 adjusts the cycle or the phase as the reference is received is shown in a graph G2.

As described above, in the image transfer system 1 of the first embodiment, the image receiver 200 estimates the cycle or the phase of the vertical synchronization signal when the image transmitter 100 captures an image on the basis of a vertical synchronization signal or a synchronization packet included in a predetermined number of pieces of the transmission image data TrD transmitted from the image transmitter 100 after the wireless connection between the image transmitter 100 and the image receiver 200 is established. In the image transfer system 1 of the first embodiment, the image receiver 200 transmits the adjustment instruction signal TrA for adjusting the cycle or the phase of the vertical synchronization signal generated by the image transmitter 100 at a target timing to the image transmitter 100 on the basis of the estimated cycle or phase. Thereby, in the image transfer system 1 of the first embodiment, the image receiver 200 can stably display the display image according to the captured image data included in the transmission image data TrD captured and transmitted by the image transmitter 100 without performing unnecessary timing adjustment of the vertical synchronization signal by sensitively reacting to a sudden change in an arrival time of the transmission image data TrD in wireless transfer as in the conventional image transfer system.

In other words, in the image transfer system 1 of the first embodiment, the image receiver 200 estimates a deviation of the cycle or the phase of the vertical synchronization signal due to a cause other than a delay of wireless transfer even when the image transmitter 100 and the image receiver 200 are wirelessly connected in an unstable situation with poor communication quality in which a delay of wireless transmission suddenly occurs (a communication rate is decreased) such as frequent occurrence of retransmission of wireless communication. In the image transfer system 1 of the first embodiment, the image receiver 200 transmits an adjustment instruction signal for adjusting the deviation of the estimated cycle or phase of the vertical synchronization signal to the image transmitter 100. Thereby in the image transfer system 1 of the first embodiment, the cycle or the phase of the vertical synchronization signal is synchronized in the image transmitter 100 and the image receiver 200 and the image receiver 200 can cause a display image according to captured image data transmitted after imaging performed by the image transmitter 100 to be stably displayed.

Also, in the image transfer system 1 of the first embodiment, a configuration in which the reception time of captured image data is measured on the basis of the vertical synchronization signal or the synchronization packet included in the transmission image data TrD transmitted from the image transmitter 100 has been described. However, the present invention is not limited to a configuration in which the reception time of captured image data is measured on the basis of the vertical synchronization signal or the synchronization packet described in the first embodiment. For example, the data generation unit 103 provided in the image transmitter 100 may be configured to generate captured image data for wireless transfer of one frame including information indicating a start position (a head position) of the captured image data after the vertical synchronization signal and output the generated captured image data to the communication unit 104. In this case, the measurement unit 203 provided in the image receiver 200 can measure a time until the information indicating the start position of the captured image data is input from the communication unit 201 as the reception time of the captured image data after the measurement of the elapsed time is started. Also, for example, the data generation unit 103 provided in the image transmitter 100 may be configured to further generate a captured image data start packet indicating the start of the captured image data of one frame in addition to the synchronization packet and output the generated captured image data start packet to the communication unit 104 immediately after the synchronization packet is output to the communication unit 104 and at a timing immediately before a first image data packet is output to the communication unit 104. In this case, the measurement unit 203 provided in the image receiver 200 can measure a time until the captured image data start packet is input from the communication unit 201 after the measurement of the elapsed time is started as the reception time of the captured image data.

Second Embodiment

Figure 21:
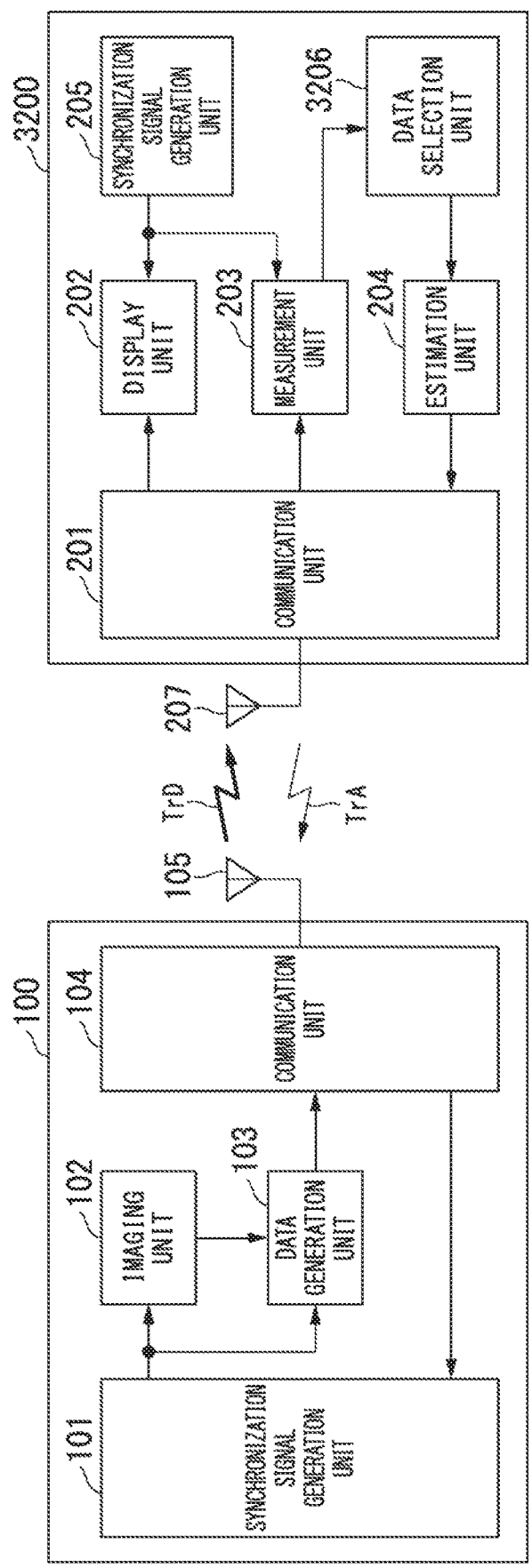
FIG. 21 is a block diagram showing a schematic configuration of an image transfer system according to a second embodiment of the present invention.

Hereinafter, an image transfer system according to a second embodiment of the present invention will be described. FIG. 21 is a block diagram showing a schematic configuration of the image transfer system according to the second embodiment of the present invention. An image transfer system 3 includes an image transmitter 100 and an image receiver 3200. The image transmitter 100 includes a synchronization signal generation unit 101, an imaging unit 102, a data generation unit 103, a communication unit 104, and an antenna 105. Also, the image receiver 3200 includes a communication unit 201, a display unit 202, a measurement unit 203, an estimation unit 204, a synchronization signal generation unit 205, a data selection unit 3206, and an antenna 207.

The image transfer system 3 has a configuration in which the data selection unit 206 provided in the image receiver 200 constituting the image transfer system 1 of the first embodiment shown in FIG. 2 is replaced with the data selection unit 3206. Accordingly, in the image transfer system 3, the image receiver 200 constituting the image transfer system 1 of the first embodiment is replaced with the image receiver 3200. In the following description, the components of the image transfer system 3 similar to those of the image transfer system 1 of the first embodiment are denoted by the same reference signs for description.

The image transfer system 3 is different from the image transfer system 1 of the first embodiment in terms of a method of selecting selection data to be selected to calculate an adjustment instruction signal for issuing an instruction for adjusting a cycle or a phase of the vertical synchronization signal, i.e., a cycle adjustment instruction signal γ and a phase adjustment instruction signal δ. More specifically, a method of selecting selection data in the data selection unit 3206 provided in the image receiver 3200 constituting the image transfer system 3 is different from a method of selecting selection data in the data selection unit 206 provided in the image receiver 200 constituting the image transfer system 1 of the first embodiment.

Also, operations or processes of the other components in the image transfer system 3 are similar to those of the components of the image transfer system 1 of the first embodiment. In other words, operations or processes of the image transmitter 100 constituting the image transfer system 3 and operations or processes of the components other than the data selection unit 3206 provided in the image receiver 3200 constituting the image transfer system 3 are similar to those of the corresponding components in the image transfer system 1 of the first embodiment. Accordingly, in the description of the image transfer system 3, only operations or processes of components different from those of the image transfer system 1 of the first embodiment, i.e., the data selection unit 3206, will be described, and a detailed description of operations or processes of the other components will be omitted.

Similar to the data selection unit 206 provided in the image receiver 200 in the image transfer system 1 of the first embodiment, the data selection unit 3206 outputs selection data selected from information of a predetermined number of reception times associated with information of captured image data orders output from the measurement unit 203 to the estimation unit 204. In other words, similar to the data selection unit 206, the data selection unit 3206 outputs information of each of a minimum reception time, a minimum change reception time, and captured image data orders corresponding, to the minimum reception time and the minimum change reception time as selection data to the estimation unit 204.

However, the data selection unit 3206 selects a reception time which does not exceed a predetermined time range from a reception time of an immediately previous vertical synchronization signal as the minimum change reception time on the basis of information of a predetermined number of reception times associated with information of captured image data orders output from the measurement unit 203. In other words, the data selection unit 3206 selects captured image data transmitted in the predetermined time range from previously transmitted captured image data.

Figure 22:
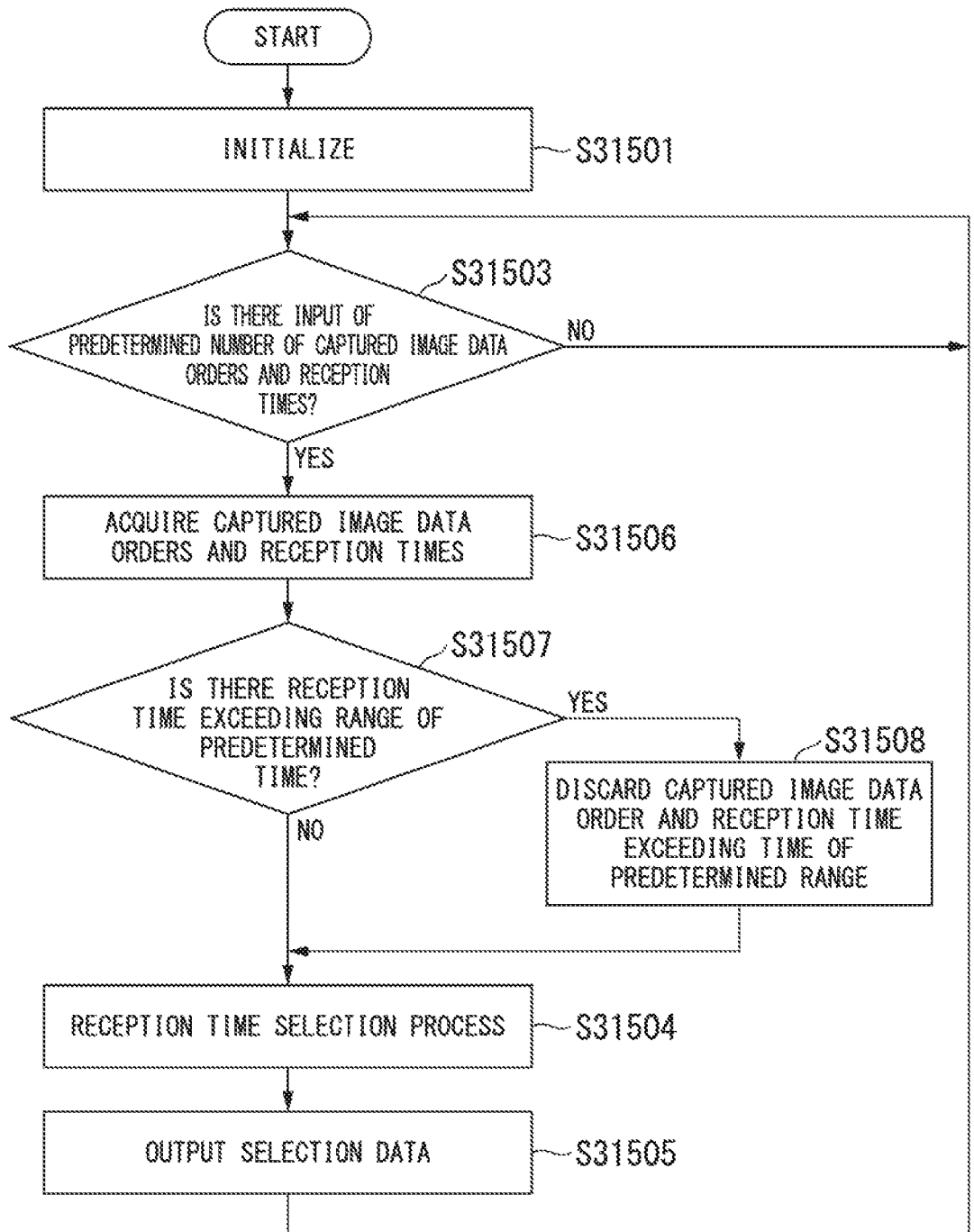
FIG. 22 is a flowchart showing a processing procedure of a data selection unit provided in an image receiver constituting the image transfer system according to the second embodiment of the present invention.

Here, the operation of the data selection unit 3206 provided in the image receiver 3200 will be described. FIG. 22 is a flowchart showing a processing procedure of the data selection unit 3206 provided in the image receiver 3200 constituting the image transfer system 3 according to the second embodiment of the present invention. The data selection unit 3206 selects information of each piece of selection data from information of a predetermined number of reception times associated with information of captured image data orders in the following processing procedure.

When the image receiver 3200 is activated, the data selection unit 3206 first initializes the components within the data selection unit 3206 (step S31501).

Subsequently, the data selection unit 3206 checks whether or not there is an input of information of a predetermined number of reception times associated with information of captured image data orders from the measurement unit 203 (step S31503). If a result of the checking in step S31503 indicates that there is no input of information of a predetermined number of reception times associated with information of captured image data orders ("NO" in step S31503), the data selector unit 3206 returns to step S31503 to wait for the information of the predetermined number of reception times associated with the information of the captured image data orders to be input.

On the other hand, if a result of the checking in step S31503 indicates that there is an input of information of a predetermined number of reception times associated with information of the captured image data orders ("YES" in step S31503), the data selection unit 3206 acquires the information of the predetermined number of reception times associated with the information of the captured image data orders output from the measurement unit 203 (step S31506).

Subsequently, the data selection unit 3206 determines whether or not there is a reception time exceeding a predetermined time range for each piece of the information of the predetermined number of reception times associated with the information of the captured image data orders acquired in step S31506 (step S31507).

Here, a determination of whether or not there is a reception time exceeding the predetermined time range in the data selection unit 3206 is performed, for example, as follows. First, the data selection unit 3206 sequentially sets the information of the predetermined number of reception times associated with the information of the captured image data orders acquired in step S31506 as the reference reception time. Then, the data selection unit 3206 calculates a time of a difference between the reference reception time and a reception time associated with information of a captured image data order next to the captured image data order associated with the reference reception time. Then, if the calculated difference time is shorter than a predetermined time, the data selection unit 3206 determines that currently determined captured image data is captured image data transmitted within the predetermined time from the captured image data transmitted at the reference reception time and assumes information of a reception time and information of a captured image data order corresponding to the captured image data as information of the predetermined time range. On the other hand, if the calculated difference time is longer than or equal to the predetermined time, the data selection unit 3206 determines that the currently determined captured image data is captured image data which is a predetermined time later than the captured image data transmitted at the reference reception time, i.e., which is transmitted over a long time, and assumes information of a reception time and information of a captured image data order corresponding to the captured image data as information outside the predetermined time range.

If a result of the determination in step S31507 indicates that there is no reception time exceeding the predetermined time range ("NO" in step S31507), the data selection unit 3206 proceeds to step S31504.

On the other hand, if a result of the determination in step S31507 indicates that there is a reception time exceeding the predetermined time range ("YES" in step S31507), the data selection unit 3206 discards information of the reception time exceeding the predetermined time range and information of a captured image data order associated with the reception time from the information of the predetermined number of reception times associated with the information of the captured imaged data orders acquired in step S31506 (step S31508). Then, the data selection unit 3206 proceeds to step S31504.

Subsequently, as the result of the determination in step S31507, the data selection unit 3206 performs a reception time selection process of selecting each piece of information of the minimum reception time and a captured image data order corresponding thereto and information of the minimum change reception time and a captured image data order corresponding thereto on the basis of information of a reception time determined to be information of the predetermined time range and information of a captured image data order associated with the information of the reception time (step S31504). The reception time selection process in step S31504 is similar to the reception time selection process of step S1504 in the data selection unit 206 provided in the image receiver 200 constituting the image transfer system 1 of the first embodiment shown in FIG. 17, except that information of a reception time associated with information of a captured image data order for use in the process is different.

Subsequently, the data selection unit 3206 outputs information of each of the minimum reception time, the captured image data order corresponding to the minimum reception time, the minimum change reception time, and the captured image data order corresponding to the minimum change reception time selected in the reception time selection process in step S31504 as selection data to the estimation unit 204 (step S31505). Thereafter, the data selection unit 3206 returns to step S31503 to iterate the selection of the next minimum reception time, the captured image data order corresponding to the next minimum reception time, the next minimum change reception time, and the captured image data order corresponding to the next minimum change reception time and the output of the next selection data to the estimation unit 204 based on the information of the predetermined number of reception times associated with the information of the captured image data orders output from the measurement unit 203 thereafter.

According to such processing, the data selection unit 3206 selects a reception time which does not exceed a predetermined time range and a captured image data order from the information of the predetermined number of reception times associated with the information of the captured image data orders output from the measurement unit 203, further selects the minimum reception time, the minimum change reception time, and the captured image data order corresponding to each reception time from the selected information, and outputs a selection result as selection data to the estimation unit 204.

Then, in the image transfer system 3, as in the image transfer system 1 of the first embodiment, a cycle or a phase of a vertical synchronization signal when the image transmitter 100 captures an image is adjusted on the basis of the selection data output by the data selection unit 3206.

As described above, in the image transfer system 3 of the second embodiment, as in the image transfer system 1 of the first embodiment, the image receiver 3200 estimates a deviation of the cycle or the phase due to a cause other than a delay of wireless transfer of the vertical synchronization signal when the image transmitter 100 captures an image on the basis of the vertical synchronization signal or a synchronization packet included in a predetermined number of pieces of transmission image data TrD transmitted from the image transmitter 100 after the wireless connection between the image transmitter 100 and the image receiver 3200 is established. In the image transfer system 3 of the second embodiment, as in the image transfer system 1 of the first embodiment, the image receiver 3200 transmits an adjustment instruction signal TrA for adjusting the deviation of the cycle or the phase of the vertical synchronization signal generated by the image transmitter 100 to the image transmitter 100 on the basis of the estimated cycle or phase.

Thereby, in the image transfer system 3 of the second embodiment, as in the image transfer system 1 of the first embodiment, it is possible to adjust the deviation of the cycle or the phase of the vertical synchronization signal generated by the image transmitter 100 without performing unnecessary timing adjustment of the vertical synchronization signal by sensitively reacting to a sudden change in an arrival time of the transmission image data TrD in wireless transfer as in the conventional image transfer system. In other words, in the image transfer system 3 of the second embodiment, as in the image transfer system 1 of the first embodiment, the cycle or the phase of the vertical synchronization signal is synchronized in the image transmitter 100 and the image receiver 3200 and the image receiver 3200 can cause a display image according to captured image data included in the transmission image data TrD transmitted after imaging performed by the image transmitter 100 to be stably displayed.

Moreover, the image transfer system 3 of the second embodiment selects information of the reception time and information of the captured image data order corresponding to the captured image data transmitted in the predetermined time range from the previously transmitted captured image data. Thereby, the image transfer system 3 of the second embodiment can prevent a deviation of a cycle or a phase of the vertical synchronization signal when the image transmitter 100 captures an image from being estimated as a deviation greater than magnitude of a normally assumed deviation. Thereby, the image transfer system 3 of the second embodiment can improve the quality of adjustment of the deviation the cycle or the phase of the vertical synchronization signal and more appropriately adjust the deviation of the cycle or the phase of the vertical synchronization signal.

Third Embodiment

Figure 23:
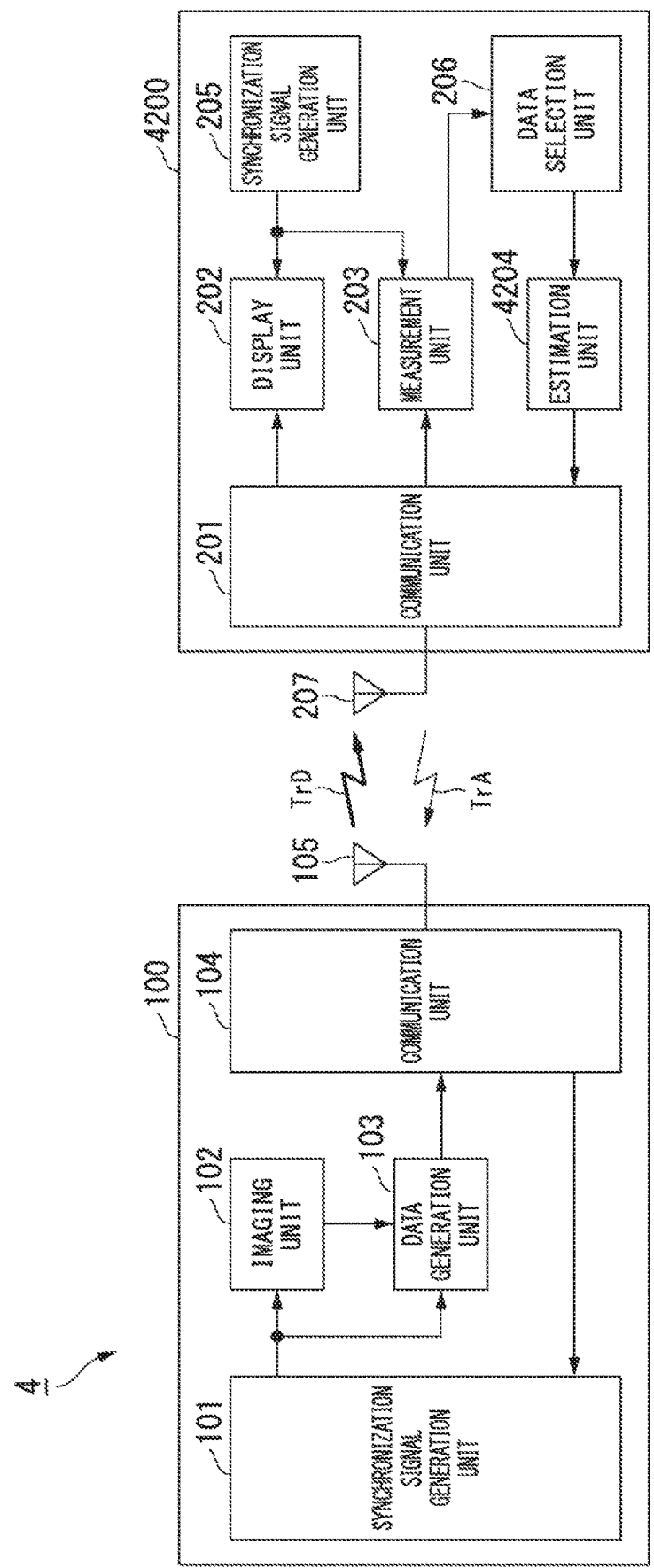
FIG. 23 is a block diagram showing a schematic configuration of an image transfer system according to a third embodiment of the present invention.

Hereinafter, an image transfer system according to a third embodiment of the present invention will be described. FIG. 23 is a block diagram showing a schematic configuration of an image transfer system according to the third embodiment of the present invention. An image transfer system 4 includes an image transmitter 100 and an image receiver 4200. The image transmitter 100 includes a synchronization signal generation unit 101, an imaging unit 102, a data generation unit 103, a communication unit 104, and an antenna 105. Also, the image receiver 4200 includes a communication unit 201, a display unit 202, a measurement unit 203, an estimation unit 4204, a synchronization signal generation unit 205, a data selection unit 206, and an antenna 207.

The image transfer system 4 has a configuration in which the estimation unit 204 provided in the image receiver 200 constituting the image transfer system 1 of the first embodiment shown in FIG. 2 is replaced with the estimation unit 4204. Accordingly, in the image transfer system 4, the image receiver 200 constituting the image transfer system 1 of the first embodiment is replaced with the image receiver 4200. In the following description, the components of the image transfer system 4 similar to those of the image transfer system 1 of the first embodiment are denoted by the same reference signs for description.

If a deviation of synchronization of the estimated vertical synchronization signal falls within an error range of a reference clock signal generated by a crystal oscillation IC provided in the image transmitter 100 after a deviation of a cycle or a phase due to a cause other than a delay of wireless transfer of the vertical synchronization signal when the image transmitter 100 captures an image is estimated, the image transfer system 4 transmits an adjustment instruction signal for issuing an instruction for adjusting the cycle or the phase of the vertical synchronization signal to the image transmitter 100. Thus, the image transfer system 4 is different from the image transfer system 1 of the first embodiment in tennis of an adjustment instruction signal for issuing an instruction for adjusting of the cycle or the phase of the vertical synchronization signal to be transmitted to the image transmitter 100, i.e., a cycle adjustment instruction signal γ and a phase adjustment instruction signal δ.

More specifically, the estimation unit 4204 provided in the image receiver 4200 constituting the image transfer system 4 is different from the estimation unit 204 provided in the image receiver 200 constituting the image transfer system 1 of the first embodiment in that a process of determining whether or not to transmit the adjustment instruction signal for issuing an instruction for adjusting the cycle or the phase of the vertical synchronization signal via the communication unit 201 and the antenna 207 to the image transmitter 100, i.e., whether or not to output the adjustment instruction signal to the communication unit 201, is added.

Also, operations or processes of the other components in the image transfer system 4 are similar to those of the components of the image transfer system 1 of the first embodiment. In other words, operations or a processes of the image transmitter 100 constituting the image transfer system 4 and operations or processes of the components other than the estimation unit 4204 provided in the image receiver 4200 constituting the image transfer system 4 are similar to those of the corresponding components in the image transfer system 1 of the first embodiment. Accordingly, in the description of the image transfer system 4, only operations or processes of components different from those of the image transfer system 1 of the first embodiment, the estimation unit 4204, will be described, and a detailed description of operations or processes of the other components will be omitted.

Similar to the estimation unit 204 provided in the image receiver 200 in the image transfer system 1 of the first embodiment, the estimation unit 4204 estimates a cycle or a phase of a vertical synchronization signal indicating a timing at which the image transmitter 100 has captured an image with the imaging unit 102 on the basis of selection data output from the data selection unit 206.

However, the estimation unit 4204 calculates the adjustment instruction signal for adjusting the cycle or the phase of the vertical synchronization signal generated by the synchronization signal generation unit 101 provided in the image transmitter 100 thereafter on the basis of the estimated cycle or phase of the vertical synchronization signal and outputs the calculated adjustment instruction signal to the communication unit 201 as in the estimation unit 204 only when the estimated cycle of the vertical synchronization signal is in an error range of the reference clock signal generated by the crystal oscillation IC provided in the image transmitter 100.

Thereby, the adjustment instruction signal TrA is wirelessly transferred to the image transmitter 100 via the antenna 207 by the communication unit 201, and the image transmitter 100 adjusts the cycle or the phase of the vertical synchronization signal when the imaging unit 102 captures an image thereafter in the error range of the reference clock signal in the synchronization signal generation unit 101 in accordance with the adjustment instruction signal TrA transmitted from the image receiver 200.

Figure 24:
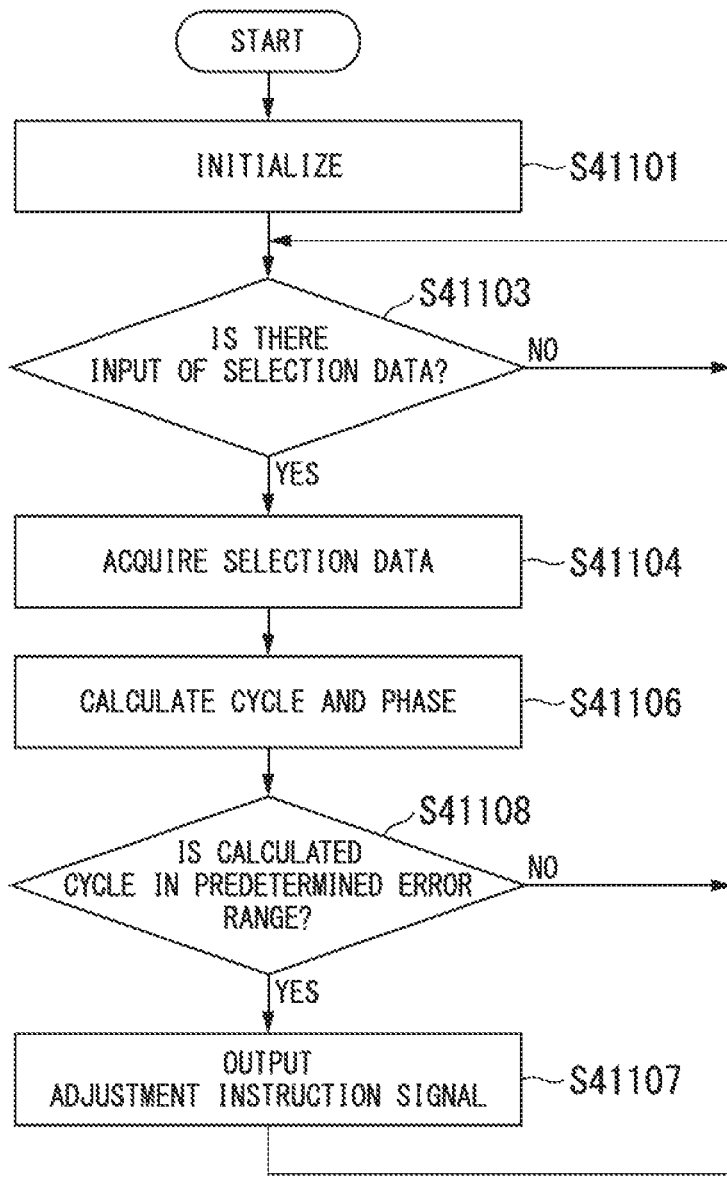
FIG. 24 is a flowchart showing a processing procedure of an estimation unit provided in an image receiver constituting the image transfer system according to the third embodiment of the present invention.

Here, an operation of the estimation unit 4204 provided in the image receiver 4200 will be described. FIG. 24 is a flowchart showing a processing procedure of the estimation unit 4204 provided in the image receiver 4200 constituting the image transfer system 4 according to the third embodiment of the present invention. In the following processing procedure, the estimation unit 4204 estimates the cycle or the phase of the vertical synchronization signal when the imaging unit 102 provided in the image transmitter 100 captures an image on the basis of the selection data and determines whether or not to transmit the adjustment instruction signal for adjusting the estimated cycle or phase of the vertical synchronization signal to the communication unit 201, i.e., the image transmitter 100.

When the image receiver 4200 is activated, the estimation unit 4204 first initializes the components within the estimation unit 4204 (step S41101).

Subsequently, the estimation unit 4204 checks whether there is an input of selection data from the data selection unit 206 (step S41103). If a result of the checking in step S41103 indicates that there is no input of selection data ("NO" in step S41103), the estimation unit 4204 returns to step S41103 to wait for the selection data to be input.

On the other hand, if a result of the checking in step S41103 indicates that there is an input of selection data ("YES" in step S41103), the estimation unit 4204 acquires the selection data output from the data selection unit 206 (step S41104).

Subsequently, the estimation unit 4204 calculates the cycle and the phase of the vertical synchronization signal when the image transmitter 100 captures an image with the imaging unit 102 on the basis of the selection data acquired in step S41104 (step S41106). In other words, the estimation unit 4204 calculates a cycle α and a phase β on the basis of information of each of a minimum reception time and a minimum change reception tune and a captured image data order corresponding to each reception time included in the selection data output from the data selection unit 2061. A method of calculating the cycle α and the phase β in this step S41106 is similar to the method of calculating the cycle and the phase of the vertical synchronization signal of the step S1106 in the estimation unit 204 provided in the image receiver 200 constituting the image transfer system 1 of the first embodiment shown in FIG. 18.

Subsequently, the estimation unit 4204 determines whether or not the cycle α calculated in step S41106 is a cycle in a predetermined error range (step S41108). Here, the predetermined error range is an error range of the reference clock signal generated in the crystal oscillation IC provided in the image transmitter 100 (for example, several ppm).

If a result of the determination in step S41108 indicates that the calculated cycle α is not a cycle in the predetermined error range, i.e., that the calculated cycle α is a cycle exceeding the predetermined error range ("NO" in step S41108), the estimation unit 4204 returns to step S41103 to wait for the next selection data to be input.

On the other hand, if a result of the determination in step S41108 indicates that the calculated cycle α is a cycle in a predetermined error range, i.e., that the calculated cycle α is not a cycle exceeding a predetermined error range ("YES" in step S41108), the estimation unit 4204 calculates each of the cycle adjustment instruction signal γ and the phase adjustment instruction signal δ for issuing an instruction for adjusting the vertical synchronization signal on the basis of the cycle α and the phase β calculated in step S41106. Then, the estimation unit 4204 outputs information of each of the calculated cycle adjustment instruction signal γ and phase adjustment instruction signal δ as an adjustment instruction signal to the communication unit 201 (step S41107). A method of calculating the cycle adjustment instruction signal γ and the phase adjustment instruction signal δ in this step S41107 is similar to the method of calculating the cycle adjustment instruction signal γ and the phase adjustment instruction signal δ of step S1107 in the estimation unit 204 provided in the image receiver 200 constituting the image transfer system 1 of the first embodiment shown in FIG. 18. Thereafter, the estimation unit 4204 returns to the step S41103 and iterates the calculation of each of the cycle adjustment instruction signal γ and the phase adjustment instruction signal δ for issuing an instruction for adjusting the next vertical synchronization signal on the basis of the selection data output from the data selection unit 206 thereafter and the output of the next adjustment instruction signal to the communication unit 201.

According to such processing, the estimation unit 4204 estimates the cycle and the phase of the vertical synchronization signal when the imaging unit 102 provided in the image transmitter 100 captures an image on the basis of the selection data output from the data selection unit 206. Then, the estimation unit 4204 outputs an adjustment instruction signal for issuing an instruction for adjusting the cycle or the phase of the vertical synchronization signal when the image transmitter 100 captures an image with the imaging unit 102 to the communication unit 201 on the basis of the estimated cycle or phase only when the estimated cycle is a cycle in the predetermined error range.

Thereby, in the image transfer system 4, the communication unit 201 transmits the adjustment instruction signal TrA including the adjustment instruction signal output from the estimation unit 4204 to the image transmitter 100, and the cycle and the phase of the vertical synchronization signal when the image transmitter 100 captures an image with the imaging unit 102 are adjusted in the error range of the reference clock signal generated by the crystal oscillation IC provided in the image transmitter 100.

As described above, in the image transfer system 4 of the third embodiment, as in the image transfer system 1 of the first embodiment, the image receiver 4200 estimates a deviation of the cycle or the phase due to a cause other than a delay of wireless transfer of the vertical synchronization signal when the image transmitter 100 captures an image on the basis of the vertical synchronization signal or a synchronization packet included in a predetermined number of pieces of transmission image data TrD transmitted from the image transmitter 100 after the wireless connection between the image transmitter 100 and the image receiver 4200 is established. In the image transfer system 4 of the third embodiment, as in the image transfer system 1 of the first embodiment, the image receiver 4200 transmits an adjustment instruction signal TrA for adjusting the deviation of the cycle or the phase of the vertical synchronization signal generated by the image transmitter 100 to the image transmitter 100 on the basis of the estimated cycle or phase.

Thereby, in the image transfer system 4 of the third embodiment, as in the image transfer system 1 of the first embodiment, unnecessary timing adjustment of the vertical synchronization signal is not performed and the cycle or the phase of the vertical synchronization signal is synchronized in the image transmitter 100 and the image receiver 4200, so that the image receiver 4200 can cause a display image according to captured image data included in the transmission image data TrD transmitted after imaging performed by the image transmitter 100 to be stably displayed.

However, the image transfer system 4 of the third embodiment adjusts the deviation of the cycle or the phase of the vertical synchronization signal only when the estimated cycle of the vertical synchronization signal falls in the error range of the reference clock signal generated by the crystal oscillation IC provided in the image transmitter 100. In other words, the image transfer system 4 according to the third embodiment does not adjust the deviation of the cycle or the phase of the vertical synchronization signal if the estimated cycle of the vertical synchronization signal exceeds the error range of the reference clock signal generated by the crystal oscillation IC provided in the image transmitter 100. Thereby, in the image transfer system 4 of the third embodiment, the deviation of the cycle or the phase of the vertical synchronization signal when the image transmitter 100 captures an image is adjusted in an error range of the reference clock signal generated by the crystal oscillation IC provided in the image transmitter 100. In other words, the image transfer system 4 of the third embodiment can prevent an unnecessarily larger deviation of the cycle or the phase from being adjusted. Thereby the image transfer system 4 of the third embodiment can improve the quality of adjustment of the deviation of the cycle or the phase of the vertical synchronization signal and more appropriately adjust the deviation of the cycle or the phase of the vertical synchronization signal.

Fourth Embodiment

Figure 25:
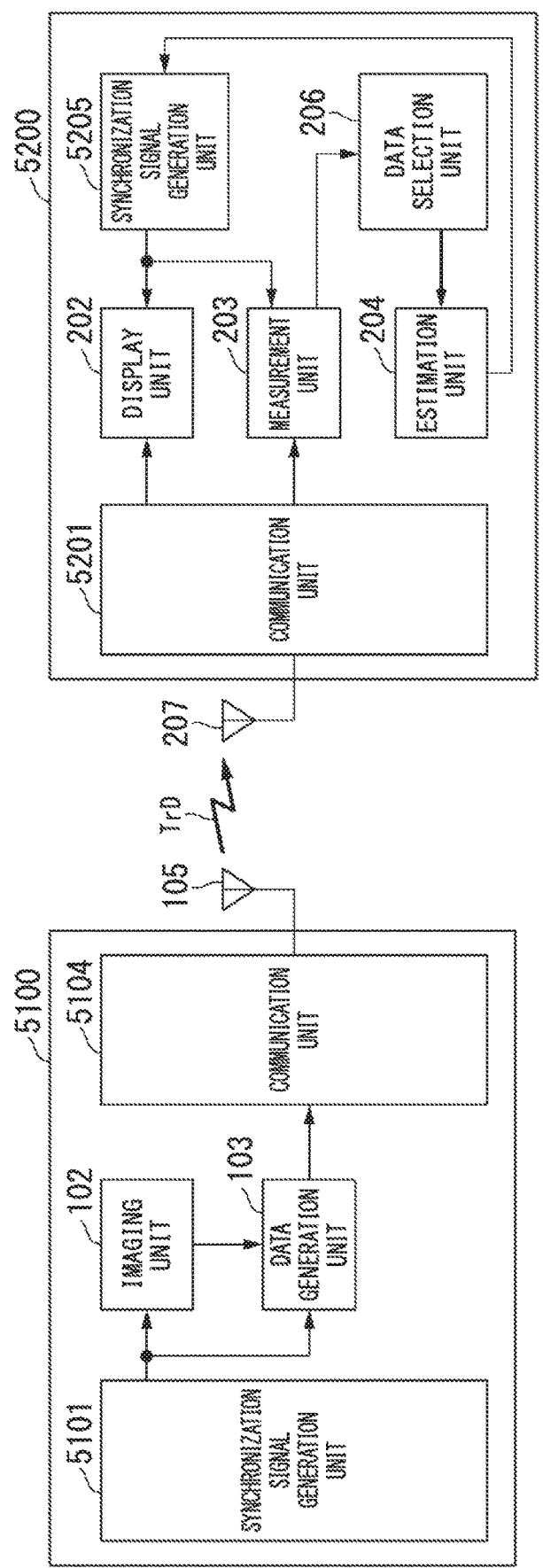
FIG. 25 is a block diagram showing a schematic configuration of an image transfer system according to a fourth embodiment of the present invention.

Hereinafter, an image transfer system according to a fourth embodiment of the present invention will be described. FIG. 25 is a block diagram showing a schematic configuration of the image transfer system according to the fourth embodiment of the present invention. An image transfer system 5 includes an image transmitter 5100 and an image receiver 5200. The image transmitter 5100 includes a synchronization signal generation unit 5101, an imaging unit 102, a data generation unit 103, a communication unit 5104, and an antenna 105. Also, the image receiver 5200 includes a communication unit 5201, a display unit 202, a measurement unit 203, an estimation unit 204, a synchronization signal generation unit 5205, a data selection unit 206, and an antenna 207.

In the image transfer system 5, the synchronization signal generation unit 101 provided in the image transmitter 100 constituting the image transfer system 1 of the first embodiment shown in FIG. 2 is replaced with the synchronization signal generation unit 5101, the communication unit 104 is replaced with the communication unit 5104, the communication unit 201 provided in the image receiver 200 is replaced with the communication unit 5201, and the synchronization signal generation unit 205 is replaced with the synchronization signal generation unit 5205. Accordingly, in the image transfer system 5, the image transmitter 100 constituting the image transfer system 1 of the first embodiment is replaced with the image transmitter 5100, and the image receiver 200 is replaced with the image receiver 5200. In the following description, the components of the image transfer system 5 similar to those of the image transfer system 1 of the first embodiment are denoted by the same reference sighs for description.

In the image transfer system 1 of the first embodiment, the synchronization signal generation unit 101 provided in the image transmitter 100 adjusts the cycle or the phase of the vertical synchronization signal to be generated. More specifically, in the image transfer system 1 according to the first embodiment, the estimation unit 204 provided in the image receiver 200 transmits the adjustment instruction signal calculated by estimating the cycle or the phase of the vertical synchronization signal to the image transmitter 100 via the communication unit 201 and the antenna 207 and the synchronization signal generation unit 101 provided in the image transmitter 100 adjusts the cycle or the phase of the vertical synchronization signal in accordance with the adjustment instruction signal transmitted from the image receiver 200. On the other hand, the image transfer system 5 has a configuration in which the synchronization signal generation unit 5205 provided in the image receiver 5200 adjusts the cycle or the phase of the generated display timing signal in accordance with the adjustment instruction signal calculated by the estimation unit 204 estimating the cycle or the phase of the vertical synchronization signal. Therefore, the image transfer system 5 is different from the image transfer system 1 of the first embodiment in terms of an output destination of the adjustment instruction signal output by the estimation unit 204, i.e., the cycle adjustment instruction signal γ and the phase adjustment instruction signal δ.

More specifically, the estimation unit 204 provided in the image receiver 5200 constituting the image transfer system 5 is different from that of the image transfer system 1 of the first embodiment in that an adjustment instruction signal for issuing an instruction for adjusting the cycle or the phase of the vertical synchronization signal is output to the synchronization signal generation unit 5205 without being output to the communication unit 5201.

Also, operations or processes of the other components in the image transfer system 5 are similar to those of the components of the image transfer system 1 of the first embodiment. In other words, operations or processes of components other than the synchronization signal generation unit 5101 and the communication unit 5104 provided in the image transmitter 5100 constituting the image transfer system 5 and operations or processes of components other than the communication unit 5201 and the synchronization signal generation unit 5205 provided in the image receiver 5200 constituting the image transfer system 5 are similar to those of the corresponding components in the image transfer system 1 of the first embodiment. Accordingly, in the description of the image transfer system 5, only operations or processes of components different from those of the image transfer system 1 of the first embodiment, i.e., the synchronization signal generation unit 5101 and the communication unit 5104 provided in the image transmitter 5100 and the communication unit 5201 and the synchronization signal generation unit 5205 provided in the image receiver 5200, will be described and a detailed description of operations or processes of the other components will be omitted.

Similar to the synchronization signal generation unit 101 provided in the image transmitter 100 in the image transfer system 1 of the first embodiment, the synchronization signal generation unit 5101 generates a vertical synchronization signal when the imaging unit 102 captures an image on the basis of a reference clock signal generated by a crystal oscillation IC (not shown) provided in the image transmitter 5100, and outputs the generated vertical synchronization signal to each of the imaging unit 102 and the data generation unit 103.

However, as described above, in the image transfer system 5, the synchronization signal generation unit 5101 does not adjust the cycle or the phase of the vertical synchronization signal, so the synchronization signal generation unit 5101 generates a vertical synchronization signal of a predetermined cycle or phase based on the reference clock signal generated by the crystal oscillation IC (not shown). Also, similar to the synchronization signal generation unit 101, the synchronization signal generation unit 5101 may be configured to include the crystal oscillation IC (not shown) that generates the reference clock signal.

Similar to the communication unit 104 provided in the image transmitter 100 in the image transfer system 1 of the first embodiment, the communication unit 5104 transmits captured image data for wireless transfer output from the data generation unit 103 to the image receiver 5200 via the antenna 105 as transmission image data TrD to be transferred by wireless transfer based on a wireless connection established with the image receiver 5200. However, as described above, in the image transfer system 5, the instruction for adjusting the cycle or the phase of the vertical synchronization signal is not received because the synchronization signal generation unit 5101 does not adjust the cycle or the phase of the vertical synchronization signal.

Similar to the communication unit 201 provided in the image receiver 200 in the image transfer system 1 of the first embodiment, the communication unit 5201 transmits the transmission image data TrD transmitted from the image transmitter 5100 via the antenna 207. Similar to the communication unit 201, the communication unit 5201 outputs the captured image data included in the received transmission image data TrD to the display unit 202, and outputs the vertical synchronization signal to the measurement unit 203. However, as described above, in the image transfer system 5, the instruction for adjusting the cycle or the phase of the vertical synchronization signal is not transmitted because the synchronization signal generation unit 5101 does not adjust the cycle or the phase of the vertical synchronization signal.

Similar to the synchronization signal generation unit 205 included in the image receiver 200 in the image transfer system 1 of the first embodiment, the synchronization signal generation unit 5205 generates a display timing signal for causing a display image according to captured image data transmitted from the image transmitter 5100 to be displayed on the basis of a reference clock signal generated by the crystal oscillation IC (not shown) provided in the image receiver 5200. At this time, if an instruction for adjusting the cycle or the phase of the vertical synchronization signal is input from the estimation unit 204, the synchronization signal generation unit 5205 generates a display timing signal obtained by correcting the cycle or the phase in accordance with the input adjustment instruction. Then, similar to the synchronization signal generation unit 205, the synchronization signal generation unit 5205 outputs the generated display timing signal to each of the display unit 202 and the measurement unit 203. Also, similar to the synchronization signal generation unit 205, the synchronization signal generation unit 5205 may be configured to include the crystal oscillation IC (not shown) that generates the reference clock signal.

According to such a configuration, in the image transfer system 5, the synchronization signal generation unit 5205 adjusts the cycle or the phase of the generated display timing signal in accordance with the adjustment instruction signal output by the estimation unit 204.

Figure 26:
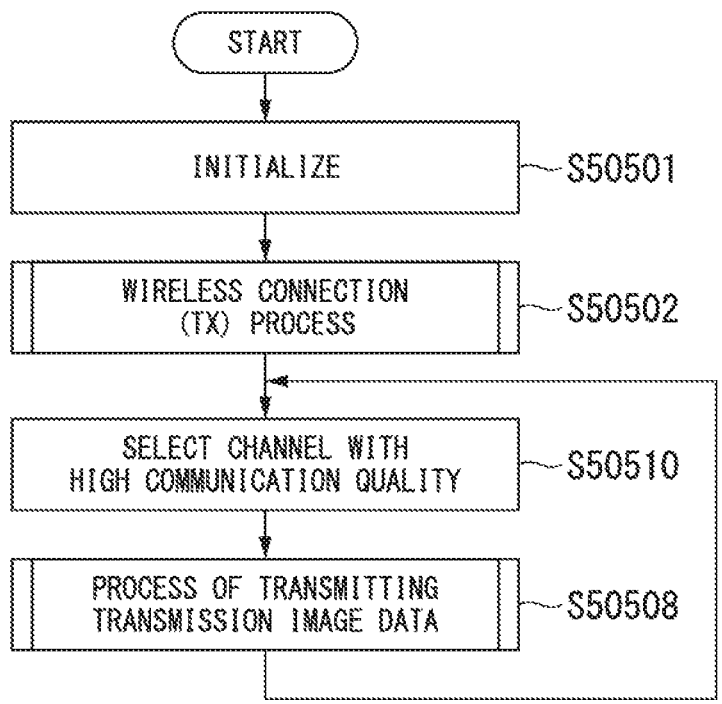
FIG. 26 is a flowchart showing a processing procedure of a communication unit provided in an image transmitter constituting the image transfer system according to the fourth embodiment of the present invention.

Next, the operation of each component constituting the image transfer system 5 will be described. First, the operation of the communication unit 5104 provided in the image transmitter 5100 constituting the image transfer system 5 will be described. FIG. 26 is a flowchart showing a processing procedure of the communication unit 5104 provided in the image transmitter 5100 constituting the image transfer system 5 according to the fourth embodiment of the present invention. The communication unit 5104 transmits captured image data for wireless transfer to the image receiver 5200 in the following processing procedure.

When the image transmitter 5100 is activated, the communication unit 5104 first initializes the components within the communication unit 5104 (step S50501).

Subsequently, the communication unit 5104 performs a wireless connection (TX) process on the wireless communication channel with the image receiver 5200 (more specifically, the communication unit 5201 provided in the image receiver 5200) via the antenna 105 (step S50502). The wireless connection (TX) process in step S50502 is similar to the wireless connection (TX) process of step S502 in the communication unit 104 provided in the image transmitter 100 constituting the image transfer system 1 of the first embodiment shown in FIG. 8, i.e., the wireless connection (TX) process shown in FIG. 10. Accordingly, a detailed description of the processing procedure of the wireless connection (TX) process to be performed by the communication unit 5104 in step S50502 will be omitted.

Subsequently, after a wireless connection with the communication unit 5201 is established, the communication unit 5104 selects a good (relatively good) communication channel from among currently available channels (free channels) (step S50510).

Subsequently, the communication unit 5104 performs a transmission image data TrD transmission process of wirelessly transferring the captured image data for wireless transfer output from the data generation unit 103 to the communication unit 5201 via the antenna 105 by using the selected wireless communication channel (step S50508). The transmission image data TrD transmission process in this step S50508 is similar to the transmission image data TrD transmission process of step S508 in the communication unit 104 provided in the image transmitter 100 constituting the image transfer system 1 of the first embodiment shown in FIG. 8, i.e., the transmission image data TrD transmission process shown in FIG. 9. Accordingly, a detailed description of the processing procedure of the transmission image data TrD transmission process to be performed by the communication unit 5104 in step S50508 will be omitted.

According to such processing, the communication unit 5104 iterates the process of wirelessly transferring the captured image data for wireless transfer output from the data generation unit 103 as the transmission image data TrD.

Figure 27:
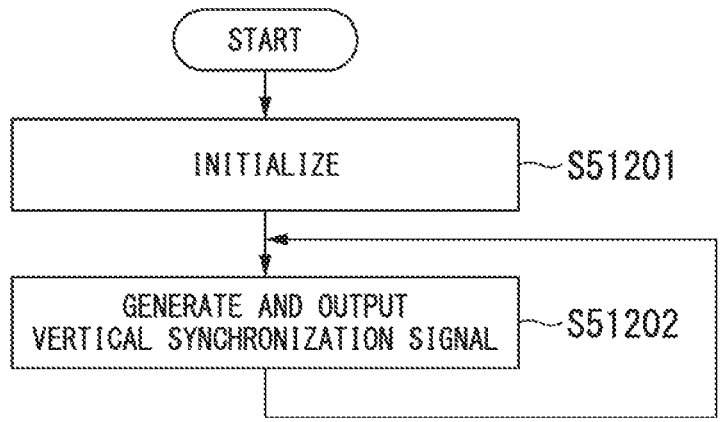
FIG. 27 is a flowchart showing a processing procedure of a synchronization signal generation unit provided in the image transmitter constituting the image transfer system according to the fourth embodiment of the present invention.

Next, the operation of the synchronization signal generation unit 5101 provided in the image transmitter 5100 will be described. FIG. 27 is a flowchart showing a processing procedure of the synchronization signal generation unit 5101 provided in the image transmitter 5100 constituting the image transfer system 5 according to the fourth embodiment of the present invention. The synchronization signal generation unit 5101 generates and outputs a vertical synchronization signal in the following processing procedure.

When the image transmitter 5100 is activated, the synchronization signal generation unit 5101 first initializes the components within the synchronization signal generation unit 5101 (step S51201).

Subsequently, the synchronization signal generation unit 5101 generates a vertical synchronization signal on the basis of the reference clock signal generated by the crystal oscillation IC (not shown) provided in the image transmitter 5100. Then, the synchronization signal generation unit 5101 outputs the generated vertical synchronization signal to each of the imaging unit 102 and the data generation unit 103 (step S51202). At this time, the vertical synchronization signal generated, and output by the synchronization signal generation unit 5101 is a vertical synchronization signal according to a setting of a predetermined cycle or phase. Then, the synchronization signal generation unit 5101 returns to step S51202 to iterate the generation of the vertical synchronization signal according to the setting of the predetermined cycle or phase and the output of the generated next vertical synchronization signal to each of the imaging unit 102 and the data generation unit 103.

According to such processing, the synchronization signal generation unit 5101 sequentially iterates the generation of the vertical synchronization signal according to the setting of the predetermined cycle and phase, and sequentially outputs the generated vertical synchronization signal to each of the imaging unit 102 and the data generation unit 103.

Figure 28:
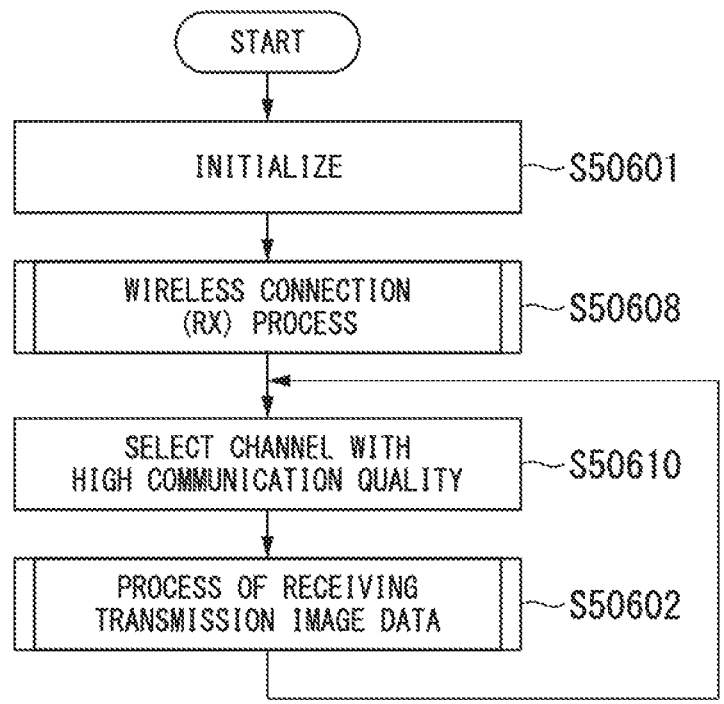
FIG. 28 is a flowchart showing a processing procedure of a communication unit provided in an image receiver constituting the image transfer system according to the fourth embodiment of the present invention.

Next, the operation of the communication unit 5201 provided in the image receiver 5200 constituting the image transfer system 5 will be described. FIG. 28 is a flowchart showing a processing procedure of the communication unit 5201 provided in the image receiver 5200 constituting the image transfer system 5 according to the fourth embodiment of the present invention. The communication unit 5201 receives the transmission image data TrD transmitted from the image transmitter 5100 in the following processing procedure, i.e., the vertical synchronization signal and the captured image data according to the setting of the predetermined cycle or phase.

When the image receiver 5200 is activated, the communication unit 5201 first initializes the components within the communication unit 5201 (step S50601).

Subsequently, the communication unit 5201 performs a wireless connection (RX) process on the wireless communication channel with the image transmitter 5100 (more specifically, the communication unit 5104 provided in the image transmitter 5100) via the antenna 207 (step S50608). The wireless connection (RX) process in this step S50608 is similar to the wireless connection (RX) process of step S608 in the communication unit 201 provided in the image receiver 200 constituting the image transfer system 1 of the first embodiment shown in FIG. 11, i.e., the wireless connection (RX) process shown in FIG. 12. Accordingly, a detailed description of the processing procedure of the wireless connection (RX) process to be performed by the communication unit 5104 in step S50608 will be omitted.

Subsequently, after a wireless connection with the communication unit 5104 is established, the communication unit 5201 selects a (relatively good) channel with high communication quality from among the currently available channels (free channels) (step S50610).

Subsequently, the communication unit 5201 performs a transmission image data TrD reception process of receiving the transmission image data TrD transmitted from the communication unit 5104 via the antenna 207 by using the selected wireless communication channel (step S50602). Thereafter, the communication unit 5201 returns to step S50610. The transmission image data TrD reception process in this step S50602 is similar to the transmission image data TrD reception process of step S602 in the communication unit 201 provided in the image receiver 200 constituting the image transfer system 1 of the first embodiment shown in FIG. 11, i.e., the transmission image data TrD reception process shop in FIG. 13. Accordingly, a detailed description of the processing procedure of the transmission image data TrD reception process to be performed by the communication unit 5201 in step S50602 will be omitted.

According to such processing, the communication unit 5201 iterates a process of receiving the transmission image data TrD transmitted from the image transmitter 5100, outputting the captured image data included in the received transmission image data TrD to the display unit 202, and outputting the vertical synchronization signal to the measurement unit 203.

Figure 29:
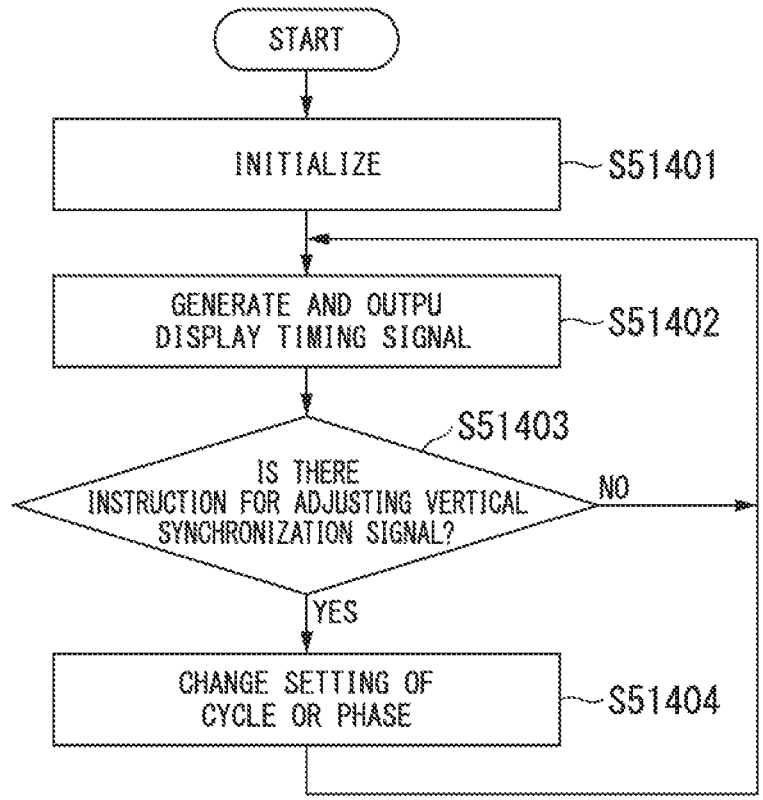
FIG. 29 is a flowchart showing a processing procedure of a synchronization signal generation unit provided in the image receiver constituting the image transfer system according to the fourth embodiment of the present invention.

Next, the operation of the synchronization signal generation unit 5205 provided in the image receiver 5200 will be described. FIG. 29 is a flowchart showing a processing procedure of the synchronization signal generation unit 5205 provided in the image receiver 5200 constituting the image transfer system 5 according to the fourth embodiment of the present invention. The synchronization signal generation unit 5205 generates and outputs a display timing signal in the following processing procedure.

When the image receiver 5200 is activated, the synchronization signal generation unit 5205 first initializes the components within the synchronization signal generation unit 5205 (step S51401).

Subsequently, the synchronization signal generation unit 5205 generates a display timing signal on the basis of a reference clock signal generated by the crystal oscillation IC (not shown) provided in the image receiver 5200. Then, the synchronization signal generation unit 5205 outputs the generated display timing signal to each of the display unit 202 and the measurement unit 203 (step S51402). At this time, the display timing signal generated and output by the synchronization signal generation unit 5205 is a display timing signal according to the setting of the predetermined cycle or phase.

Subsequently, the synchronization signal generation unit 5205 checks whether or not the adjustment instruction signal has been output from the estimation unit 204 (step S51403). In other words, the synchronization signal generation unit 5205 checks whether or not it is necessary to correct the cycle or the phase of the display timing signal to be generated.

If a result of the checking in step S51403 indicates that the adjustment instruction signal has not been output from the estimation unit 204 ("NO" in step S51403), the synchronization signal generation unit 5205 returns to step S51402 to generate the next display timing signal according to a setting of a predetermined cycle or phase and output the generated next display timing signal to each of the display unit 202 and the measurement unit 203.

On the other hand, if a result of the checking in step S51403 indicates that the adjustment instruction signal has been output from the estimation unit 204 ("YES" in step S51403), the synchronization signal generation unit 5205 changes the setting of the cycle or the phase of the display timing signal to be generated to a setting according to each of the cycle adjustment instruction signal γ and the phase adjustment instruction signal δ included in the adjustment instruction signal (step S51404). Then, the synchronization signal generation unit 5205 returns to step S51402 to iterate the generation of the next display timing signal according to the changed cycle or phase setting and the output of the generated next display timing signal to each of the display unit 202 and the measurement unit 203.

According to such processing, the synchronization signal generation unit 5205 sequentially iterates the generation of a display timing signal serving as a reference for displaying a display image corresponding to captured image data on a liquid crystal display (not shown), and outputs the generated display timing signal to each of the display unit 202 and the measurement unit 203.

Thereby, in the image transfer system 5, the synchronization signal generation unit 5205 adjusts the cycle or phase of the display timing signal to be generated in accordance with the adjustment instruction signal calculated by the estimation unit 204 estimating the cycle or the phase of the vertical synchronization signal. In other words, in the image transfer system 5, the adjustment of the cycle or the phase of the vertical synchronization signal when the imaging unit 102 provided in the image transmitter 100 captures an image as in the image transfer system 1 of the first embodiment is not performed, but the display timing signal for causing the display unit 202 provided in the image receiver 5200 to display a display image according to captured image data is adjusted in accordance with the cycle or the phase of the vertical synchronization signal when the imaging unit 102 captures an image estimated by the estimation unit 204.

Thereby, in the image transfer system 5, as in the image transfer system 1 of the first embodiment, a cycle or a phase of captured image data of a frame transmitted after imaging performed by the imaging unit 102 in the image transmitter 100 is synchronized with a cycle or a phase of a display image of each frame according to captured image data to be displayed on the display unit 202 in the image receiver 5200 after the adjustment instruction signal is output.

As described above, in the image transfer system 5 of the fourth embodiment, as in the image transfer system 1 of the first embodiment, the image receiver 5200 estimates a deviation of the cycle or the phase due to a cause other than a delay of wireless transfer of the vertical synchronization signal when the image transmitter 5100 captures an image on the basis of the vertical synchronization signal or a synchronization packet included in a predetermined number of pieces of transmission image data TrD transmitted from the image transmitter 5100 after the wireless connection between the image transmitter 5100 and the image receiver 5200 is established. In the image transfer system 5 of the fourth embodiment, deviations of the cycle or the phase of the vertical synchronization signal generated by the image transmitter 5100 and the cycle or the phase of the display timing signal generated by the image receiver 5200 are adjusted within the image receiver 5200 on the basis of the cycle or the phase estimated by the image receiver 5200.

Thereby, in the image transfer system 5 of the fourth embodiment, as in the image transfer system 1 of the first embodiment, unnecessary timing adjustment of the vertical synchronization signal is not performed and the cycle or the phase of the vertical synchronization signal are synchronized in the image transmitter 5100 and the image receiver 5200, so that the image receiver 5200 can cause a display image according to captured image data included in the transmission image data TrD transmitted after imaging performed by the image transmitter 5100 to be stably displayed.

Fifth Embodiment

Figure 30:
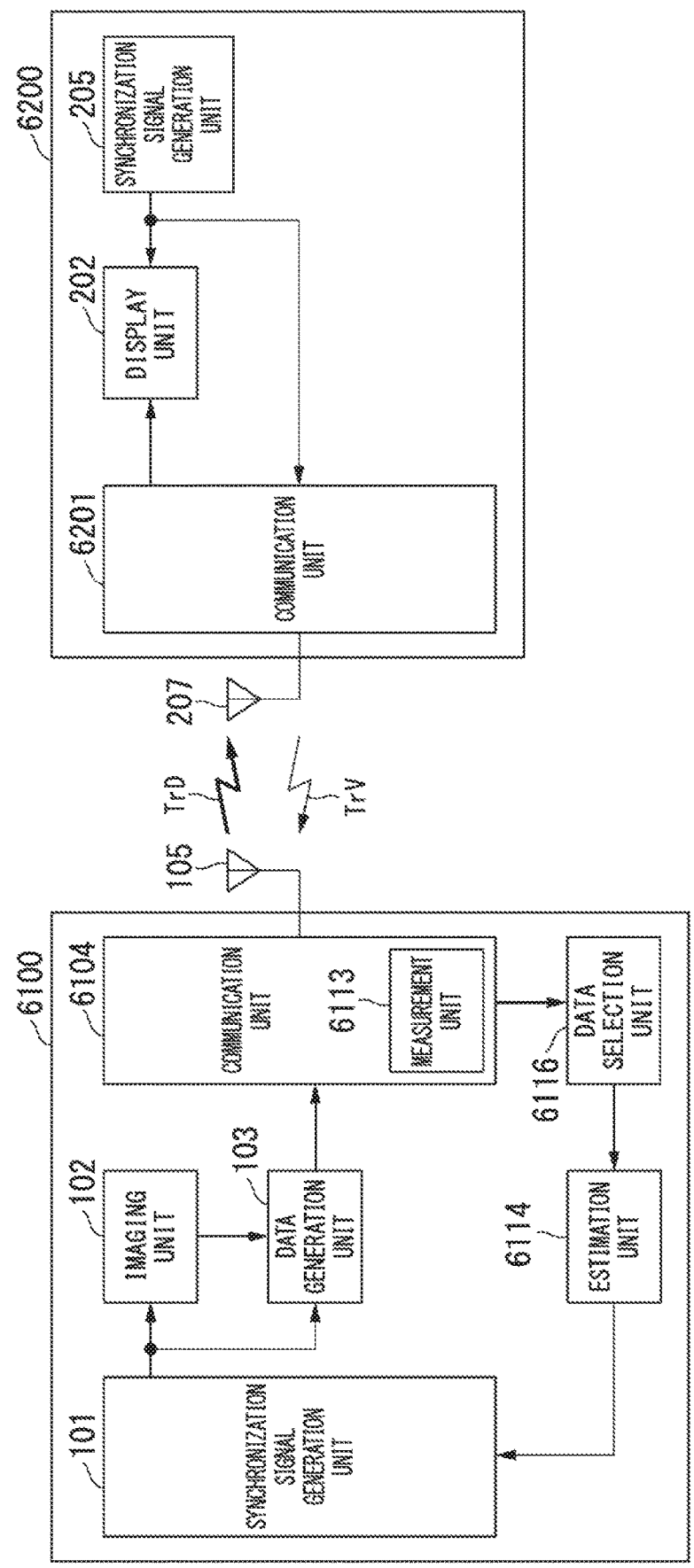
FIG. 30 is a block diagram showing a schematic configuration of an image transfer system according to a fifth embodiment of the present invention.

Hereinafter, an image transfer system according to as fifth embodiment of the present invention will be described. FIG. 30 is a block diagram showing a schematic configuration of the image transfer system according to the fifth embodiment of the present invention. An image transfer system 6 includes an image transmitter 6100 and an image receiver 6200. The image transmitter 6100 includes a synchronization signal generation unit 101, an imaging unit 102, a data generation unit 103, a communication unit 6104, an antenna 105, an estimation unit 6114, and a data selection unit 6116. Also, the communication unit 6104 includes a measurement unit 6113. Also, the image receiver 6200 includes a communication unit 6201, a display unit 202, a synchronization signal generation unit 205, and an antenna 207.

The image transfer system 6 has a configuration in which the communication unit 104 provided in the image transmitter 100 constituting the image transfer system 1 of the first embodiment shown in FIG. 2 is replaced with the communication unit 6104 including the measurement unit 6113, the estimation unit 6114 and the data selection unit 6116 are further included, the communication unit 201 provided in the image receiver 200 is replaced with the communication unit 6201, and the measurement unit 203, the estimation unit 204, and the data selection unit 206 are deleted. Accordingly, in the image transfer system 6, the image transmitter 100 constituting the image transfer system 1 of the first embodiment is replaced with the image transmitter 6100, and the image receiver 200 is replaced with the image receiver 6200. In the following description, the components of the image transfer system 6 similar to those of the image transfer system 1 of the first embodiment are denoted by the same reference signs for description.

In the image transfer system 1 of the first embodiment, the image receiver 200 estimates the deviation of the cycle or the phase of the vertical synchronization signal and transmits an adjustment instruction signal for adjusting the deviation of the cycle or the phase of the vertical synchronization signal to the image transmitter 100, so that the cycle or the phase of the vertical synchronization signal in the image transmitter 100 and the image receiver 200 is synchronized. More specifically, in the image transfer system 1 of the first embodiment, the deviation of the cycle or the phase of the vertical synchronization signal generated by the synchronization signal generation unit 101 provided in the image transmitter 100 is estimated by the configuration of the measurement unit 203, the data selection unit 206, and the estimation unit 204 provided in the image receiver 200 and the synchronization signal generation unit 101 adjusts the cycle or the phase of the vertical synchronization signal in accordance with the adjustment instruction signal transmitted from the image receiver 200. On the other hand, the image transfer system 6 has a configuration in which the deviation of the cycle or the phase of the display timing signal generated by the synchronization signal generation unit 205 provided in the image receiver 6200 is estimated by a configuration of the measurement unit 6113, the data selection unit 6116, and the estimation unit 6114 within the communication unit 6104 provided in the image transmitter 6100 and the synchronization signal generation unit 101 adjusts the cycle or the phase of the generated vertical synchronization signal in accordance with the adjustment instruction signal calculated on the basis of the estimated result. Thus, the image transfer system 6 is different from the image transfer system 1 of the first embodiment in that the image receiver 6200 is configured to transmit the display timing signal generated by the synchronization signal generation unit 205 to the image transmitter 6100.

More specifically, in the image transfer system 6, the communication unit 6201 provided in the image receiver 6200 transmits a display timing signal generated by the synchronization signal generation unit 205, particularly a display timing signal corresponding to the vertical synchronization signal for a display image according to captured image data to be displayed on a liquid crystal display (not shown) connected to the display unit 202, to the image transmitter 6100. In the image transfer system 6, the image receiver 6200 estimates a timing for causing the liquid crystal display (not shown) connected to the display unit 202 to display a display image according to captured image data on the basis of the display timing signal transmitted from the image receiver 6200 by the configuration of the measurement unit 6113, the data selection unit 6116, and the estimation unit 6114 within the communication unit 5104 provided in the image transmitter 6100. In this manner, the image transfer system 6 is different from the image transfer system 1 of the first embodiment in that the adjustment of the cycle or the phase of the vertical synchronization signal based on the vertical synchronization signal generated by the synchronization signal generation unit 101 as in the image transfer system 1 of the first embodiment is not performed and the cycle or the phase of the vertical synchronization signal generated by the synchronization signal generation unit 101 is adjusted on the basis of the display timing signal generated by the synchronization signal generation unit 205.

Also, operations or processes of the other components in the image transfer system 6 are similar to those of the components of the image transfer system 1 of the first embodiment. In other words, operations and processes of components other than the communication unit 6104 (including the measurement unit 6113), the data selection unit 6116, and the estimation unit 6114 provided in the image transmitter 6100 constituting the image transfer system 6 and operations or processes of components other than the communication unit 6201 provided in the image receiver 6200 constituting the image transfer system 6 are similar to the corresponding components in the image transfer system 1 of the first embodiment. Accordingly, in the description of the image transfer system 6, operations or processes of components different from those of the image transfer system 1 of the first embodiment, i.e., the communication unit 6104 (including the measurement unit 6113), the data selection unit 6116 and the estimation unit 6114 provided in the image transmitter 6100 and the communication unit 6201 provided in the image receiver 6200 will be described, and a detailed description of operations or processes of the other components will be omitted.

The synchronization signal generation unit 205 generates a display timing signal serving as a reference for causing a display image according to the captured image data transmitted from the image transmitter 6100 to be displayed on the basis of a reference clock signal generated by a crystal oscillation IC (not shown) provided in the image receiver 6200, and outputs the generated display timing signal to each of the display unit 202 and the communication unit 6201. Also, the display timing signal output to the communication unit 6201 by the synchronization signal generation unit 205 may be only a display timing signal corresponding to the vertical synchronization signal for a display image according to the captured image data to be displayed on the liquid crystal display (not shown) connected to the display unit 202 (hereinafter referred to as a "display, vertical synchronization signal") among generated display timing signals.

Similar to the communication unit 201 provided in the image receiver 200 in the image transfer system 1 of the first embodiment, the communication unit 6201 receives the transmission image data TrD transmitted from the image transmitter 6100 via the antenna 207. Then, the communication unit 6201 outputs captured image data included in the received transmission image data TrD to the display unit 202. Also, the communication unit 6201 transmits a display timing signal TrV for wirelessly transferring the display vertical synchronization signal output from the synchronization signal generation unit 205 to the image transmitter 6100 via the antenna 207.

Similar to the communication unit 104 provided in the image transmitter 100 in the image transfer system 1 of the first embodiment, the communication unit 6104 transmits the captured image data for wireless transfer output from the data generation unit 103 to the image receiver 6200 via the antenna 105 for wireless communication as transmission image data TrD to be transferred by wireless transfer based on a wireless connection established with the image receiver 6200. At this time, the communication unit 6104 may have a configuration in which the vertical synchronization signal transmitted to the image receiver 200 in the communication unit 104 provided in the image transmitter 100 is not transmitted to the image receiver 6200 in the image transfer system 1 of the first embodiment.

Also, the communication unit 6104 receives the display timing signal TrV transmitted from the image receiver 6200 via the antenna 105 and outputs the display vertical synchronization signal included in the received display timing signal TrV to the measurement unit 6113 provided in the communication unit 6104. When the wireless connection with the image receiver 6200 is established, the communication unit 6104 outputs a connection establishment signal indicating that the wireless connection has been established to the measurement unit 6113.

Also, because the display vertical synchronization signal is transmitted to the image transmitter 6100 as a signal itself generated by the synchronization signal generation unit 205 provided in the image receiver 6200 and because a delay or retransmission in wireless communication considered to occur in a case such as packet communication does not occur, variation in the cycle or the phase of the display vertical synchronization signal due to the delay of wireless transfer is reduced.

When the connection establishment signal is input from the communication unit 6104, the measurement unit 6113 starts the measurement of an elapsed time after the wireless connection with the image receiver 6200 is established by using a timing at which a connection establishment signal has been input as a reference time as in the measurement unit 203 provided in the image receiver 200 in the image transfer system 1 of the first embodiment. After the wireless connection with the image receiver 6200 is established, i.e., after the measurement of the elapsed time is started, the measurement unit 6113 measures a time at which the communication unit 6104 has received the display vertical synchronization signal, measures a timing at which a display image according to captured image data is displayed on the connected liquid crystal display (not shown) by the display unit 202 provided in the image receiver 6200. Then, the measurement unit 6113 outputs a time at which each measured display vertical synchronization signal has been received as information of the reception time of the display vertical synchronization signal to the data selection unit 6116. Also, after the wireless connection with the image receiver 6200 is established, the measurement unit 6113 counts the number a display vertical synchronization signals received by the communication unit 6104, i.e., the number of display images corresponding to the captured image data to be displayed on the connected liquid crystal display (not shown) by the display unit 202 provided in the image receiver 6200. The measurement unit 6113 outputs the counted number of display images corresponding to the captured image data as information of a display image data order to the data selection unit 6116 in association with reception time information.

Similar to the data selection unit 206 provided in the image receiver 200 in the image transfer system 1 of the first embodiment, the data selection unit 6116 selects a minimum reception time from information of a predetermined number of reception times associated with information of display image data orders output from the measurement unit 6113. Further, similar to the data selection unit 206 provided in the image receiver 200 in the image transfer system 1 of the first embodiment, the data selection unit 6116 selects a reception time for which a magnitude of a slope of a straight line is minimized, i.e., a minimum change reception time for which a magnitude of a cycle of the reception time is minimized, when a selected minimum reception time and another reception time are connected by a straight line with respect to the remaining reception times other than the selected minimum reception time. Then, the data selection unit 206 outputs information of each of the selected minimum reception time and minimum change reception time and display image data orders corresponding to the minimum reception time and the minimum change reception time as a selected set of selection data (hereinafter referred to as "display selection data") to the estimation unit 6114.

Here, the display selection data output to the estimation unit 6114 by the data selection unit 6116 is information similar to the selection data output by the data selection unit 206 to the estimation unit 204 although the vertical synchronization signal is replaced with the display vertical synchronization signal. In other words, the data selection unit 206 outputs information of each of a minimum reception time and a minimum change reception time corresponding to the vertical synchronization signal and captured image data orders corresponding to the minimum reception time and minimum change reception time as selection data to the estimation unit 204. On the other hand, the data selection unit 6116 outputs information of each of a minimum reception time and a minimum change reception time corresponding to the display vertical synchronization signal and display image data orders corresponding to the minimum reception time and the minimum change reception time as display selection data to the estimation unit 6114.

On the basis of information of each of a reception time and a display image data order corresponding to a display vertical synchronization signal of a set (display selection data) output from the data selection unit 6116, the estimation unit 6114 estimates a cycle or a phase of the display vertical synchronization signal indicating a timing when the display unit 202 displays a display image according to captured image data on the connected liquid crystal display (not shown) in the image receiver 6200. The estimation unit 6114 outputs an adjustment instruction signal for adjusting the cycle or the phase of the vertical synchronization signal generated by the synchronization signal generation unit 101 serving as a reference when the image transmitter 6100 captures an image with the imaging unit 102 thereafter on the basis of the estimated cycle or phase of the display vertical synchronization signal to the synchronization signal generation unit 101. Also, similar to the adjustment instruction signal output by the estimation unit 204 to the communication unit 201, the adjustment instruction signal output by the estimation unit 6114 to the synchronization signal generation unit 101 also includes a cycle adjustment instruction signal for issuing an instruction for adjusting a cycle of the vertical synchronization signal and a phase adjustment instruction signal for issuing an instruction for adjusting a phase of the vertical synchronization signal. Accordingly, similar to the estimation unit 204 provided in the image receiver 200 in the image transfer system 1 of the first embodiment, the estimation unit 6114 can issue an instruction for adjusting either or both of the cycle and the phase of the vertical synchronization signal.

Also, a method in which the estimation unit 6114 estimates a cycle or a phase of a display vertical synchronization signal and a method in which the estimation unit 6114 calculates an adjustment instruction signal on the basis of an estimated cycle or phase of a display vertical synchronization signal are similar to those of the estimation unit 204 provided in the image receiver 200 in the image transfer system 1 of the first embodiment, and can be easily conceived by replacing the selection data with display selection data. Accordingly, a detailed description of a method in which the estimation unit 6114 estimates the cycle or the phase of the display vertical synchronization signal and a method in which the estimation unit 6114 calculates the adjustment instruction signal will be omitted.

The synchronization signal generation unit 101 generates a vertical synchronization signal when the imaging unit 102 captures an image on the basis of a reference clock signal generated by a crystal oscillation IC (not shown) provided in the image transmitter 6100 and outputs the generated vertical synchronization signal to each of the imaging unit 102 and the data generation unit 103. However, in the image transfer system 6, the synchronization signal generation unit 101 adjusts the cycle or phase of the vertical synchronization signal in accordance with the adjustment instruction signal output from the estimation unit 6114 without adjusting the cycle or the phase of the vertical synchronization signal in accordance with the adjustment instruction signal transmitted from the image receiver 6200 and output from the communication unit 6104.

According to such a configuration, in the image transfer system 6, the synchronization signal generation unit 101 adjusts the cycle or the phase of the vertical synchronization signal to be generated in accordance with the adjustment instruction signal output by the estimation unit 6114.

Figure 31:
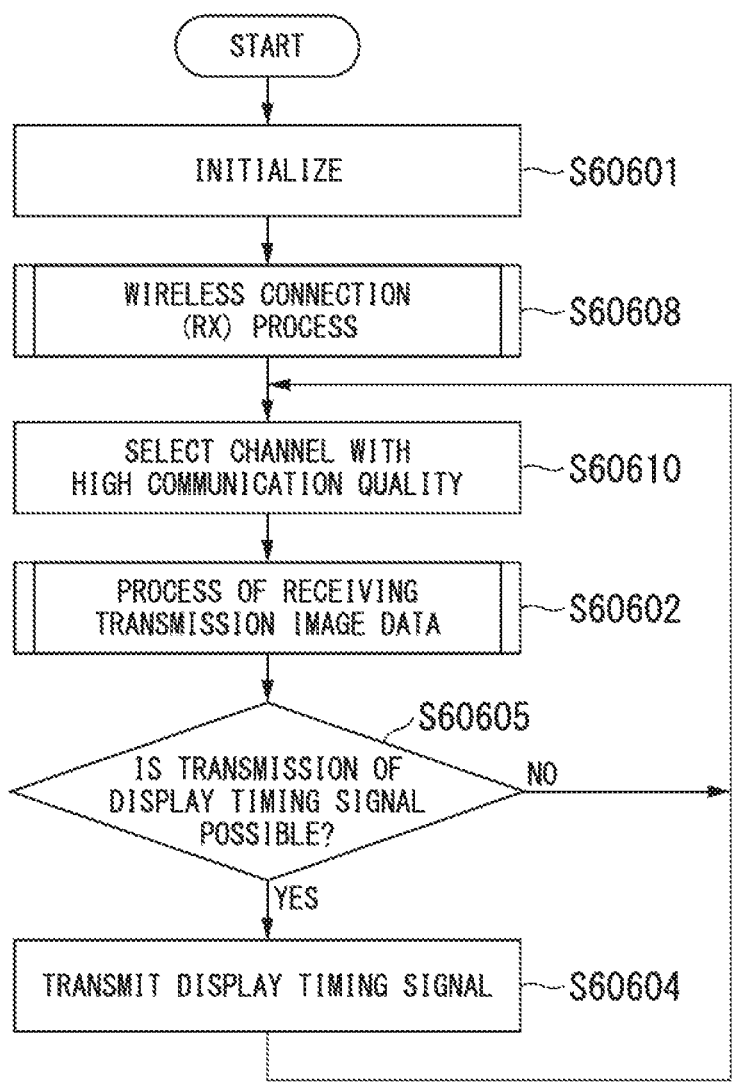
FIG. 31 is a flowchart showing a processing procedure of a communication unit provided in an image receiver constituting the image transfer system according to the fifth embodiment of the present invention.

Next, the operation of each component constituting the image transfer system 6 will be described. First, the operation of the communication unit 6201 provided in the image receiver 6200 constituting the image transfer system 6 will be described. FIG. 31 is a flowchart showing a processing procedure of the communication unit 6201 provided in the image receiver 6200 constituting the image transfer system 6 according to the fifth embodiment of the present invention. The communication unit 6201 performs the reception of transmission image data TrD transmitted from the image transmitter 6100, i.e., a vertical synchronization signal and captured image data, and the transmission of a display timing signal TrV according to a display timing signal output from the synchronization signal generation unit 205, i.e., a display vertical synchronization signal, to the image transmitter 6100 in the following processing procedure.

When the image receiver 6200 is activated, the communication unit 6201 first initializes the components within the communication unit 6201 (step S60601).

Subsequently, the communication unit 6201 performs a wireless connection (RX) process on a channel of wireless communication with the image transmitter 6100 (more specifically, the communication unit 6104 provided in the image transmitter 6100) via the antenna 207 (step S60608). The wireless connection process in step S60608 is similar to the wireless connection (RX) process of step S608 in the communication unit 201 provided in the image receiver 200 constituting the image transfer system 1 of the first embodiment shown in FIG. 11, i.e., the wireless connection (RX) process shown in FIG. 12. Accordingly, a detailed description of the processing procedure of the wireless connection (RX) process to be performed by the communication unit 6104 in step S60608 will be omitted.

Subsequently, after a wireless connection with the communication unit 6104 is established, the communication unit 6201 selects a (relatively good) channel with high communication quality from among currently available channels (free channels) (step S60610).

Subsequently, the communication unit 6201 performs a transmission image data TrD reception process of receiving transmission image data TrD transmitted from the communication unit 6104 via the antenna 207 by using the selected wireless communication channel (step S60602). The transmission image data TrD reception process in step S60602 is similar to the transmission image data TrD reception process of step S602 in the communication unit 201 provided in the image receiver 200 constituting the image transfer system 1 of the first embodiment shown in FIG. 11. i.e., the transmission image data TrD reception process shown in FIG. 13. However, the image transfer system 6 has a configuration in which the communication unit 6104 does not transmit the vertical synchronization signal, which is transmitted to the image receiver 200 by the communication unit 104 provided in the image transmitter 100 in the image transfer system 1 of the first embodiment, to the image receiver 6200. Accordingly, a detailed description of a processing procedure of the process of receive the transmission image data TrD performed by the communication unit 6201 in step S60602 when the image transmitter 6100 does not transmit the vertical synchronization signal will be described below.

Subsequently, the communication unit 6201 determines whether or not it is possible to transmit the display timing signal output from the synchronization signal generation unit 205 as the display timing signal TrV to the image transmitter 6100 (more specifically, the communication unit 6104 provided in the image transmitter 6100) (step S60605). In other words, the communication unit 6201 checks whether or not the display timing signal has been output from the synchronization signal generation unit 205.

If a result of the determination in step S60605 indicates that the display timing signal TrV cannot be transmitted to the communication unit 6104 ("NO" in step S60605), the communication unit 6201 returns to step S60610 to select a channel with higher communication quality. In other words, the communication unit 6201 performs the transmission image data TrD reception process corresponding to captured image data of the next frame on a wireless communication channel with higher communication quality in steps S60610 and S60602.

On the other hand, if a result of the determination in step S60605 indicates that the display timing signal TrV can be transmitted to the communication unit 6104 ("YES" in step S60605), the communication unit 6201 transmits the display timing signal TrV according to the display timing signal output from the synchronization signal generation unit 205 to the communication unit 6104 (step S60604). More specifically, the communication unit 6201 transmits the display timing signal TrV according to the display vertical synchronization signal included in the display timing signal output from the synchronization signal generation unit 205 to the communication unit 6104. Thereafter, the communication unit 6201 returns to step S60610.

According to such processing, the communication unit 6201 iterates a process of receiving the transmission image data TrD transmitted from the image transmitter 6100 and outputting the captured image data included in the received transmission image data TrD to the display unit 202 and a process of wirelessly transferring the display vertical synchronization signal output from the synchronization signal generation unit 205 as the display timing signal TrV.

Figure 32:
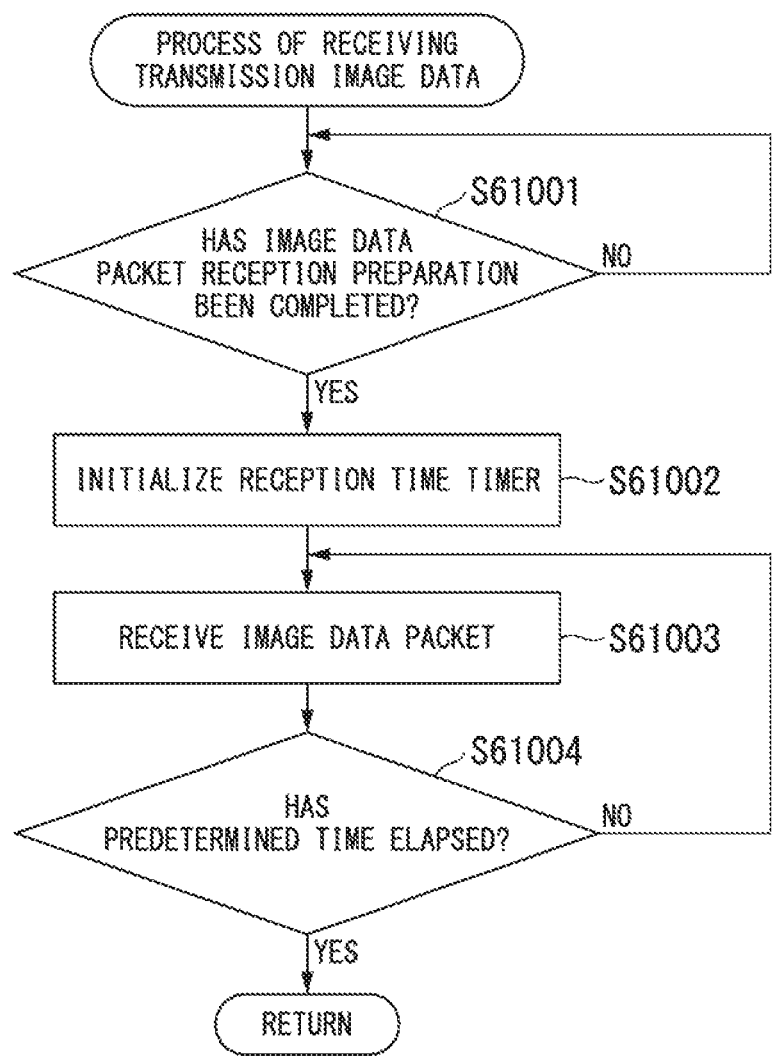
FIG. 32 is a flowchart showing a processing procedure of a reception process in which the communication unit provided in the image receiver constituting the image transfer system according to the fifth embodiment of the present invention receives transmission image data.

Next, a processing procedure of the transmission image data TrD reception process to be performed by the communication unit 6201 in step S60602 will be described. FIG. 32 is a flowchart showing a processing procedure of a reception process in which the communication unit 6201 provided in the image receiver 6200 constituting the image transfer system 6 according to the fifth embodiment of the present invention receives the transmission image data TrD. Also, in FIG. 32, the processing procedure of the transmission image data TrD reception process in the communication unit 6201 when the image transmitter 6100 does not transmit the vertical synchronization signal is shown. The communication unit 6201 receives the transmission image data TrD transmitted from the communication unit 6104 provided in the image transmitter 6100 in the following processing procedure.

Also, in the following description, the image transmitter 6100 dividing captured image data of one frame into a plurality of image data packets and wirelessly transferring the plurality of image data packets for a detailed description of the processing procedure of the transmission image data TrD reception process in the communication unit 6201 as in the transmission image data TrD reception process in the communication unit 201 provided in the image receiver 200 constituting the image transfer system 1 of the first embodiment shown in FIG. 13 will be described. Thus, a case in which each packet in the transmission image data TrD transmitted from the communication unit 6104 for the communication unit 6201 is any one of the image data packets obtained by dividing captured image data of one frame obtained through imaging performed by the imaging unit 102 provided in the image transmitter 6100 and one synchronization packet indicating a timing of a vertical synchronization signal output by the synchronization signal generation unit 101, but no synchronization packet is included in the transmission image data TrD will be described. Accordingly a case where image data packets are sequentially received from a first image data packet without receiving a synchronization packet in the transmission image data TrD reception process in the communication unit 6201 will be described.

When the transmission image data TrD reception process in step S60602 is started, the communication unit 6201 first checks whether or not the preparation for receiving the image data packets transmitted as the packets of the transmission image data TrD from the image transmitter 6100 (more specifically, the communication unit 6104 provided in the image transmitter 6100) has been completed (step S61001).

If a result of the checking in step S61001 indicates that the preparation for receiving the image data packets transmitted as the packets of the transmission image data TrD from the communication unit 6104 has not been completed ("NO" in step S61001), the communication unit 6201 returns to step S61001 to wait for the preparation for receiving the image data packets to be completed.

On the other hand, if a result of the checking in step S61001 indicates that the preparation for receiving the image data packets transmitted as the packets of the transmission image data TrD from the communication unit 6104 has been completed ("YES" in step S61001), the communication unit 6201 initializes (clears) a reception time timer and starts the measurement of the reception time (step S61002).

Subsequently, the communication unit 6201 receives the first image data packet transmitted as one packet of the transmission image data TrD from the communication unit 6104, i.e., the first image data packet obtained by dividing captured image data of one frame obtained through imaging performed by the imaging unit 102 provided in the image transmitter 6100 (step S61003).

Subsequently, the communication unit 6201 determines whether or not a predetermined time, an upper limit time for example, 16.667 ms) available for wireless transfer of captured image data for one frame, has elapsed from the start of the measurement of the reception time in step S61002 on the basis of the reception time measured by the reception time timer (step S61004).

If a result of the determination in step S61004 indicates that the predetermined time has not elapsed ("NO" in step S61004), the communication unit 6201 returns to step S61003 to receive the next image data packet transmitted as one packet of the transmission image data TrD from the communication unit 6104.

On the other hand, if a result of the determination in step S61004 indicates that the predetermined time has passed ("YES" in step S61004), the communication unit 6201 outputs all image data packets received in step S61003, i.e., captured image data of one frame, to the display unit 202. Then, the communication unit 6201 completes the transmission image data TrD reception process and returns to the subsequent step S60605 in the process of receiving the transmission image data TrD (captured image data for wireless transfer) transmitted from the image transmitter 6100 shown in FIG. 31.

According to such processing, the communication unit 6201 performs a reception process of sequentially receiving image data packets obtained by dividing captured image data of one frame obtained through imaging performed by the imaging unit 102 provided in the image transmitter 6100 wirelessly transferred as packets of the transmission image data TrD from the communication unit 6104 from the first image data packet.

Also, a concept of the processing procedure when the image transmitter 6100 is configured to wirelessly transfer captured image data in units of images of one frame captured by the imaging unit 102 provided in the image transmitter 6100 is similar to a concept in the communication unit 201 provided in the image receiver 200 constituting the image transfer system 1 of the first embodiment. Accordingly, a detailed description of the image receiver 6200 when the image transmitter 6100 wirelessly transfers captured image data in units of images of one frame will be omitted.

Figure 33:
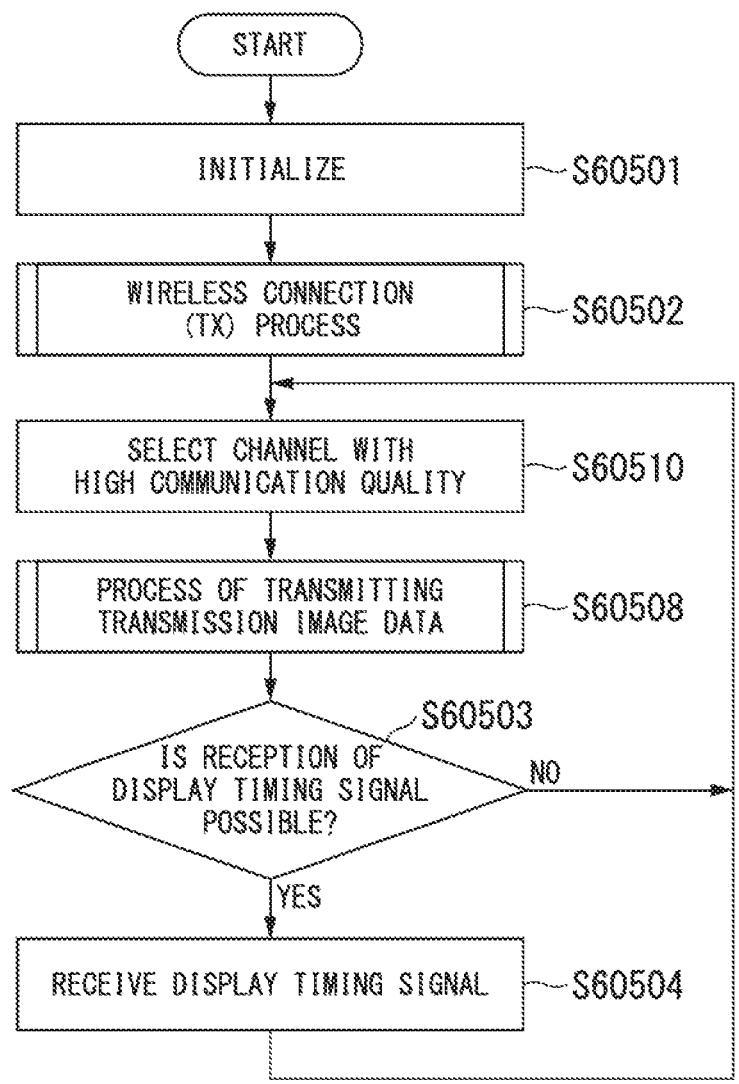
FIG. 33 is a flowchart showing a processing procedure of a communication unit provided in an image transmitter constituting the image transfer system according to the fifth embodiment of the present invention.

Next, the operation of the communication unit 6104 provided in the image transmitter 6100 constituting the image transfer system 6 will be described. FIG. 33 is a flowchart showing a processing procedure of the communication unit 6104 provided in the image transmitter 6100 constituting the image transfer system 6 according to the fifth embodiment of the present invention. The communication unit 6104 performs the transmission of captured image data for wireless transfer, i.e., transmission image data TrD, to the image receiver 6200 and the reception of a display timing signal TrV, i.e., a display vertical synchronization signal, transmitted from the image receiver 6200 in the following processing procedure.

When the image transmitter 6100 is activated, the communication unit 6104 first initializes the components within the communication unit 6104 (step S60501).

Subsequently, the communication unit 6104 performs a wireless connection (TX) process on a wireless communication channel with the image receiver 6200 (more specifically, the communication unit 6201 provided in the image receiver 6200) via the antenna 105 (step S60502). The wireless connection (TX) process in step S60502 is similar to the wireless connection (TX) process in step S502 in the communication unit 104 provided in the image transmitter 100 constituting the image transfer system 1 of the first embodiment shown in FIG. 8, i.e., the wireless connection (TX) process shown in FIG. 10. Accordingly, a detailed description of the processing procedure of the wireless connection (TX) process to be performed by the communication unit 6104 in step S60502 will be omitted.

Subsequently, after a wireless connection with the communication unit 6201 is established, the communication unit 6104 selects a (relatively good) channel with high communication quality from among the currently available channels (free channels) (step S60510).

Subsequently, the communication unit 6104 performs a transmission image data TrD transmission process of wirelessly transferring the captured image data for wireless transfer output from the data generation 103 to the communication unit 6201 via the antenna 105 by using the selected wireless communication channel (step S60508). The transmission image data TrD transmission process in this step S60508 is similar to the transmission image data TrD transmission process of step S508 in the communication unit 104 provided in the image transmitter 100 constituting the image transfer system 1 of the first embodiment shown in FIG. 8, i.e., the transmission image data TrD transmission process shown in FIG. 9. However, the image transfer system 6 may have a configuration in which the communication unit 6104 does not transmit the vertical synchronization signal, which is transmitted to the image receiver 200 by the communication unit 104 provided in the image transmitter 100 in the image transfer system 1 of the first embodiment, to the image receiver 6200. Accordingly, a detailed description of a processing procedure of the process of transmit the transmission image data TrD performed by the communication unit 6104 in step S60508 when the image transmitter 6100 does not transmit the vertical synchronization signal will be described below.

Subsequently, the communication unit 6104 determines whether or not it is possible to receive the display timing signal TrV transmitted from the image receiver 6200 (more specifically, the communication unit 6201 provided in the image receiver 6200) (step S60503).

If a result of the determination in step S60503 indicates that the display timing signal TrV transmitted from the communication unit 6201 cannot be received ("NO" in step S60503), the communication unit 6104 returns to step S60510 to select a channel with higher communication quality. In other words, the communication unit 6104 performs the transmission image data TrD transmission process corresponding to the captured image data of the next frame on the wireless communication channel with higher communication quality in steps S60510 and S60508.

On the other hand, if a result of the determination in step S60503 indicates that the display timing signal TrV transmitted from the communication unit 6201 can be received ("YES" in step S60503), the communication unit 6104 receives the display timing signal TrV transmitted from the communication unit 6201 (step S60504). Then, the communication unit 6104 outputs the display vertical synchronization signal included in the received display timing signal TrV to the measurement unit 6113 provided in the communication unit 6104. Thereafter, the communication unit 6104 returns to step S60510.

According to such processing, the communication unit 6104 iterates a process of wirelessly transferring captured image data for wireless transfer output from the data generation unit 103 as the transmission image data TrD and a process of receiving the display timing signal TrV transmitted from the image receiver 6200 and outputting the received display timing signal TrV to the measurement unit 6113.

Figure 34:
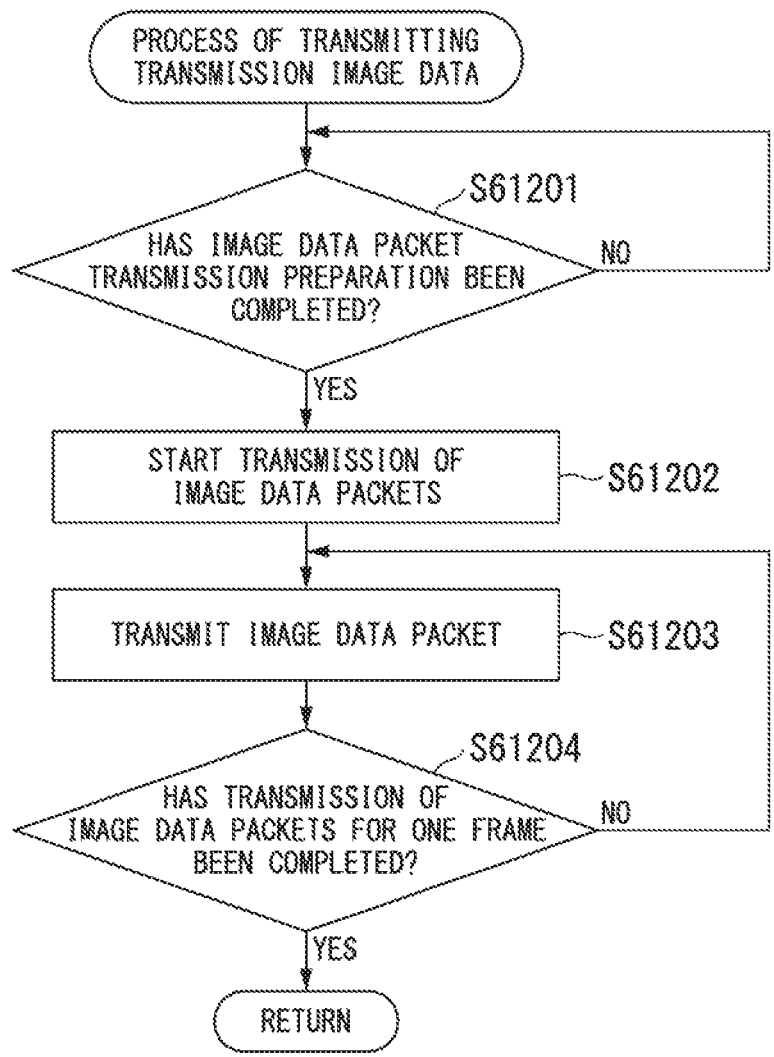
FIG. 34 is a flowchart showing a processing procedure of a transmission process in which the communication unit provided in the image transmitter constituting the image transfer system according to the fifth embodiment of the present invention transmits transmission image data.

Next, a processing procedure of the transmission image data TrD transmission process to be performed by the communication unit 6104 in step S60508 will be described. FIG. 34 is a flowchart showing a processing procedure of the transmission process in which the communication unit 6104 provided in the image transmitter 6100 constituting the image transfer system 6 according to the fifth embodiment of the present invention transmits transmission image data TrD. Also, in FIG. 34, the processing procedure of the transmission image data TrD transmission process in the communication unit 6104 when the image transmitter 6100 does not transmit the vertical synchronization signal is shown. The communication unit 6104 transmits the transmission image data TrD to the image receiver 6200 in the following processing procedure.

Also, in the following description, the image transmitter 6100 dividing captured image data of one frame into a plurality of image data packets and wirelessly transferring the plurality of image data packets for a detailed description of the processing procedure of the transmission image data TrD transmission process in the communication unit 6104 as in the transmission image data TrD transmission process in the communication unit 104 provided in the image transmitter 100 constituting the image transfer system 1 of the first embodiment shown in FIG. 9 will be described. Thus, a case in which captured image data for wireless transfer output from the data generation unit 103 is any one of the image data packets obtained by dividing captured image data of one frame output from the imaging unit 102 and one synchronization packet indicating a timing of a vertical synchronization signal output from the synchronization signal generation unit 101, but no synchronization packet is included in the transmission image data TrD will be described. Therefore, in the process of transmitting the transmission image data TrD in the communication unit 6104, a case in which no synchronization packet is transmitted but image data packets are sequentially transmitted from a first image data packet will be described.

If the transmission image data TrD transmission process in step S60508 is started, the communication unit 6104 first checks whether or not the preparation for transmitting image data packets included in the captured image data for wireless transfer output from the data generation unit 103 to the image receiver 6200 (more specifically, the communication unit 6201 provided in the image receiver 6200) has been completed (step S61201).

If a result of the checking in step S61201 indicates that the preparation for transmitting the image data packets included in the captured image data for wireless transfer output from the data generation unit 103 to the communication unit 6201 has not been completed ("NO" in step S61201), the communication unit 6104 returns to step S61201 to wait for the preparation for transmitting the image data packets to be completed.

On the other hand, if a result of the checking in step S61201 indicates that the preparation for transmitting the image data packets included in the captured image data for wireless transfer output from the data generation unit 103 to the communication unit 6201 has been completed ("YES" in step S61201), the communication unit 6104 starts transmission of the transmission image data TrD corresponding to the image data packets included in the captured image data for wireless transfer output from the data generation unit 103 (step S61202).

Subsequently, the communication unit 6104 transmits the transmission image data TrD corresponding to the image data packets included in the captured image data for wireless transfer output from the data generation unit 103 as one packet to the communication unit 6201 (step S61203). Here, the communication unit 6104 sequentially transmits the packets of the transmission image data TrD to the communication unit 6201 from the first image data packet included in the captured image data for wireless transfer output from the data generation unit 103.

Subsequently, the communication unit 6104 checks whether or not the transmission of the transmission image data TrD corresponding to all image data packets included in the captured image data for wireless transfer output from the data generation unit 103 has been completed (step S61204). In other words, the communication unit 6104 cheeks whether or not the transmission of all captured image data for one frame obtained through imaging performed by the imaging unit 102 to the communication unit 6201 using the vertical synchronization signal generated by the synchronization signal generation unit 101 as a reference has been completed.

If as a result of the checking in step S61204 indicates that the transmission of the transmission image data TrD corresponding to all the image data packets included in the captured image data for wireless transfer output from the data generation unit 103 has not been completed ("NO" in step S61204), the communication unit 6104 returns to step S61203 to transmit the packet of the transmission image data TrD corresponding to the next image data packet to the communication unit 6201.

On the other hand, if a result of the checking in step S61204 indicates that the transmission of the transmission image data TrD corresponding to all the image data packets included in the captured image data for wireless transfer output from the data generation unit 103 has been completed ("YES" in step S61204), the communication unit 6104 completes the transmission image data TrD transmission process and returns to subsequent step S60503 in the process of transmitting the captured image data (transmission image data TrD) for wireless transfer to the image receiver 6200 shown in FIG. 33.

According to such processing, the communication unit 6104 performs a transmission process of sequentially transmitting the transmission image data TrD corresponding to each image data packet obtained by dividing the captured image data for wireless transfer for one frame output from the data generation unit 103 from the transmission image data TrD corresponding to the first image data packet.

Also, a concept of the processing procedure when the image transmitter 6100 is configured to wirelessly transfer captured image data in units of images of one frame obtained through imaging performed by the imaging unit 102 provided in the image transmitter 6100 is similar to a concept in the communication unit 104 provided in the image transmitter 100 constituting the image transfer system 1 of the first embodiment. Accordingly, a detailed description of the image transmitter 6100 when the image transmitter 6100 wirelessly transfers captured image data in units of images of one frame will be omitted.

Figure 35:
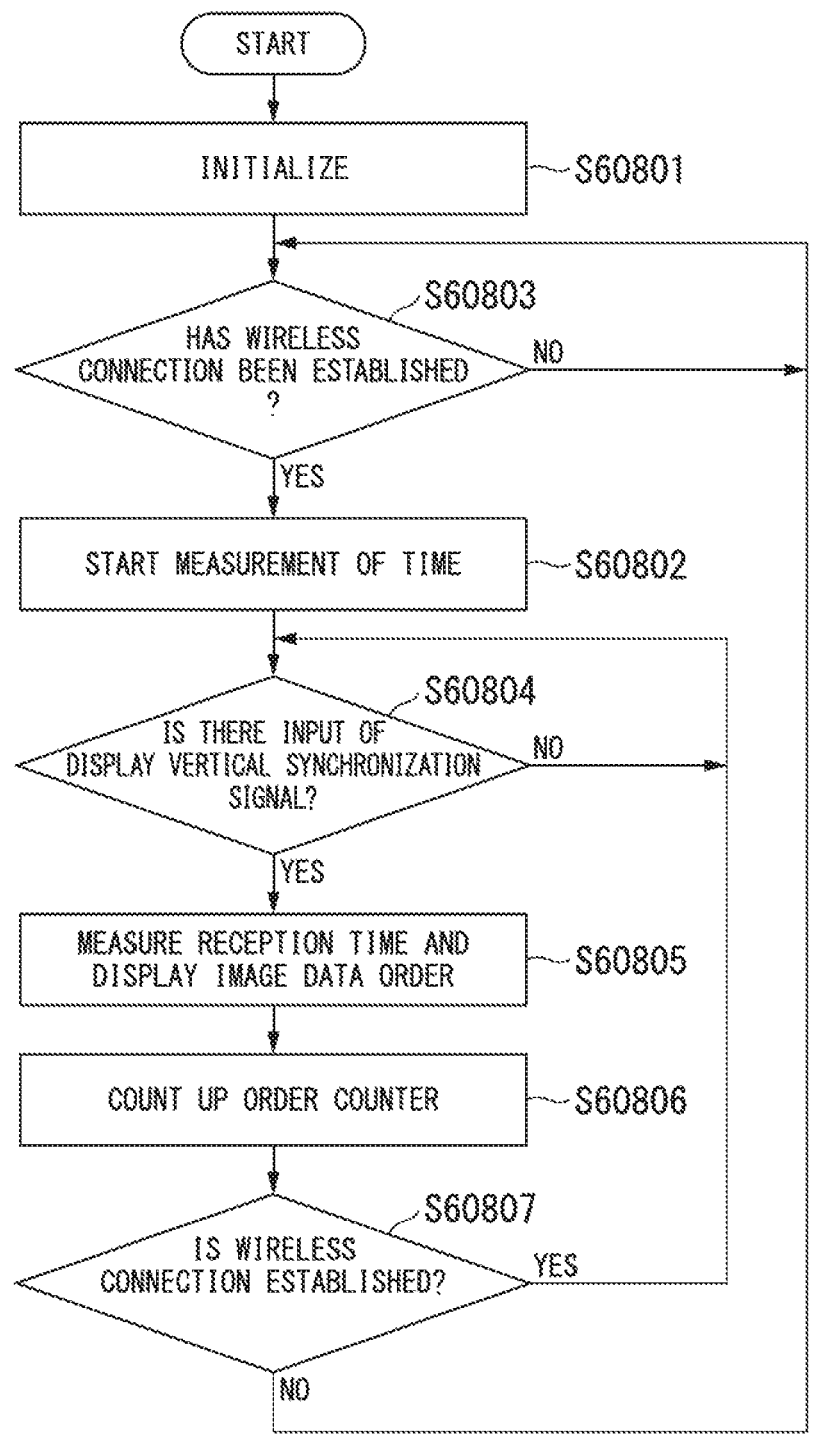
FIG. 35 is a flowchart showing a processing procedure of a measurement unit provided in the image transmitter constituting the image transfer system according to the fifth embodiment of the present invention.

Next, the operation of the measurement unit 6113 within the communication unit 6104 provided in the image transmitter 6100 will be described. FIG. 35 is a flowchart showing a processing procedure of the measurement unit 6113 provided in the image transmitter 6100 constituting the image transfer system 5 according to the fifth embodiment of the present invention. The measurement unit 6113 measures a reception time and a display image data order corresponding to the display vertical synchronization signal included in the display timing signal TrV transmitted from the image receiver 6200 in the following processing procedure. Also, in the following description, as in the measurement unit 203 provided in the image receiver 200 in the image transfer system 1 of the first embodiment, a time measured by the measurement unit 6113 will be described as a time T and a counter configured to count the number of display vertical synchronization signals for the measurement unit 6113 to measure the display image data order will be described as an order counter C.

When the image transmitter 6100 is activated, the measurement unit 6113 first initializes the components within the measurement unit 6113 (step S60801). In step S60801, the measurement unit 6113 initializes the time T=0 and the order counter C=0.

Subsequently, the measurement unit 6113 checks whether or not the wireless connection with the image receiver 6200 has been established (step S60803). More specifically, the measurement unit 6113 checks whether or not a connection establishment signal has been input from the communication unit 6104.

If a result of the checking in step S60803 indicates that the wireless connection with the image receiver 6200 has not been established ("NO" in step S60803), the measurement unit 6113 returns to step S60803 to wait for the wireless connection with the image receiver 6200 to be established.

On the other hand, if a result of the checking in step S60803 indicates that the wireless connection with the image receiver 6200 has been established ("YES" in step S60803), the measurement unit 6113 starts time measurement (step S60802). More specifically, the measurement unit 6113 updates the time T to the time T+1 every time a certain time elapses (for example, every time 0.1 ms elapses).

Subsequently, the measurement unit 6113 checks whether there is an input of the display vertical synchronization signal (step S60804). More specifically, the measurement unit 6113 checks whether or not a display vertical synchronization signal is included in the display timing signal TrV transmitted from the image receiver 6200 (more specifically, the communication unit 6201 provided in the image receiver 6200) and the display vertical synchronization signal has been input from the communication unit 6104.

If a result of the checking in step S60804 indicates that there is no input of the display vertical synchronization signal ("NO" in step S60804), the measurement unit 6113 returns to step S60804 to wait for the display vertical synchronization signal to be input.

On the other hand, if a result of the checking in step S60804 indicates that there is an input of the display vertical synchronization signal ("YES" in step S60804), the measurement unit 6113 measures the reception time and the display image data order, associates the measured reception time and display image data order, and outputs an association result to the data selection unit 6116 (step S60805). More specifically, the measurement unit 6113 acquires a current time T as the reception time. Also, the measurement unit 6113 acquires a current count value of the order counter C, and sets a value obtained by adding 1 to the acquired count value of the order counter C as the display image data order. Then, the measurement unit 6113 associates the reception time with the display image data order and outputs an association result to the data selection unit 6116.

Subsequently, the measurement unit 6113 counts up the count value of the order counter C (step S60806). More specifically, the measurement unit 6113 updates the order counter C to the order counter C+1.

Subsequently, the measurement unit 6113 checks whether or not the wireless connection with the image receiver 6200 is established (step S60807). In other words, the measurement unit 6113 checks whether or not the state in which the wireless connection with the image receiver 6200 has been established continues.

If a result of the checking in step S60807 indicates that the wireless connection with the image receiver 6200 is established ("YES" in step S60807), the measurement unit 6113 returns to step S60804 to wait for the next display vertical synchronization signal to be input.

On the other hand, if a result of the checking in step S60807 indicates that the wireless connection with the image receiver 6200 is not established, i.e., if the wireless connection with the image receiver 6200 has been disconnected ("NO" in step S60807), the measurement unit 6113 returns to step S60803 to wait for the wireless connection with the image receiver 6200 to be established.

According to such processing, the measurement unit 6113 sequentially iterates the measurement of the reception time and the display image data order corresponding to the display vertical synchronization signal included in the display timing signal TrV transmitted from the communication unit 6201 provided in the image receiver 6200 and sequentially outputs information of the measured reception time and display image data order to the data selection unit 6116.

Thereby, similar to the data selection unit 206 provided in the image receiver 200 in the image transfer system 1 of the first embodiment, the data selection unit 6116 selects a minimum reception time, a minimum change reception time, and display image data orders corresponding thereto from information of a predetermined number of reception times associated with information of display image data orders output from the measurement unit 6113 and outputs a selection result as selection data to the estimation unit 6114. The estimation unit 6114 estimates a deviation of a cycle or phase of the display vertical synchronization signal generated by the synchronization signal generation unit 205 provided in the image receiver 6200 on the basis of the display selection data output from the data selection unit 6116 and outputs an adjustment instruction signal for adjusting the cycle or the phase of the vertical synchronization signal generated by the synchronization signal generation unit 101 to the synchronization signal generation unit 101. Thereby, the synchronization signal generation unit 101 adjusts the cycle or the phase of the vertical synchronization signal to be generated in accordance with the adjustment instruction signal output from the estimation unit 6114 and outputs the vertical synchronization signal with the adjusted cycle or phase to each of the imaging unit 102 and the data generation unit 101.

In this manner, in the image transfer system 6, the synchronization signal generation unit 101 provided in the image transmitter 6100 adjusts the cycle or the phase of the vertical synchronization signal when the imaging unit 102 captures an image thereafter on the basis of the display vertical synchronization signal included in the display timing signal TrV transmitted from the image receiver 6200. In other words, in the image transfer system 6, the adjustment of the cycle or the phase of the vertical synchronization signal generated by the synchronization signal generation unit 101 on the basis of the vertical synchronization signal when the imaging unit 102 captures an image as in the image transfer system 1 of the first embodiment is not performed, but the cycle or the phase of the vertical synchronization signal generated by the synchronization signal generation unit 101 is adjusted on the basis of the display timing signal (in particular, the display vertical synchronization signal) generated by the synchronization signal generation unit 205 provided in the image receiver 6200. Thereby, in the image transfer system 6, a timing of the vertical synchronization signal for the image transmitter 6100 to capture an image with the imaging unit 102 and a timing of the vertical synchronization signal for the image receiver 6200 to cause a liquid crystal display (not shown) connected to the display unit 202 to display a display image according to captured image data can be matched.

As described above, in the image transfer system 6 of the fifth embodiment, the deviation of the cycle or the phase of the vertical synchronization signal is estimated within the image transmitter 6100 on the basis of the display timing signal for causing the connected liquid crystal display (not shown) to display a display image according to captured image data generated by the synchronization signal generation unit 205 provided in the image receiver 6200. In the image transfer system 6 of the fifth embodiment, deviations of the cycle or the phase of the vertical synchronization signal generated by the synchronization signal generation unit 101 provided in the image transmitter 6100 and the cycle or the phase of the display timing signal generated by the synchronization signal generation unit 205 provided in the image receiver 6200 are adjusted within the image transmitter 6100 on the basis of the estimated cycle or phase of the vertical synchronization signal.

Thereby, in the image transfer system 6 of the fifth embodiment, as in the image transfer system 1 of the first embodiment, unnecessary timing adjustment of the vertical synchronization signal is not performed and the cycle or the phase of the vertical synchronization signal is synchronized in the image transmitter 6100 and the image receiver 6200, so that the image receiver 6200 can cause a display image according to captured image data transmitted after imaging performed by the image transmitter 6100 to be stably displayed.

Also, the configuration in which the measurement unit 6113 is provided within the communication unit 6104 has been described in the configuration of the image transfer system 6 shown in FIG. 30. However, the measurement unit 6113 may be arranged outside the communication unit 6104, i.e., at a level similar to that of the data selection unit 6116 or the estimation unit 6114. Also, some or all of the functions of the measurement unit 6113, the data selection unit 6116, and the estimation unit 6114 provided in the image transmitter 6100 may be integrated into a processor or may be implemented by a single processor or individual processors corresponding to functions, i.e., a plurality of processors. Also, some or all of the above-described functions in the image transmitter 6100 may be implemented by an integrated circuit such as a dedicated LSI (a so-called ASIC).

Sixth Embodiment

Figure 36:
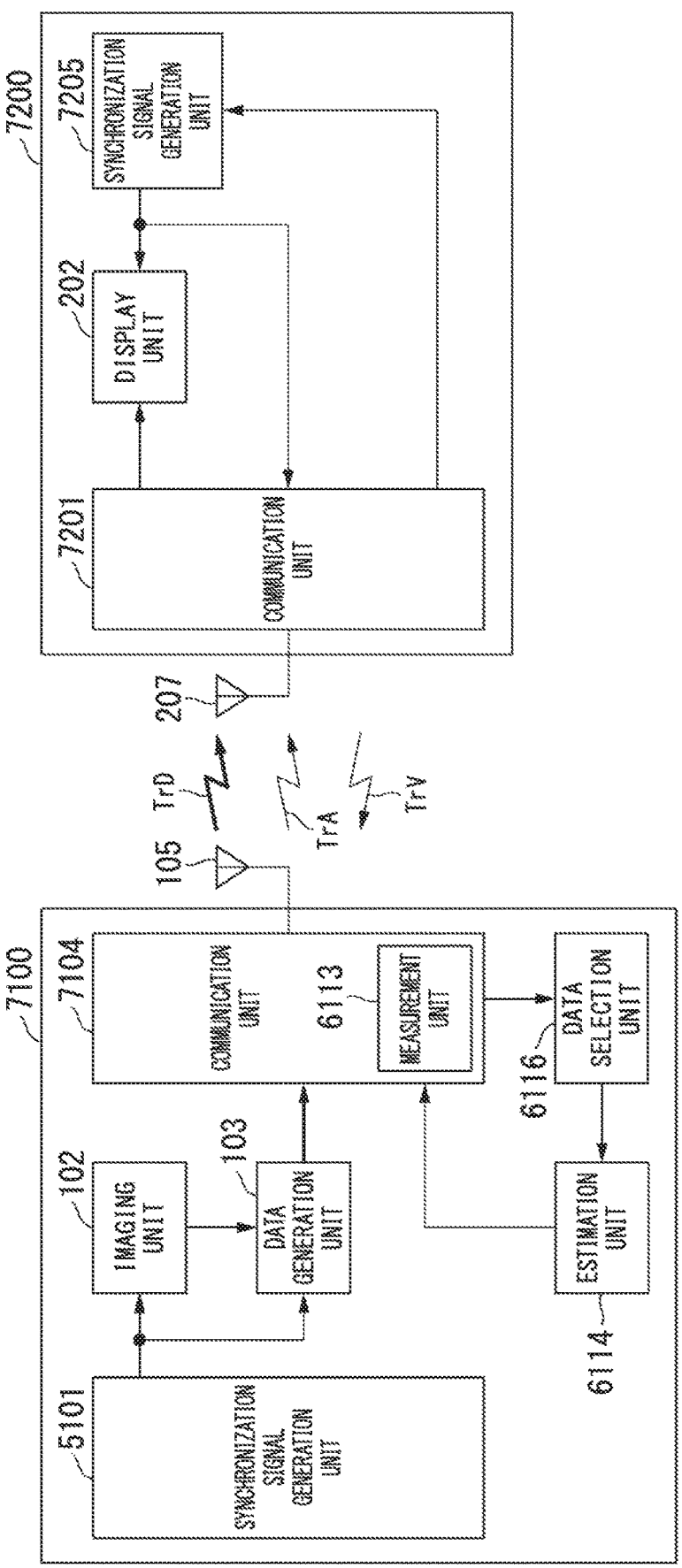
FIG. 36 is a block diagram showing a schematic configuration of an image transfer system according to a sixth embodiment of the present invention.

Hereinafter, an image transfer system according to a sixth embodiment of the present invention will be described. FIG. 36 is a block diagram showing a schematic configuration of the image transfer system according to the sixth embodiment of the present invention. An image transfer system 7 includes an image transmitter 7100 and an image receiver 7200. The image transmitter 7100 includes a synchronization signal generation unit 5101, an imaging unit 102, a data generation unit 103, a communication unit 7104, an antenna 105, an estimation unit 6114, and a data selection unit 6116. Also, the communication unit 7104 includes a measurement unit 6113. Also, the image receiver 7200 includes a communication unit 7201, a display unit 202, a synchronization signal generation unit 7205, and an antenna 207.

The image transfer system 7 has a configuration in which the synchronization signal generation unit 101 provided in the image transmitter 100 constituting the image transfer system 1 of the first embodiment shown in FIG. 2 is replaced with the synchronization signal generation unit 5101, the communication unit 104 is replaced with the communication unit 7104 including the measurement unit 6113, and the estimation unit 6114 and the data selection unit 6116 are further provided. Also, the image transfer system 7 has a configuration in which the communication unit 201 provided in the image receiver 200 constituting the image transfer system 1 of the first embodiment shown in FIG. 2 is replaced with the communication unit 7201, the synchronization signal generation unit 205 is replaced with the synchronization signal generation unit 7205, and the measurement unit 203, the estimation unit 204, and the data selection unit 206 are deleted. Accordingly, in the image transfer system 7, the image transmitter 100 constituting the image transfer system 1 of the first embodiment is replaced with the image transmitter 7100 and the image receiver 200 is replaced with the image receiver 7200.

Also, the synchronization signal generation unit 5101 provided in the image transmitter 7100 is similar to the synchronization signal generation unit 5101 provided in the image transmitter 5100 in the image transfer system 5 of the fourth embodiment shown in FIG. 25. Also, the estimation 6114 and the data selection unit 6116 provided in the image transmitter 7100 and the measurement unit 6113 provided in the communication unit 7104 are similar to the estimation unit 6114 and the data selection unit 6116 provided in the image transmitter 6100 and the measurement unit 6113 provided in the communication unit 6104 in the image transfer system 6 of the fifth embodiment shown in FIG. 30, respectively. In the following description, the components of the image transfer system 7 similar to those provided in the image transfer system 1 of the first embodiment, the image transfer system 5 of the fourth embodiment, or the image transfer system 6 of the fifth embodiment are denoted by the same reference signs for description.

Similar to the image transfer system 6 of the fifth embodiment, the image transfer system 7 has a configuration in which the image receiver 7200 transmits the display timing signal generated by the synchronization signal generation unit 7205 to the image transmitter 7100 and a deviation of the cycle or the phase of the display timing signal generated by the synchronization signal generation unit 7205 is estimated by the configuration of the measurement unit 6113, the data selection unit 6116, and the estimation unit 6114 within the communication unit 7104 provided in the image transmitter 7100. Then, the image transfer system 7 has a configuration in which the image transmitter 7100 transmits the adjustment instruction signal calculated on the basis of the estimated cycle or phase of the display timing signal to the image receiver 7200, and the synchronization signal generation unit 7205 included in the image receiver 7200 adjusts the cycle or the phase of the display timing signal to be generated in accordance with the adjustment instruction signal transmitted from the image transmitter 7100 as in the image transfer system 5 of the fourth embodiment. Thus, the image transfer system 7 is different from the image transfer system 1 of the first embodiment in that the image receiver 7200 is configured to transmit a display timing signal generated by the synchronization signal generation unit 7205 to the image transmitter 7100 and the image transmitter 7100 is configured to transmit an adjustment instruction signal to the image receiver 7200.

More specifically, in the image transfer system 7, the communication unit 7201 provided in the image receiver 7200 transmits the display timing signal (in particular, the display vertical synchronization signal) generated by the synchronization signal generation unit 7205 to the image transmitter 7100. Also, in the image transfer system 7, the cycle or the phase of the display vertical synchronization signal generated by the synchronization signal generation unit 7205 provided in the image receiver 7200 is estimated by the configuration of the measurement unit 6113, the data selection unit 6116, and the estimation unit 6114 within the communication unit 7104 provided in the image transmitter 7100. Also, in the image transfer system 7, the communication unit 7104 provided in the image transmitter 7100 transmits the adjustment instruction signal calculated on the basis of the cycle or the phase of the display timing signal estimated by the estimation unit 6114 to the image receiver 7200. Also, in the image transfer system 7, the synchronization signal generation unit 7205 provided in the image receiver 7200 adjusts the cycle or the phase of the display timing signal to be generated in accordance with the adjustment instruction signal transmitted from the image transmitter 7100. In this manner, the image transfer system 7 is different from the image transfer system 1 of the first embodiment in that the cycle or the phase of the display timing signal to be generated thereafter is adjusted on the basis of the display timing signal (in particular, the display vertical synchronization signal) generated by the synchronization signal generation unit 7205 provided in the image receiver 7200. In other words, the image transfer system 7 is different from the image transfer system 1 of the first embodiment in that the adjustment of the cycle or the phase of the vertical synchronization signal to be generated thereafter on the basis of the vertical synchronization signal generated by the synchronization signal generation unit 101 as in the image transfer system 1 of the first embodiment is not performed.

Also, operations or processes of the components of the image transfer system 7 similar to those of the image transfer system 1 of the first embodiment, the image transfer system 5 of the fourth embodiment, or the image transfer system 6 of the fifth embodiment denoted by the same reference signs are similar to those of the corresponding components. In other words, operations or processes of components other than the communication unit 7104 provided in the image transmitter 7100 constituting the image transfer system and operations or processes of components other than the communication unit 7201 and the synchronization signal generation unit 7205 provided in the image receiver 7200 constituting the image transfer system 7 are similar to those of the components of the image transfer system 1 of the first embodiment, the image transfer system 5 of the fourth embodiment, or the image transfer system 6 of the fifth embodiment. Accordingly, in the description of the image transfer system 7, only operations or processes of components different from those of the image transfer system 1 of the first embodiment, the image transfer system 5 of the fourth embodiment, and the image transfer system 6 of the fifth embodiment, i.e., the communication unit 7104 provided in the image transmitter 7100 and the communication unit 7201 and the synchronization signal generation unit 7205 provided in the image receiver 7200, will be described, and a detailed description of operations or processes of other components will be omitted.

Similar to the communication unit 104 provided in the image transmitter 100 in the image transfer system 1 of the first embodiment or the communication unit 6104 provided in the image transmitter 6100 in the image transfer system 6 of the fifth embodiment, the communication unit 7104 transmits the transmission image data TrD including captured image data for wireless transfer output from the data generation unit 103 to the image receiver 7200 via the antenna 105 for wireless communication. At this time, similar to the communication unit 6104, the communication unit 7104 may have a configuration in which the vertical synchronization signal generated by the synchronization signal generation unit 5101 is not transmitted to the image receiver 7200.

Also, similar to the communication unit 6104, the communication unit 7104 receives the display timing signal TrV transmitted from the image receiver 7200 via the antenna 105 and outputs the display vertical synchronization signal included in the received display timing signal TrV to the measurement unit 6113 provided in the communication unit 7104. Also, similar to the communication unit 6104, the communication unit 7104 also outputs a connection establishment signal indicating that the wireless connection with the image receiver 7200 has been established to the measurement unit 6113.

Further, the communication unit 7104 transmits an adjustment instruction for issuing an instruction for adjusting of the cycle or the phase of the display vertical synchronization signal output from the estimation unit 6114, i.e., an adjustment instruction signal TrA for wirelessly transferring a cycle adjustment instruction signal γ or a phase adjustment instruction signal δ to the image receiver 7200 via the antenna 105.

Also, because an interval at which the communication unit 7104 transmits the adjustment instruction signal TrA to the image receiver 7200 is shorter than an interval at which the communication unit 7104 transmits the transmission image data TrD to the image receiver 7200, the captured image data frame interval (frame rate), it is possible to minimize a bandwidth when the adjustment instruction signal TrA between the image transmitter 7100 and the image receiver 7200 is wirelessly transferred.

Similar to the communication unit 201 provided in the image receiver 200 in the image transfer system 1 of the first embodiment or the communication unit 6201 provided in the image receiver 6200 in the image transfer system 6 according to the fifth embodiment, the communication unit 7201 receives the transmission image data TrD transmitted from the image transmitter 7100 via the antenna 207. Then, the communication unit 7201 outputs captured image data included in the received transmission image data TrD to the display unit 202. Also, similar to the communication unit 6201, the communication unit 7201 transmits a display timing signal TrV for wirelessly transferring the display vertical synchronization signal output from the synchronization signal generation unit 7205 to the image transmitter 7100 via the antenna 207.

Further, the communication unit 7201 receives the adjustment instruction signal TrA transmitted from the image transmitter 7100 via the antenna 207, and outputs an adjustment instruction of the cycle or the phase of the display vertical synchronization signal included in the received adjustment instruction signal TrA, i.e., the cycle adjustment instruction signal γ or the phase adjustment instruction signal δ, to the synchronization signal generation unit 7205.

Similar to the synchronization signal generation unit 205 provided in the image receiver 200 in the image transfer system 1 of the first embodiment or the synchronization signal generation unit 5205 provided in the image receiver 5200 in the image transfer system 5 of the fourth embodiment, the synchronization signal generation unit 7205 generates a display timing signal serving as a reference for displaying a display image according to the captured image data included in the transmission image data TrD transmitted from the image transmitter 7100. At this time, similar to the synchronization signal generation unit 5205, the synchronization signal generation unit 7205 generates a display timing signal in which the cycle or the phase are corrected in accordance with the input adjustment instruction when an instruction for adjusting the cycle or the phase of the display vertical synchronization signal included in the adjustment instruction signal TrA transmitted from the image transmitter 7100 has been input from the communication unit 7201. Here, the adjustment instruction signal input to the synchronization signal generation unit 7205 is an adjustment instruction signal calculated on the basis of the display vertical synchronization signal generated by the synchronization signal generation unit 7205 instead of the adjustment instruction signal input to the synchronization signal generation unit 5205, i.e., the adjustment instruction signal calculated on the basis of the vertical synchronization signal generated by the synchronization signal generation unit 5101 provided in the image transmitter 7100. Then, the synchronization signal generation unit 7205 outputs the generated display timing signal to each of the display unit 202 and the communication unit 7201. Also, similar to the synchronization signal generation unit 5205, the display timing signal output by the synchronization signal generation unit 7205 to the communication unit 7201 may be only the display vertical synchronization signal. Also, similar to the synchronization sisal generation unit 205 or the synchronization signal generation unit 5205, the synchronization signal generation unit 7205 may have a configuration including a crystal oscillation IC (not shown) that generates a reference clock signal.

According to such a configuration, in the image transfer system 7, the synchronization signal generation unit 7205 adjusts the cycle or the phase of the generated display timing signal in accordance with the adjustment instruction signal calculated by the estimation unit 6114 on the basis of the display timing signal (particularly, the display vertical synchronization signal) generated by the synchronization signal generation unit 7205.

Figure 37:
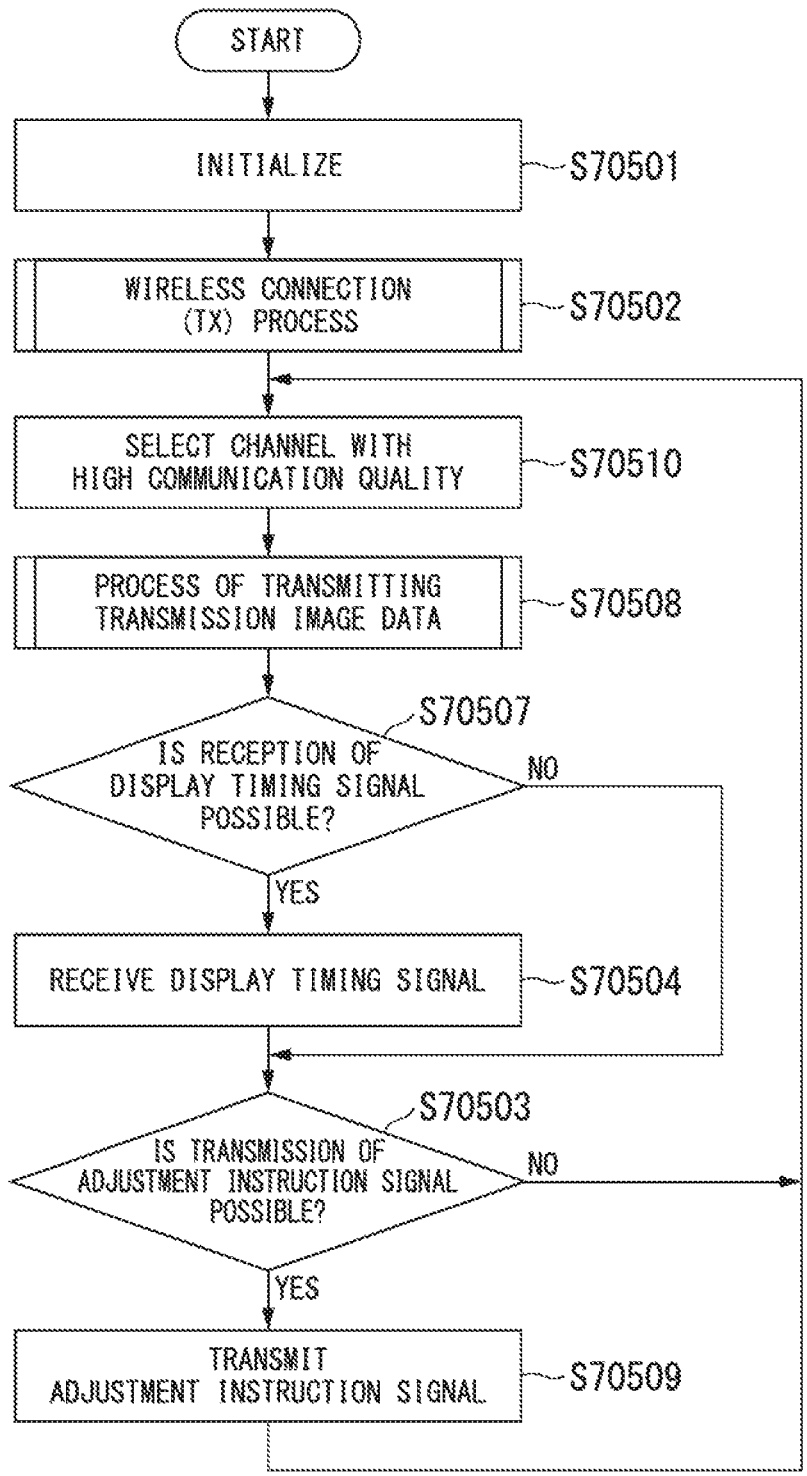
FIG. 37 is a flowchart showing a processing procedure of a communication unit provided in an image transmitter constituting the image transfer system according to the sixth embodiment of the present invention.

Next, the operation of each component constituting the image transfer system 7 will be described. First, the operation of the communication unit 7104 provided in the image transmitter 7100 constituting the image transfer system 7 will be described. FIG. 37 is a flowchart showing a processing procedure of the communication unit 7104 provided in the image transmitter 7100 constituting the image transfer system 7 according to the sixth embodiment of the present invention. The communication unit 7104 performs the transmission of the captured image data for wireless transfer, i.e., the transmission image data TrD, to the image receiver 7200, the reception of the display timing signal TrV transmitted from the image receiver 7200, i.e., the display vertical synchronization signal, and the transmission of an adjustment instruction signal for issuing an instruction for adjusting a cycle or a phase of the display vertical synchronization signal, i.e. the adjustment instruction signal TrA, to the image receiver 7200 in the following processing procedure.

When the image transmitter 7100 is activated, the communication unit 7104 first initializes the components within the communication unit 7104 (step S70501).

Subsequently, the communication unit 7104 performs a wireless connection (TX) process on a channel of wireless communication with the image receiver 7200 (more specifically, the communication unit 7201 provided in the image receiver 7200) via the antenna 105 (step S70502). The wireless connection (TX) process in step S70502 is similar to the wireless connection (TX) process of step S502 in the communication unit 104 provided in the image transmitter 100 constituting the image transfer system 1 of the first embodiment shown in FIG. 8, i.e., the wireless connection (TX) process shown in FIG. 10. Accordingly, a detailed description of the processing procedure of the wireless connection (TX) process to be performed by the communication unit 7104 in step S70502 will be emitted.

Subsequently, after the wireless connection with the communication unit 7201 is established, the communication unit 7104 selects a (relatively good) channel with high communication quality from among currently available channels (free channels) (step S70510).

Subsequently, the communication unit 7104 performs the transmission image data TrD transmission process of wirelessly transferring the captured image data for wireless transfer output from the data generation unit 103 to the communication unit 7201 via the antenna 105 by using the selected wireless communication channel (step S70508). The transmission image data TrD transmission process in this step S70508 is similar to the transmission image data TrD transmission process of step S508 in the communication unit 104 provided in the image transmitter 100 constituting the image transfer system 1 of the first embodiment shown in FIG. 8, i.e., the transmission image data TrD transmission process shown in FIG. 9. However, in the image transfer system 7, the communication unit 7104 may have a configuration in which the communication unit 7104 does not transmit the vertical synchronization signal, which is transmitted to the image receiver 200 by the communication unit 104 provided in the image transmitter 100 in the image transfer system 1 of the first embodiment, to the image receiver 7200. The transmission image data TrD transmission process in step S70508 in this configuration is similar to the transmission image data TrD transmission process of step S60508 of the communication unit 6104 provided in the image transmitter 6100 constituting the image transfer system 6 of the fifth embodiment shown in FIG. 33, i.e., the transmission image data TrD transmission process shown in FIG. 34. Accordingly, a detailed description of the processing procedure of the transmission image data TrD transmission process to be performed by the communication unit 7104 in step S70508 will be omitted.

Subsequently, the communication unit 7104 determines whether or not it is possible to receive the display timing signal TrV transmitted from the image receiver 7200 (more specifically, the communication unit 7201 provided in the image receiver 7200) (step S70507).

If a result of the determination in step S70507 indicates that the display timing signal TrV transmitted from the communication unit 7201 cannot be received ("NO" in step S70507), the communication unit 7104 proceeds to step S70503.

On the other hand, if a result of the determination in step S70507 indicates that the display timing signal TrV transmitted from the communication unit 7201 can be received ("YES" in step S70507), the communication unit 7104 receives the display timing signal TrV transmitted from the communication unit 7201 (step S70504). Then, the communication unit 7104 outputs the display vertical synchronization signal included in the received display timing signal TrV to the measurement unit 6113 provided in the communication unit 7104.

Subsequently, the communication unit 7104 determines whether or not it is possible to transmit the adjustment instruction signal output from the estimation unit 6114 as the adjustment instruction signal TrA to the image receiver 7200 (more specifically, the communication unit 7201 provided in the image receiver 7200) (step S70503).

If a result of the determination in step S70503 indicates that the adjustment instruction signal TrA cannot be transmitted to the communication unit 7201 ("NO" in step S70503) the communication unit 7104 returns to step S70510 to select a channel with higher communication quality. In other words, the communication unit 7104 performs the transmission image data TrD transmission process corresponding to the captured image data of the next frame on the wireless communication channel with higher communication quality in steps S70510 and S70508.

On the other hand, if a result of the determination in step S70503 indicates that the adjustment instruction signal TrA can be transmitted to the communication unit 7201 ("YES" in step S70503), the communication unit 7104 transmits the adjustment instruction signal TrA according to the adjustment instruction signal output from the estimation unit 6114 to the communication unit 7201 (step S70509). More specifically, the communication unit 7104 transmits an instruction for adjusting the cycle or the phase of the display vertical synchronization signal output from the estimation unit 6114, i.e., the adjustment instruction signal TrA according to the cycle adjustment instruction signal γ or the phase adjustment instruction signal δ, to the communication unit 7201. Thereafter, the communication unit 7104 returns to step S70510.

According to such processing, the communication unit 7104 iterates a process of wirelessly transferring the captured image data for wireless transfer output from the data generation unit 103 as the transmission image data TrD, a process of receiving the display timing signal TrV transmitted from the image receiver 7200 and outputting the received display timing signal TrV to the measurement unit 6113, and a process of wirelessly transferring the adjustment instruction signal output from the estimation unit 6114 as the adjustment instruction signal TrA.

Figure 38:
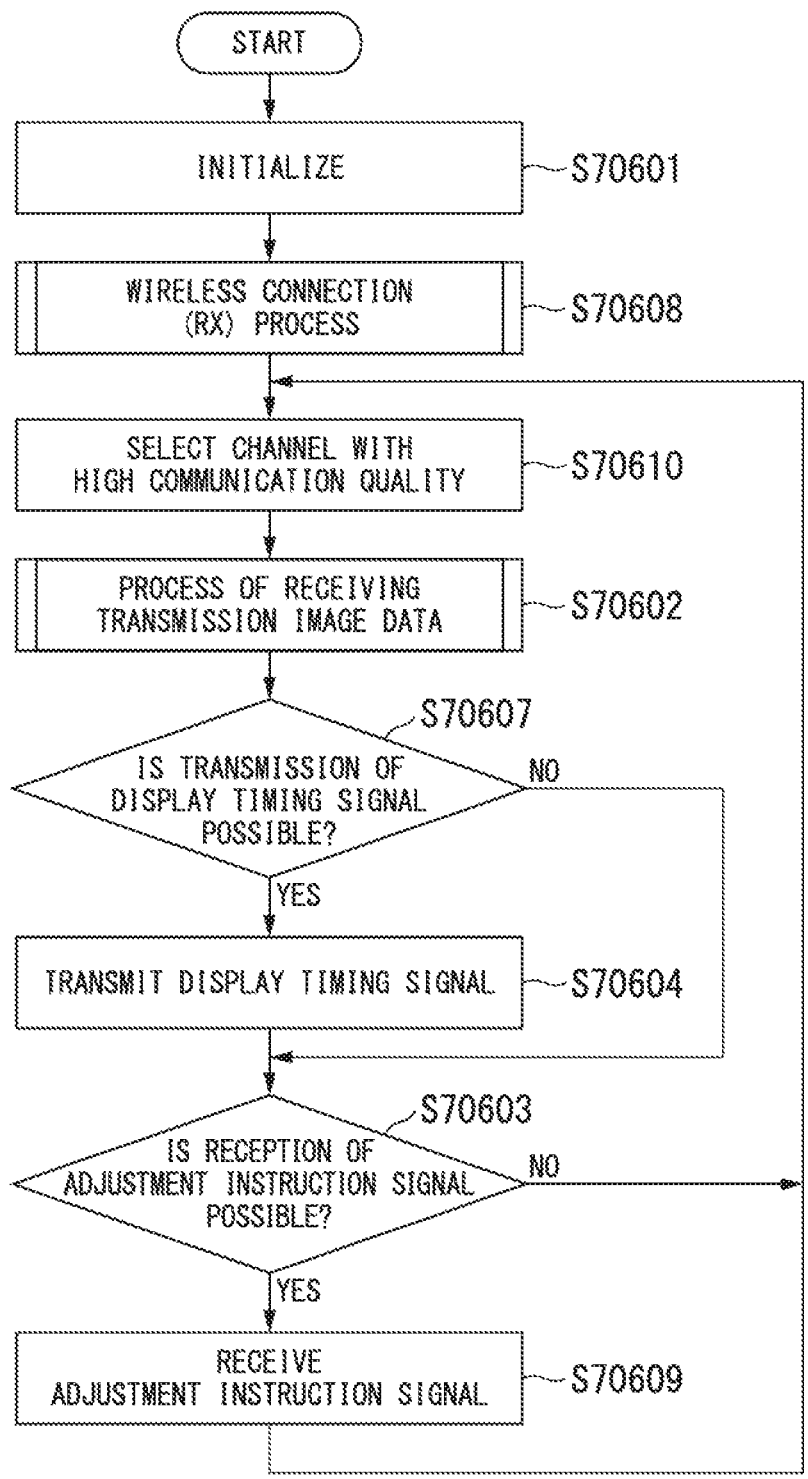
FIG. 38 is a flowchart showing a processing procedure of a communication unit provided in an image receiver constituting the image transfer system according to the sixth embodiment of the present invention.

Next, the operation of the communication unit 7201 provided in the image receiver 7200 constituting the image transfer system 7 will be described. FIG. 38 is a flowchart showing a processing procedure of the communication unit 7201 provided in the image receiver 7200 constituting the image transfer system 7 according to the sixth embodiment of the present invention. The communication unit 7201 performs the reception of the transmission image data TrD transmitted from the image transmitter 7100, i.e., the captured image data, the transmission of the display timing signal TrV according to the display timing, signal output from the synchronization signal generation unit 7205, i.e., the display vertical synchronization signal, to the image transmitter 7100, and the reception of an adjustment instruction signal for issuing an instruction for adjusting the cycle or the phase of the display vertical synchronization signal transmitted from the image transmitter 7100, i.e., the adjustment instruction signal TrA, in the following processing procedure.

When the image receiver 7200 is activated, the communication unit 7201 first initializes the components within the communication unit 7201 (step S70601).

Subsequently, the communication unit 7201 performs a wireless connection (RX) process on the wireless communication channel with the image transmitter 7100 (more specifically, the communication unit 7104 provided in the image transmitter 7100) via the antenna 207 (step S70608). The wireless connection (RX) process in this step S70608 is similar to the wireless connection (RX) process of step S608 in the communication unit 201 provided in the image receiver 200 constituting the image transfer system 1 of the first embodiment shown in FIG. 11, i.e., the wireless connection (RX) process shown in FIG. 12. Accordingly, a detailed description of the processing procedure of the wireless connection (RX) process to be performed by the communication unit 7104 in step S70608 will be omitted.

Subsequently, after a wireless connection with the communication unit 7104 is established, the communication unit 7201 selects a (relatively good) channel with high communication quality from among currently available channels (free channels) (step S70610).

Subsequently, the communication unit 7201 performs a transmission image data TrD reception process of receiving the transmission image data TrD transmitted from the communication unit 7104 via the antenna 207 by using the selected wireless communication channel (step S70602). The transmission image data TrD reception process in this step S70602 is similar to the transmission image data TrD reception process of step S602 in the communication unit 201 provided in the image receiver 200 constituting the image transfer system 1 of the first embodiment shown in FIG. 11, i.e., the transmission image data TrD reception process shown in FIG. 13. However, the image transfer system 7 may have a configuration in which the communication unit 7104 does not transmit the vertical synchronization signal, which is transmitted to the image receiver 200 by the communication unit 104 provided in the image transmitter 100 in the image transfer system 1 of the first embodiment, to the image receiver 7200. The transmission image data TrD reception process in step S70602 in the case of the above configuration is similar to the transmission image data TrD reception process of step S60602 in the communication unit 6201 provided in the image receiver 6200 constituting the image transfer system 6 of the fifth embodiment shown in FIG. 31, i.e., the transmission image data TrD reception process shown in FIG. 32. Accordingly, a detailed description of the processing procedure of the transmission image data TrD reception process to be performed by the communication unit 7201 in step S70602 will be omitted.

Subsequently, the communication unit 701 determines whether or not it is possible to transmit the display timing signal output from the synchronization signal generation unit 7205 as the display timing signal TrV to the image transmitter 7100 (more specifically, to the communication unit 7104 provided in the image transmitter 7100) (step S70607). In other words, the communication unit 7201 checks whether or not the display timing signal has been output from the synchronization signal generation unit 7205.

If a result of the determination in step S70607 indicates that the display timing signal TrV cannot be transmitted to the communication unit 7104 ("NO" in step S70607), the communication unit 7201 proceeds to step S70603.

On the other hand, if a result of the determination in step S70607 indicates that the display timing signal TrV can be transmitted to the communication unit 7104 ("YES" in step S70607), the communication unit 7201 transmits the display timing signal TrV according to the display timing signal output from the synchronization signal generation unit 7205 to the communication unit 7104 (step S70604). More specifically, the communication unit 7201 transmits the display timing signal TrV according to the display vertical synchronization signal included in the display timing signal output from the synchronization signal generation unit 7205 to the communication unit 7104.

Subsequently, the communication unit 7201 determines whether or not it is possible to receive the adjustment instruction signal TrA transmitted from the image transmitter 7100 (more specifically, the communication unit 7104 provided in the image transmitter 7100) (step S70603).

If a result of the determination in step S70603 indicates that the adjustment instruction signal TrA transmitted from the communication unit 7104 cannot be received ("NO" in step S70603), the communication unit 7201 returns to step S70610 to select a channel with high communication quality. In other words, the communication unit 7201 performs the transmission image data TrD reception process corresponding to the captured image data of the next frame on the wireless communication channel with high communication quality in steps S70610 and S70602.

On the other hand, if a result of the determination in step S70603 indicates the adjustment instruction signal TrA transmitted from the communication unit 7104 can be received ("YES" in step S70603), the communication unit 7201 receives the adjustment instruction signal TrA transmitted from the communication unit 7104 (step S70609). Then, the communication unit 7201 outputs an instruction for adjusting the cycle or the phase of the display vertical synchronization signal included in the received adjustment instruction signal TrA, i.e., the cycle adjustment instruction signal γ or the phase adjustment instruction signal δ, to the synchronization signal generation unit 7205. Thereafter, the communication unit 7201 returns to step S70610.

According to such processing, the communication unit 7201 iterates a process of receiving the transmission image data TrD transmitted from the image transmitter 7100 and outputting the captured image data to the display unit 202, a process of wirelessly transferring the display timing signal as the display timing signal TrV indicating the display vertical synchronization signal output from the synchronization signal generation unit 7205, and a process of receiving the adjustment instruction signal TrA transmitted from the image transmitter 7100 and outputting the adjustment instruction signal to the synchronization signal generation unit 7205.

Thereby, the synchronization signal generation unit 7205 generates a display timing signal obtained by adjusting the cycle or the phase in accordance with the input adjustment instruction, i.e., the cycle adjustment instruction signal γ or the phase adjustment instruction signal δ. Also, the process in which the synchronization signal generation unit 7205 generates the display timing signal is similar to a process in which the synchronization signal generation unit 5205 provided in the image receiver 5200 generates the display timing signal in the image transfer system 5 of the fourth embodiment, and can be easily conceived by replacing the adjustment instruction signal output from the estimation unit 204 in the synchronization signal generation unit 5205 with the adjustment instruction signal output from the communication unit 7201. More specifically, the synchronization signal generation unit 7205 determines whether or not the adjustment instruction signal has been output from the communication unit 7201 in step S51403 in the processing procedure in which the synchronization signal generation unit 5205 shown in FIG. 29 generates the display timing signal, and makes a change to the setting according to the cycle adjustment instruction signal γ or the phase adjustment instruction signal δ included in the adjustment instruction signal output from the communication unit 7201 in step S51404. Thereby, the synchronization signal generation unit 7205 can generate the display timing signal adjusted to the cycle or the phase according to the adjustment instruction included in the adjustment instruction signal TrA transmitted from the image transmitter 7100. Accordingly, a detailed description of the processing procedure of the process in which the synchronization signal generation unit 7205 generates the display timing signal will be omitted.

In this manner, in the image transfer system 7, the synchronization signal generation unit 7205 provided in the image receiver 7200 adjusts the cycle or the phase of the display vertical synchronization signal for causing the liquid crystal display (not shown) connected to the display unit 202 to display the display image according to the captured image data on the basis of the display vertical synchronization signal included in the display timing signal TrV transmitted from the image receiver 7200. In other words, in the image transfer system 7, the synchronization signal generation unit 7205 adjusts the cycle or the phase of the generated display timing signal in accordance with the adjustment instruction signal calculated on the basis of the display timing signal (in particular, the display vertical synchronization signal) generated by the synchronization signal generation unit 7205.

As described above, in the image transfer system 7 of the sixth embodiment, the cycle or the phase of the display vertical synchronization signal are estimated within the image transmitter 7100 on the basis of the display timing signal for causing the connected liquid crystal display (not shown) to display the display image according to the captured image data generated by the synchronization signal generation unit 7205 provided in the image receiver 7200. In the image transfer system 7 of the sixth embodiment, the cycle or the phase of the display timing signal generated by the synchronization signal generation unit 7205 provided in the image receiver 7200 is adjusted on the basis of the estimated cycle or phase of the vertical synchronization signal.

Thereby, in the image transfer system 7 of the sixth embodiment, as in the image transfer system 1 of the first embodiment, unnecessary timing adjustment of the vertical synchronization signal is not performed and the cycle or the phase of the vertical synchronization signal is synchronized in the image transmitter 7100 and the image receiver 7200, so that the image receiver 7200 can cause a display image according to captured image data transmitted after imaging performed by the image transmitter 7100 to be stably displayed.

Also, in the configuration of the image transfer system 7 shown in FIG. 36, as in the configuration of the image transfer system 6 of the fifth embodiment shown in FIG. 30, the configuration in which the measurement unit 6113 is provided within the communication unit 7104 is shown, but the measurement unit 6113 may be arranged outside the communication unit 7104.

Seventh Embodiment

Figure 39:
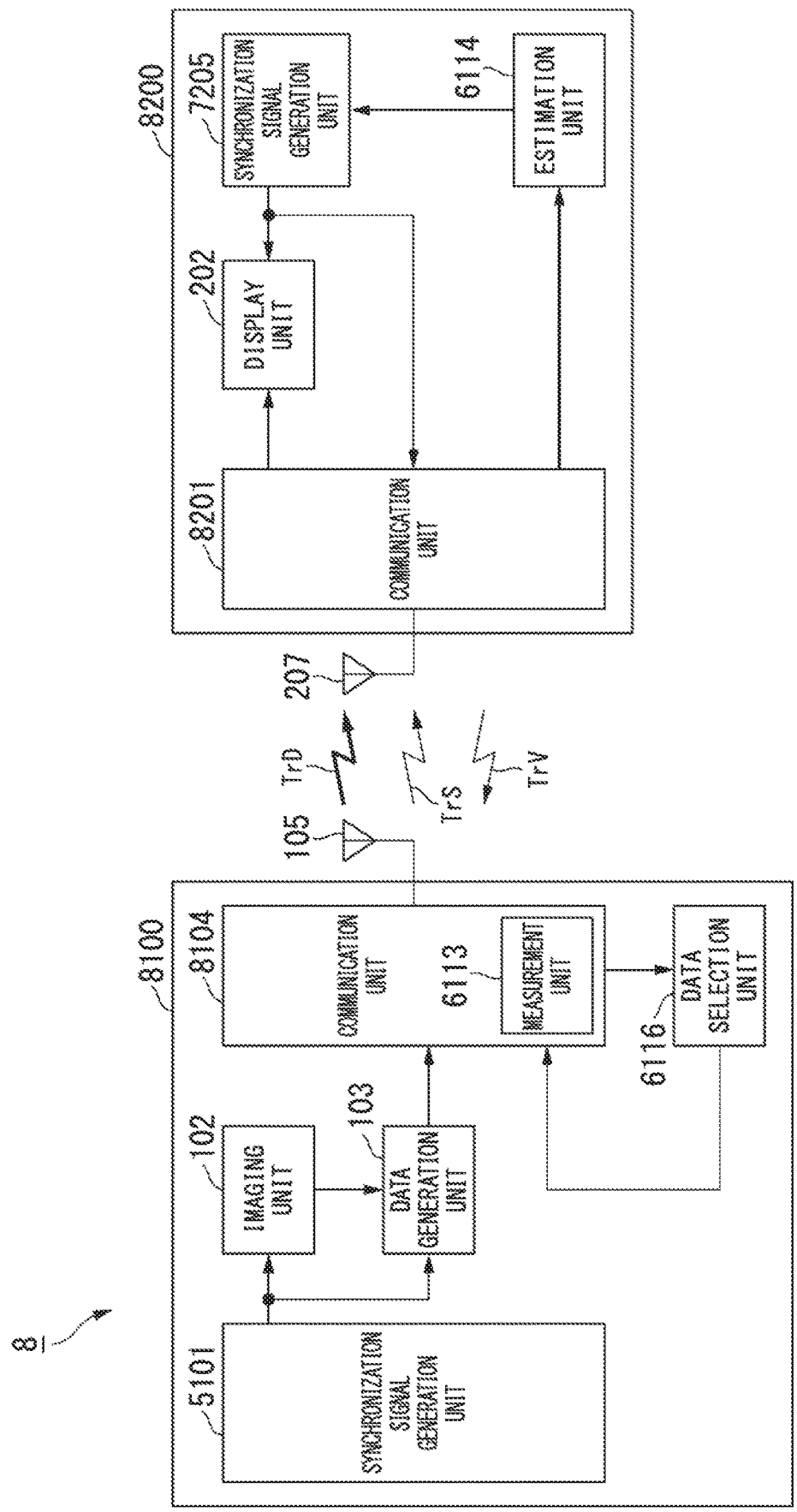
FIG. 39 is a block diagram showing a schematic configuration of an image transfer system according to a seventh embodiment of the present invention.

Hereinafter, an image transfer system according to a seventh embodiment of the present invention will be described. FIG. 39 is a block diagram showing a schematic configuration of the image transfer system according to the seventh embodiment of the present invention. An image transfer system 8 includes an image transmitter 8100 and an image receiver 8200. The image transmitter 8100 includes a synchronization signal generation unit 5101, an imaging unit 102, a data generation unit 103, a communication unit 8104, an antenna 105, and a data selection unit 6116. Also, the communication unit 8104 includes a measurement unit 6113. Also, the image receiver 8200 includes a communication unit 8201, a display unit 202, an estimation unit 6114, a synchronization signal generation unit 7205, and an antenna 207.

The image transfer system 8 has a configuration in which the estimation unit 6114 provided in the image transmitter 7100 is arranged in the image receiver 7200 in the image transfer system 7 of the sixth embodiment shown in FIG. 36. The communication unit 7104 provided in the image transmitter 7100 is replaced with the communication unit 8104 and the communication unit 7201 provided in the image receiver 7200 is replaced with the communication unit 8201. Accordingly, in the image transfer system 8, the image transmitter 7100 constituting the image transfer system 7 of the sixth embodiment is replaced with the image transmitter 8100, and the image receiver 7200 is replaced with the image receiver 8200. In the following description, the components of the image transfer system 8 similar to those of the image transfer system 7 of the sixth embodiment are denoted by the same reference signs for description.

Similar to the image transfer system 7 of the sixth embodiment, the image transfer system 8 has a configuration in which the synchronization signal generation unit 7205 provided in the image receiver 8200 adjusts the cycle or the phase of the generated display timing signal in accordance with the adjustment instruction signal calculated by the estimation unit 6114 on the basis of the display timing signal (in particular, the display vertical synchronization signal) generated by the synchronization signal generation unit 7205. However, in the image transfer system 8, the estimation unit 6114 is configured to be arranged in the image receiver 8200. Thus, the image transfer system 8 is different from the image transfer system 7 of the sixth embodiment in that a signal related to the adjustment of the cycle or the phase of the display timing signal transmitted by the communication unit 8104 of the image transmitter 8100 to the image receiver 8200 is display selection data selected by the data selection unit 6116 instead of the adjustment instruction signal TrA.

More specifically, in the image transfer system 8, the communication 8104 provided in the image transmitter 8100 transmits the display selection data selected by a configuration of the measurement unit 6113 within the communication unit 8104 and the data selection unit 6116 provided in the image transmitter 8100 to the image receiver 8200. Then, in the image transfer system 8, the estimation unit 6114 provided in the image receiver 8200 estimates the cycle or the phase of the display vertical synchronization signal generated by the synchronization signal generation unit 7205 provided in the image receiver 8200 on the basis of the display selection data transmitted from the image transmitter 8100 and outputs an adjustment instruction signal calculated on the basis of the estimated cycle or phase of the display timing signal to the synchronization signal generation unit 7205. Thereby, the synchronization signal generation unit 7205 adjusts the cycle or the phase of the display timing signal to be generated in accordance with the adjustment instruction signal output from the estimation unit 6114.

Also, operations or processes of the components of the image transfer system 8 similar to those of the image transfer system 7 of the sixth embodiment denoted by the same reference signs are similar to those of the corresponding components. In other words, operations or processes of components other than the communication unit 8104 provided in the image transmitter 8100 constituting the image transfer system 8 and operations or processes of components other than the communication unit 8201 provided in the image receiver 8200 constituting the image transfer system 8 are similar to those of the corresponding components of the image transfer system 7 of the sixth embodiment. Accordingly, in the description of the image transfer system 8, only operations or processes of components different from those of the image transfer system 7 of the sixth embodiment, i.e., the communication unit 8104 provided in the image transmitter 8100 and the communication unit 8201 provided in the image receiver 8200, will be described, and a detailed description of operations or processes of other components will be omitted.

Similar to the communication unit 7104 provided in the image transmitter 7100 in the image transfer system 7 of the sixth embodiment, the communication unit 8104 transmits the transmission image data TrD including the captured image data for wireless transfer output from the data generation unit 103 to the image receiver 8200 via the antenna 105 for wireless communication. At this time, similar to the communication unit 7104, the communication unit 8104 may have a configuration in which the vertical synchronization signal generated by the synchronization signal generation unit 5101 is not transmitted to the image receiver 8200. Also, similar to the communication unit 7104, the communication unit 8104 receives the display timing signal TrV transmitted from the image receiver 8200 via the antenna 105 and outputs the display vertical synchronization signal included in the received display timing signal TrV to the measurement unit 6113 provided in the communication unit 8104. Similar to the communication unit 7104, the communication unit 8104 also outputs a connection establishment signal indicating that a wireless connection with the image receiver 8200 has been established to the measurement unit 6113.

Further, the communication unit 8104 transmits display selection data output from the data selection unit 6115, i.e., display selection data TrS for wirelessly transferring selection data for calculating the adjustment instruction signal for issuing an instruction for adjusting the cycle or the phase of the display vertical synchronization signal, to the image receiver 8200 via the antenna 105.

Similar to the communication unit 7201 provided in the image receiver 7200 in the image transfer system 7 of the sixth embodiment, the communication unit 8201 receives the transmission image data TrD transmitted from the image transmitter 8100 via the antenna 207. Then, the communication unit 8201 outputs captured image data included in the received transmission image data TrD to the display unit 202. Also, similar to the communication unit 7201, the communication unit 8201 transmits the display timing signal TrV for wirelessly transferring the display vertical synchronization signal output from the synchronization signal generation unit 7205 to the image transmitter 8100 via the antenna 207.

Further, the communication unit 8201 receives the display selection data TrS including the display selection data transmitted from the image transmitter 8100 via the antenna 207 and outputs the display selection data included in the received display selection data TrS to the estimation unit 6114.

According to this configuration, in the image transfer system 8, as in the image transfer system 7 of the sixth embodiment, the synchronization signal generation unit 7205 adjusts the cycle or the phase of the generated display timing signal in accordance with the adjustment instruction signal calculated by the estimation unit 6114 on the basis of the display timing signal (in particular, the display vertical synchronization signal) generated by the synchronization signal generation unit 7205.

Next, the operation of each component constituting the image transfer system 8 will be described. First, the operation of the communication unit 8104 provided in the image transmitter 8100 constituting the image transfer system 8 will be described.

A process in which the communication unit 8104 transmits the transmission image data TrD to the image receiver 8200, a process of receiving the display timing signal TrV transmitted from the image receiver 8200, and a process of transmitting display selection data output from the data selection unit 6116 as the display selection data TrS to the image receiver 8200 can be considered to be similar to the processes in the communication unit 7104 provided in the image transmitter 7100 in the image transfer system 7 of the sixth embodiment. In other words, the present embodiment can be easily conceived by replacing the process in which the communication unit 7104 transmits the adjustment instruction signal TrA to the image receiver 7200 with the process of transmitting the display selection data TrS to the image receiver 8200 in the communication unit 8104.

More specifically, the determination of step S70503 in the processing procedure of wireless transfer in the communication unit 7104 shown in FIG. 37 is replaced with a determination of whether or not it is possible to transmit the display selection data output from the data selection unit 6116 as display selection data TrS to the image receiver 8200 (more specifically, the communication unit 8201 provided in the image receiver 8200) in the communication unit 8104. Also, the processing of step S70509 in the wireless transfer processing procedure in the communication unit 7104 shown in FIG. 37 is replaced with a process in which the communication unit 8104 transmits the display selection data TrS including the display selection data output from the data selection unit 6116 to the communication unit 8201. Accordingly, the communication unit 8104 can perform each of the transmission of the transmission image data TrD to the image receiver 8200, the reception of the display timing signal TrV transmitted from the image receiver 8200, and the transmission of the display selection data TrS to the image receiver 8200. Accordingly, a detailed description of the wireless transfer processing procedure in the communication unit 8104 will be omitted.

Next, the operation of the communication unit 8201 provided in the image receiver 8200 constituting the image transfer system 8 will be described.

A process in which the communication unit 8201 receives the transmission image data TrD transmitted from the image transmitter 8100, a process of transmitting the display timing signal TrV to the image transmitter 8100, and a process of receiving the display selection data TrS transmitted from the image transmitter 8100 can be considered to be similar to a process in the communication unit 7201 provided in the image receiver 7200 in the image transfer system 7 of the sixth embodiment. In other words, the present embodiment can be easily conceived by replacing a process in which the communication unit 7201 receives the adjustment instruction signal TrA transmitted from the image transmitter 7100 with a processing of receiving the display selection data TrS transmitted from the image transmitter 8100 in the communication unit 8201.

More specifically the determination in step S70603 in the wireless transfer processing procedure in the communication unit 7201 shown in FIG. 38 is replaced with a determination of whether or not it is possible to receive the display selection data TrS transmitted from the image transmitter 8100 (more specifically, the communication unit 8104 provided in the image transmitter 8100) in the communication unit 8201. Also, the processing of step S70609 in the wireless transfer processing procedure in the communication unit 7201 shown in FIG. 38 is replaced with a process in which the communication unit 8201 receives the display selection data TrS transmitted from the communication unit 8104 and outputs the display selection data included in the received display selection data TrS to the estimation unit 6114. Thereby, the communication unit 8201 can perform the process of each of the reception of the transmission image data TrD transmitted from the image transmitter 8100, the transmission of the display timing signal TrV to the image transmitter 8100, and the reception of the display selection data TrS transmitted from the image transmitter 8100. Accordingly a detailed description of the wireless transfer processing procedure in the communication unit 8201 will be omitted.

In this manner, in the image transfer system 8, as in the image transfer system 7 of the sixth embodiment, the synchronization signal generation unit 7205 provided in the image receiver 8200 adjusts the cycle or the phase of the displaying timing signal for causing the liquid crystal display (not shown) connected to the display unit 202 to display a display image according to captured image data in accordance with the adjustment instruction signal calculated on the basis of the display timing signal (in particular, a display vertical synchronization signal) generated by the synchronization signal generation unit 7205.

As described above, in the image transfer system 8 of the seventh embodiment, as in the image transfer system 7 of the sixth embodiment, the cycle or the phase of the display vertical synchronization signal are estimated within the image transmitter 8100 on the basis of a display timing signal for causing the connected liquid crystal display (not shown) to display a display image according to the captured image data generated by the synchronization signal generation unit 7205 provided in the image receiver 8200. In the image transfer system 8 of the seventh embodiment, as in the image transfer system 7 of the sixth embodiment, the cycle or the phase of the display timing signal generated by the synchronization signal generation unit 7205 provided in the image receiver 8200 is adjusted on the basis of the estimated cycle or phase of the vertical synchronization signal. Thereby, in the image transfer system 8 of the seventh embodiment, as in the image transfer system 7 of the sixth embodiment, unnecessary timing adjustment of the vertical synchronization signal is not performed and the cycle or the phase of the vertical synchronization signal is synchronized in the image transmitter 8100 and the image receiver 8200, so that the image receiver 8200 can cause a display image according to captured image data transmitted after imaging performed by the image transmitter 8100 to be stably displayed.

Moreover, in the image transfer system 8 of the seventh embodiment, it is possible to reduce a processing load on the image transmitter 8100 as compared with a processing load on the image transmitter 7100 in the image transfer system 7 of the sixth embodiment by arranging the estimation unit 6114 provided in the image transmitter 7100 in the image transfer system 7 of the sixth embodiment in the image receiver 8200. In other words, in the image transfer system 8 of the seventh embodiment, it is possible to prevent a processing load related to the adjustment of the cycle or the phase of the display timing signal from being concentrated on the image transmitter 8100.

Also, in the configuration of the image transfer system 8 shown in FIG. 39, as in the configuration of the image transfer system 6 of the fifth embodiment shown in FIG. 30 or the configuration of the image transfer system 7 of the sixth embodiment shown in FIG. 36, a configuration in which the measurement unit 6113 is provided in the communication unit 8104 is shown, but the measurement unit 6113 may be arranged outside the communication unit 8104.

Eighth Embodiment

Hereinafter, an image transfer system according to an eighth embodiment of the present invention will be described. FIG. 40 is a block diagram showing a schematic configuration of the image transfer system according to the eighth embodiment of the present invention. An image transfer system 9 includes an image transmitter 9100 and an image receiver 9200. The image transmitter 9100 includes a synchronization signal generation unit 5101, an imaging unit 102, a data generation unit 103, a communication unit 9104, and an antenna 105. Also, the communication unit 9104 includes a measurement unit 6113. Also, the image receiver 9200 includes a communication unit 9201, a display unit 202, an estimation unit 6114, a synchronization signal generation unit 7205, a data selection unit 6116, and an antenna 207.

The image transfer system 9 has a configuration in which the estimation unit 6114 and the data selection unit 6116 provided in the image transmitter 7100 are arranged in the image receiver 7200 in the image transfer system 7 of the sixth embodiment shown in FIG. 36. The communication unit 7104 provided in the image transmitter 7100 is replaced with the communication unit 9104, and the communication unit 7201 provided in the image receiver 7200 is replaced with the communication unit 9201. Accordingly, in the image transfer system 9, the image transmitter 7100 constituting the image transfer system 7 of the sixth embodiment is replaced with the image transmitter 9100 and the image receiver 7200 is replaced with the image receiver 9200. In the following description, the components of the image transfer system 9 similar to those of the image transfer system 7 of the sixth embodiment are denoted by the same reference signs for description.

Similar to the image transfer system 7 of the sixth embodiment, the image transfer system 9 has a configuration in which the synchronization signal generation unit 7205 provided in the image receiver 9200 adjusts the cycle or the phase of the generated display timing signal in accordance with the adjustment instruction signal calculated by the estimation unit 6114 on the basis of the display timing signal (in particular, the display vertical synchronization signal) generated by the synchronization signal generation unit 7205. However, the image transfer system 9 has a configuration in which the estimation unit 6114 and the data selection unit 6116 are arranged in the image receiver 9200. Thus, the image transfer system 9 is different from the image transfer system 7 in the sixth embodiment in that a signal related to the adjustment of the cycle or the phase of the display timing signal transmitted by the communication unit 9104 provided in the image transmitter 9100 to the image receiver 9200 is information of a reception time of the display vertical synchronization signal associated with information of a display image data order measured by the measurement unit 6113 instead of the adjustment instruction signal TrA.

More specifically, in the image transfer system 9, the communication unit 9104 provided in the image transmitter 9100 transmits information of a reception time of the display vertical synchronization signal associated with information of a display image data order measured by a configuration of the measurement unit 6113 within the communication unit 9104 provided in the image transmitter 9100 to the image receiver 9200. Then, in the image transfer system 9, the data selection unit 6116 provided in the image receiver 9200 selects information of a reception time and a display image data order of a set of display vertical synchronization signals (display selection data) from information of reception times of a predetermined number of display vertical synchronization signals associated with information of display image data orders transmitted from the image transmitter 9100. Thereafter, in the image transfer system 9, the estimation unit 6114 provided in the image receiver 9200 estimates the cycle or the phase of the display vertical synchronization signal generated by the synchronization signal generation unit 7205 provided in the image receiver 9200 on the basis of the display selection data selected by the data selection unit 6116 and outputs an adjustment instruction signal calculated on the basis of the estimated cycle or phase of the display timing signal to the synchronization signal generation unit 7205. Thereby, the synchronization signal generation unit 7205 adjusts the cycle or the phase of the display timing signal to be generated in accordance with the adjustment instruction signal output from the estimation unit 6114.

Also, operations or processes of the components of the image transfer system 9 similar to those provided in the image transfer system 7 of the sixth embodiment denoted by the same reference signs are similar to those of the corresponding components. In other words, operations or processes of the components other than the communication unit 9104 provided in the image transmitter 9100 constituting the image transfer system 9 and operations or processes of the components other than the communication unit 9201 provided in the image receiver 9200 constituting the image transfer system 9 are similar to those of the corresponding components in the image transfer system 7 of the sixth embodiment. According in the description of the image transfer system 9, only operations or processes of components different from the image transfer system 7 of the sixth embodiment, i.e., the communication unit 9104 provided in the image transmitter 9100 and the communication unit 9201 provided in the image receiver 9200, will be described, and a detailed description of operations or processes of the other components will be omitted.

Similar to the communication unit 7104 provided in the image transmitter 7100 in the image transfer system 7 of the sixth embodiment, the communication unit 9104 transmits the transmission image data TrD including the captured image data for wireless transfer output from the data generation unit 103 to the image receiver 9200 via the antenna 105 for wireless communication. At this time, similar to the communication unit 7104, the communication unit 9104 may have a configuration in which the vertical synchronization signal generated by the synchronization signal generation unit 5101 is not transmitted to the image receiver 9200. Also, similar to the communication unit 7104, the communication unit 9104 receives a display timing signal TrV transmitted from the image receiver 9200 via the antenna 105, and outputs a display vertical synchronization signal included in the received display timing signal TrV to the measurement unit 6113 provided in the communication unit 9104. Also, similar to the communication unit 7104, the communication unit 9104 also outputs a connection establishment signal indicating that a wireless connection with the image receiver 9200 has been established to the measurement unit 6113.

Further, the communication unit 9104 transmits information of the reception time of the display vertical synchronization signal associated with information of the display image data order output from the measurement unit 6113, i.e., time order information TrTO for wirelessly transferring information for calculating an adjustment instruction signal for issuing an instruction for adjusting the cycle or the phase of the display vertical synchronization signal, to the image receiver 9200 via the antenna 105.

Similar to the communication unit 7201 provided in the image receiver 7200 in the image transfer system 7 of the sixth embodiment, the communication unit 9201 receives the transmission image data TrD transmitted from the image transmitter 9100 via the antenna 207. Then, the communication unit 9201 outputs captured image data included in the received transmission image data TrD to the display unit 202. Also, similar to the communication unit 7201, the communication unit 9201 transmits the display timing signal TrV for wirelessly transferring the display vertical synchronization signal output from the synchronization signal generation unit 7205 to the image transmitter 9100 via the antenna 207.

Further, the communication unit 9201 receives the time order information TrTO including the information of the reception time of the display vertical synchronization signal associated with the information of the display image data order transmitted from the image transmitter 9100 via the antenna 207 and outputs information of the display image data order included in the received time order information TrTO and the information of the reception time of the display vertical synchronization signal to the data selection unit 6116.

Thereby, in the image receiver 9200, the data selection unit 6116 selects display selection data from the information of the display image data order and the information of the reception time of the display vertical synchronization signal, and the estimation unit 6114 outputs an adjustment instruction signal calculated by estimating the cycle or the phase of the display vertical synchronization signal on the basis of the display selection data to the synchronization signal generation unit 7205.

According to such a configuration, in the image transfer system 9, as in the image transfer system 7 according to the sixth embodiment, the synchronization signal generation unit 7205 adjusts the cycle or the phase of the display timing signal to be generated in accordance with the adjustment instruction signal calculated by the estimation unit 6114 on the basis of the display timing signal (in particular, the display vertical synchronization signal) generated by the synchronization signal generation unit 7205.

Next, the operation of each component constituting the image transfer system 9 will be described. First, the operation of the communication unit 9104 provided in the image transmitter 9100 constituting the image transfer system 9 will be described.

A process in which the communication unit 9104 transmits the transmission image data TrD to the image receiver 9200 a process of receiving the display timing signal TrV transmitted from the image receiver 9200, and a process of transmitting information of a reception time of the display vertical synchronization signal associated with information of the display image data order output from the measurement unit 6113 as the time order information TrTO to the image receiver 9200 can be considered to be similar to those in the communication unit 7104 provided in the image transmitter 7100 in the image transfer system 7 of the sixth embodiment. In other words, the present embodiment can be easily conceived by replacing the process in which the communication unit 7104 transmits the adjustment instruction signal TrA to the image receiver 7200 with the process of transmitting the time older information TrTO to the image receiver 9200 in the communication unit 9104.

More specifically, the determination of step S70503 in the wireless transfer processing procedure in the communication unit 7104 shown in FIG. 37 is replaced with a determination of whether or not it is possible to transmit information of a reception time of the display vertical synchronization signal associated with information of the display image data order output from the measurement unit 6113 as the time order information TrTO to the image receiver 9200 (more specifically, the communication unit 9201 provided in the image receiver 9200) in the communication unit 9104. Also, the processing of step S70509 in the wireless transfer processing procedure in the communication unit 7104 shown in FIG. 37 is replaced with a process in which the communication unit 9104 transmits the time order information TrTO including the information of the reception time of the display vertical synchronization signal associated with the information of the display image data order output from the measurement unit 6113 to the communication unit 9201. Thereby, the communication unit 9104 can perform the transmission of the transmission image data TrD to the image receiver 9200, the reception of the display timing signal TrV transmitted from the image receiver 9200, and the transmission of the time order information TrTO to the image receiver 9200. Accordingly, a detailed description of the wireless transfer processing procedure in the communication unit 9104 will be omitted.

Next, the operation of the communication unit 9201 provided in the image receiver 9200 constituting the image transfer system 9 will be described.

A process in which the communication unit 9201 receives the transmission image data TrD transmitted from the image transmitter 9100, a process of transmitting the display timing signal TrV to the image transmitter 9100, and a process of receiving the time order information TrTO transmitted from the image transmitter 9100 can be considered to be similar to those in the communication unit 7201 provided in the image receiver 7200 in the image transfer system 7 of the sixth embodiment. In other words, the present embodiment can be easily conceived by replacing a process in which the communication unit 7201 receives the adjustment instruction signal TrA transmitted from the image transmitter 7100 with a processing of receiving the time order information TrTO transmitted from the image transmitter 9100 in the communication unit 9201.

More specifically, the determination of step S70603 in the wireless transfer processing procedure in the communication unit 7201 shown in FIG. 38 is replaced with the determination of whether or not it is possible to receive the time order information TrTO transmitted from the image transmitter 9100 (more specifically, the communication unit 9104 provided in the image transmitter 9100) in the communication unit 9201. Also, the processing of step S70609 in the wireless transfer processing procedure in the communication unit 7201 shown in FIG. 38 is replaced with a process in which the communication unit 9201 receives the time order information TrTO transmitted from the communication unit 9104 and outputs information of a reception time of each display vertical synchronization signal associated with information of the display image data order included in the received time order information TrTO to the data selection unit 6116. Thereby, the communication unit 9201 can perform the process of each of the reception of the transmission image data TrD transmitted from the image transmitter 9100, the transmission of the display tinting signal TrV to the image transmitter 9100, and the reception of the time order information TrTO transmitted from the image transmitter 9100. Accordingly, a detailed description of the wireless transfer processing procedure in the communication unit 9201 will be omitted.

In this manner, in the image transfer system 9, as in the image transfer system 7 of the sixth embodiment, the synchronization signal generation unit 7205 provided in the image receiver 9200 adjusts the cycle or the phase of the display timing signal for causing the liquid crystal display (not shown) connected to the display unit 202 to display a display image according to captured image data. In accordance with the adjustment instruction signal calculated on the basis of the display timing signal (particularly, the display vertical synchronization signal) generated by the synchronization signal generation unit 7205.

As described above, in the image transfer system 9 of the eighth embodiment, in the image transfer system 7 of the sixth embodiment, the cycle or the phase of the display vertical synchronization signal are estimated within the image transmitter 9100 on the basis of the display timing signal for causing the connected liquid crystal display (not shown) to display the display image according to the captured image data generated by the synchronization signal generation unit 7205 provided in the image receiver 9200. In the image transfer system 9 of the eighth embodiment, as in the image transfer system 7 of the sixth embodiment, the cycle or the phase of the display timing signal generated by the synchronization signal generation unit 7205 provided in the image receiver 9200 are adjusted on the basis of the estimated cycle or phase of the vertical synchronization signal. Thereby, in the image transfer system 9 of the eighth embodiment, as in the image transfer system 7 of the sixth embodiment, unnecessary timing adjustment of the vertical synchronization signal is not performed and the cycle or the phase of the vertical synchronization signal is synchronized in the image transmitter 9100 and the image receiver 9200, so that the image receiver 9200 can cause a display image according to captured image data transmitted after imaging performed by the image transmitter 9100 to be stably displayed.

Moreover, in the image transfer system 9 of the eighth embodiment, it is possible to reduce a processing load on the image transmitter 9100 as compared with a processing load on the image transmitter 7100 in the image transfer system 7 of the sixth embodiment by arranging the data selection unit 6116 and the estimation unit 6114 provided in the image transmitter 7100 in the image transfer system 7 of the sixth embodiment in the image receiver 9200. The image transfer system 9 of the eighth embodiment can reduce the processing load on the image transmitter 9100 as compared with the processing load on the image transmitter 8100 in the image transfer system 8 of the seventh embodiment. In other words, in the image transfer system 9 of the eighth embodiment, it is possible to prevent a processing load related to the adjustment of the cycle or the phase of the display timing signal from being concentrated on the image transmitter 9100.

Also, in the configuration of the image transfer system 9 shown in FIG. 40, as in the configuration of the image transfer system 6 of the fifth embodiment shown in FIG. 30, the configuration of the image transfer system 7 of the sixth embodiment shown in FIG. 36, and the configuration of the image transfer system 8 of the seventh embodiment shown in FIG. 39, a configuration in which the measurement unit 6113 is provided in the communication unit 9104 is show but the measurement unit 6113 may be arranged outside the communication unit 9104.

According to each embodiment of the present invention, there is provided an image transfer system (e.g., the image transfer system 1) having an image transmitter (e.g., the image transmitter 100) and an image receiver (e.g., the image receiver 200), wherein the image transmitter includes a communicator (e.g., the communication unit 104), an imager (e.g., the imaging unit 102), a synchronization signal generation function (e.g., a function of the synchronization signal generation unit 101), and one or more processors (which may be at least a processor for implementing a function of the data generation unit 103 and may be a processor for implementing functions of the imaging unit 102, the measurement unit 6113, the data selection unit 6116, and the estimation unit 6114), wherein the image receiver includes a communicator (e.g., the communication unit 201), a monitor (e.g., a liquid crystal display (not shown)), a synchronization signal generation function (e.g., a function of the synchronization signal generation unit 205), and one or more processors (which, may be at least a processor for implementing functions of the measurement unit 203, the data selection unit 206, and the estimation unit 204 and may be a processor for implementing functions of the display unit 202, the data selection unit 6116, and the estimation unit 6114), wherein the synchronization signal generation function of the image transmitter is configured to generate an imaging, synchronization signal (a vertical synchronization signal), wherein the one or more processors of the image transmitter cause the imager to perform new imaging every time the imaging synchronization signal is generated and cause communication data corresponding to captured image data output from the imager (captured image data for wireless transfer, i.e., transmission image data TrD) to be transmitted from the communicator of the image transmitter to the image receiver by radio waves, wherein the synchronization signal generation function of the image receiver is configured to generate a display synchronization signal (a display vertical synchronization signal), wherein the one or more processors of the image receiver is configured to generate a display image corresponding to the captured image data from the communication data (the transmission image data TrD) received by radio waves in the communicator of the image receiver and cause tare monitor to display a newly generated display image every time the display synchronization signal is generated, wherein the processor of one of the image transmitter and the image receiver causes specific communication data predetermined between the image transmitter and the image receiver to be transmitted from one of the communicator to the other by radio waves after the display synchronization signal is generated every time the imaging synchronization signal or the display synchronization signal is generated in the synchronization signal generation function of the one, wherein the processor of one of the image transmitter and the image receiver is configured to calculate a synchronization deviation time (a reception time) from a generation time-point of the imaging synchronization signal or the display synchronization signal to a reception time-point of the specific communication data for the communicator of the image transmitter or the image receiver with respect to each of the imaging synchronization signal or the display synchronization signal generated in the synchronization signal generation function of the image transmitter or the image receiver, wherein the processor of one of the image transmitter and the image receiver is configured to extract two pieces of the specific communication data from the specific communication data other than the specific communication data with a maximum synchronization deviation time, among a plurality of pieces of the specific communication data for which the synchronization deviation time is calculated (extracts a minimum reception time and a minimum change reception time in each embodiment), wherein the processor of one of the image transmitter and the image receiver is configured to calculate an adjustment value of a cycle of the imaging synchronization signal or the display synchronization signal (a cycle adjustment instruction signal γ) generated in the synchronization signal generation function of the one or the other on the basis of a generation time interval of the imaging synchronization signal or the display synchronization signal of the two extracted pieces of the specific communication data and a difference between synchronization deviation times corresponding to the two extracted pieces of the specific communication data, and wherein the processor of one of the image transmitter and the image receiver causes a communication packet for adjusting a cycle of the imaging synchronization signal or the display synchronization signal of the one or adjusting a cycle of the imaging synchronization signal or the display synchronization signal of the other on the basis of the adjustment value to be transmitted from the communicator of the one to the other by radio waves.

Also, according to each embodiment of the present invention, the image transfer system (e.g., the image transfer system 1) in which the processor which extracting the two pieces of the specific communication data is configured to extract the specific communication data with a minimum synchronization deviation time as one of the two pieces of the specific communication data (extracts a minimum reception time in each embodiment) is configured.

Also, according to each embodiment of the present invention, the image transfer system (e.g., the image transfer system 1) in which the processor which extracting the two pieces of the specific communication data is configured to extract the specific communication data having a minimum value obtained by dividing a difference between the synchronization deviation times by a frame interval in a relationship with the one extracted piece of the specific communication data as the other of the two extracted pieces of the specific communication data (extracts a minimum change reception time in each embodiment) is configured.

Also, according to each embodiment of the present invention, the image transfer system (e.g., the image transfer system 3) in which the specific communication data is one piece of communication data which satisfies a predetermined criterion (e.g., a reception time which does not exceed a predetermined time range from an immediately previous reception time in the second embodiment of the present invention) in communication data corresponding to the captured image data constituting one frame, the processor of the image transmitter causes the specific communication data to be transmitted from the communicator of the image transmitter to the image receiver, and the processor of the image receiver is configured to calculate the synchronization deviation time is configured.

Also, according to each embodiment of the present invention, the image transfer system (e.g., the image transfer system 6) in which the specific communication data is communication data (a display timing signal TrV in the fifth embodiment of the present invention) to be transmitted at a timing when the display synchronization signal has been generated, the processor of the image receiver causes the specific communication data to be transmitted from the communicator of the image receiver to the image transmitter, and the processor of the image transmitter is configured to calculate the synchronization deviation time is configured.

Also, according to each embodiment of the present invention the image transfer system (e.g., the image transfer system 1) in which the processor which calculates the adjustment value is configure to calculate the adjustment value of the cycle (a cycle adjustment instruction signal γ) on the basis of a value obtained by dividing the difference between the synchronization deviation times of the extracted two pieces of the specific communication data by a frame interval of the captured image data corresponding to the specific communication data is configured.

Also, according to each embodiment of the present invention, the image transfer system (e.g., the image transfer system 1) in which the processor which calculates the adjustment value of the cycle is configured to calculate an adjustment value of a phase (a phase adjustment instruction signal δ) on the basis of the synchronization deviation time of each of the two extracted pieces of the specific communication data and frame intervals of the two extracted pieces of the specific communication data is configured.

Also, according to each embodiment of the present invention, the image transfer system (e.g., the image transfer system 1) in which the processor which calculates the adjustment value of the cycle is configured to calculate the adjustment value of the phase (a phase adjustment instruction signal δ) on the basis of a result of multiplying by a weight value based on a frame interval of the captured image data corresponding to the specific communication data at a reception time-point of each of the two extracted pieces of the specific communication data and the frame intervals of the two extracted pieces of the specific communication data, and set a value greater than the weight value by which a larger synchronization deviation time of the synchronization deviation times of reception time-points of the two pieces of the specific communication data is multiplied as the weight value by which a smaller synchronization deviation time thereof is multiplied is configured.

Also, according to each embodiment of the present invention, there is provided an image receiver (e.g., the image receiver 200) for receiving communication data corresponding to captured image data output after imaging is newly performed every time an imaging synchronization signal is generated from an image transmitter (e.g., the image transmitter 100) by radio waves and displaying a display image corresponding to the captured image data, the image receiver including a communicator (e.g., the communication unit 201), a monitor (e.g., a liquid crystal display (not shown)), a synchronization signal generation function (e.g., a function of the synchronization signal generation unit 205), and one or more processors (which may be at least a processor for implementing functions of the measurement unit 203, the data selection unit 206, and the estimation unit 204 and may be a processor for implementing functions of the display unit 202, the data selection unit 6116, and the estimation unit 6114), wherein, the synchronization signal generation friction is configured to generate a display synchronization signal (a display vertical synchronization signal), and generate a display image corresponding to the captured image data from the communication data (transmission image data TrD) received by radio waves in the communicator, and cause the monitor to display a newly generated display image every time the display synchronization signal is generated, wherein, when one piece of communication data satisfying a predetermined criterion among pieces of communication data corresponding to the captured image data is defined as specific communication data, the one or more processors are configured to calculate a synchronization deviation time (a reception time) from a generation time-point of the display synchronization signal to a reception time-point of the specific communication data for the communicator with respect to each of the display synchronization signal generated in the synchronization signal generation function, extract two pieces of the specific communication data from the specific communication data other than the specific communication data with a maximum synchronization deviation time, among a plurality of pieces of the specific communication data for which the synchronization deviation time is calculated (extract a minimum reception time and a minimum change reception time in each embodiment), calculate an adjustment value of a cycle of the imaging synchronization signal or the display synchronization signal (a cycle adjustment instruction signal γ) on the basis of a generation time interval of the display synchronization signal of the two extracted pieces of the specific communication data and a difference between synchronization deviation times corresponding to the two extracted pieces of the specific communication data, and cause a communication packet for adjusting the cycle of the display synchronization signal or adjusting the cycle of the imaging synchronization signal to be transmitted from the communicator to the image transmitter by radio waves on the basis of the adjustment value.

Also, according to each embodiment of the present invention, there is provided an image transmitter (e.g., the image transmitter 100) for transmitting communication data corresponding to a display image to an image receiver (e.g., the image receiver 200) configured to display the display image newly generated every time a display synchronization signal is generated by radio waves, the image transmitter including a communicator (e.g., the communication unit 104), an imager (e.g., the imaging unit 102), a synchronization signal generation function (e.g., a function of the synchronization signal generation unit 101), and one or more processors (may be at least a processor for implementing a function of the data generation unit 103 and may be a processor for implementing the imaging unit 102, the measurement unit 6113, the data selection unit 6116, and the estimation unit 6114), wherein the synchronization signal generation function is configured to generate an imaging synchronization signal (a vertical synchronization signal), wherein the one or more processors cause the imager to perform new imaging every time the imaging synchronization signal is generated and cause communication data (transmission image data TrD) corresponding to captured image data output from the imager to be transmitted from the communicator to the image receiver by radio waves, and wherein, when communication data to be transmitted is defined as specific communication data at a timing when the display synchronization signal is generated by the image receiver, the one or more processors are configured to calculate a synchronization deviation time (a reception time) from a generation time-point of the imaging synchronization signal to a reception time-point of the specific communication data for the communicator with respect to each of the imaging synchronization signal generated in the synchronization signal generation function, extract two pieces of the specific communication data from the specific communication data other than the specific communication data with a maximum synchronization deviation time, among a plurality of pieces of the specific communication data for which the synchronization deviation time is calculated (extracts a minimum reception time and a minimum change reception time in each embodiment), calculate an adjustment value of a cycle of the imaging synchronization signal or the display synchronization signal (a cycle adjustment instruction signal γ) on the basis of a generation time interval of the imaging synchronization signal of the two extracted pieces of the specific communication data and a difference between synchronization deviation times corresponding to the two extracted pieces of the specific communication data, and cause a communication packet for adjusting the cycle of the imaging synchronization signal or adjusting the cycle of the display synchronization signal to be transmitted from the communicator to the image receiver by radio waves on the basis of the adjustment value.

Also, according to each embodiment of the present invention, there is provided an image transfer method for use in an image transfer system (e.g., the image transfer system having an image transmitter (e.g., the image transmitter 100) and an image receiver (e.g., the image receiver 200), the image transfer method including: generating, by a synchronization signal generation function of the image transmitter, an imaging synchronization signal (a vertical synchronization signal); causing, by one or more processors of the image transmitter, an imager of the image transmitter to perform new imaging every time the imaging synchronization signal is generated and causing communication data (transmission image data TrD) corresponding to captured image data output from the imager to be transmitted from a communicator of the image transmitter to the image receiver by radio waves; generating, by a synchronization signal generation function of the image receiver, a display synchronization signal (a display vertical synchronization signal); generating, by one or more processors of the image receiver, a display image corresponding to the captured image data from the communication data (the transmission image data TrD) received by radio waves in a communicator of the image receiver and causing a monitor of the image receiver to display a newly generated display image every time the display synchronization signal is generated; causing, by the processor of one of the image transmitter and the image receiver, specific communication data predetermined between the image transmitter and the image receiver to be transmitted from one of the communicator to the other by radio waves after the display synchronization signal is generated every time the imaging synchronization signal or the display synchronization signal is generated in the synchronization signal generation function of the one; calculating, by the processor of one of the image transmitter and the image receiver, a synchronization deviation time (a reception time) from a generation time-point of the imaging synchronization signal or the display synchronization signal to a reception time-point of the specific communication data for the communicator of the image transmitter or the image receiver with respect to each of the imaging synchronization signal or the display synchronization signal generated in the synchronization signal generation function of the image transmitter or the image receiver; extracting, by the processor of one of the image transmitter and the image receiver, two pieces of the specific communication data from the specific communication data other than the specific communication data with a maximum synchronization deviation time, among a plurality of pieces of the specific communication data for which the synchronization deviation time is calculated (extracting a minimum reception time and a minimum change reception time in each embodiment); calculating, by the processor of one of the image transmitter and the image receiver, an adjustment value of a cycle of the imaging synchronization signal or the display synchronization signal (a cycle adjustment instruction signal γ) generated in the synchronization signal generation function of the one or the other on the basis of a generation time interval of the imaging synchronization signal or the display synchronization signal of the two extracted pieces of the specific communication data and a difference between synchronization deviation times corresponding to the two extracted pieces of the specific communication data; and causing, by the processor of one of the image transmitter and the image receiver, a communication packet for adjusting a cycle of the imaging synchronization signal or the display synchronization signal of the one or adjusting a cycle of the imaging synchronization signal or the display synchronization signal of the other on the basis of the adjustment value to be transmitted from the communicator of the one to the other by radio waves.

Also, according to each embodiment of the present invention, there is provided an image reception method for use in an image receiver (e.g., the image receiver 200) for receiving communication data corresponding to captured image data output after imaging is newly performed every time an imaging synchronization signal is generated from an image transmitter (e.g., the image transmitter 100) by radio waves and displaying a display image corresponding to the captured image data, the image reception method including: generating, by a synchronization signal generation function, a display synchronization signal (a display vertical synchronization signal); generating, by the synchronization signal generation function, a display image corresponding to the captured image data from the communication data (transmission image data TrD) received by radio waves in a communicator, and causing a monitor to display a newly generated display image every time the display synchronization signal is generated; calculating, by the one or more processors, a synchronization deviation time (a reception time) from a generation time-point of the display synchronization signal to a reception time-point of the specific communication data for the communicator with respect to each of the display synchronization signal generated in the synchronization signal generation function, when one piece of communication data satisfying a predetermined criterion among pieces of communication data corresponding to the captured image data is defined as specific communication data; extracting, by the one or more processors, two pieces of the specific communication data from the specific communication data other than the specific communication data with a maximum synchronization deviation time, among a plurality of pieces of the specific communication data for which the synchronization deviation time is calculated (extracting a minimum reception time and a minimum change reception time in each embodiment); calculating, by the one or more processors, an adjustment value of a cycle of the imaging synchronization signal or the display synchronization signal (a cycle adjustment instruction signal γ) on the basis of a generation time interval of the display synchronization signal of the two extracted pieces of the specific communication data and a difference between synchronization deviation times corresponding to the two extracted pieces of the specific communication data; and causing, by the one or more processors, a communication packet for adjusting the cycle of the display synchronization signal or adjusting the cycle of the imaging synchronization signal to be transmitted from the communicator to the image transmitter by radio waves on the basis of the adjustment value.

Also, according to each embodiment of the present invention, there is provided a program for causing a computer to execute an image reception method for use in an the image receiver (e.g. the image receiver 200) for receiving communication data corresponding to captured image data output after imaging is newly performed every time an imaging synchronization signal is generated from an image transmitter (e.g., the image transmitter 100) by radio waves and displaying a display image corresponding to the captured image data, the program including: generating, by a synchronization signal generation function, a display synchronization signal (a display vertical synchronization signal); generating, by the synchronization signal generation function, a display image corresponding to the captured image data from the communication data (transmission image data TrD) received by radio waves in a communicator, and causing a monitor to display a newly generated display image every time the display synchronization signal is generated; calculating, by the one or more processors, a synchronization deviation time (a reception time) from a generation time-point of the display synchronization signal to a reception time-point of the specific communication data for the communicator with respect to each of the display synchronization signal generated in the synchronization signal generation function, when one piece of communication data satisfying a predetermined criterion among pieces of communication data corresponding to the captured image data is defined as specific communication data; extracting, by the one or more processors, two pieces of the specific communication data from the specific communication data other than the specific communication data with a maximum synchronization deviation time, among a plurality of pieces of the specific communication data for which the synchronization deviation time is calculated (extracting a minimum reception time and a minimum change reception time in each embodiment); calculating, by the one or more processors, an adjustment value of a cycle of the imaging synchronization signal or the display synchronization signal (a cycle adjustment instruction signal γ) on the basis of a generation time interval of the display synchronization signal of the two extracted pieces of the specific communication data and a difference between synchronization deviation times corresponding to the two extracted pieces of the specific communication data; and causing, by the one or more processors, a communication packet for adjusting the cycle of the display synchronization signal or adjusting the cycle of the imaging synchronization signal to be transmitted from the communicator to the image transmitter by radio waves on the basis of the adjustment value.

Also, according to each embodiment of the present invention, there is provided an image transmission method for use in an image transmitter (e.g., the image transmitter 100) for transmitting communication data corresponding to a display image to an image receiver (e.g., the image receiver 200) configured to display the display image newly generated every time a display synchronization signal is generated by radio waves, the image transmission method including: generating, by a synchronization signal generation function, an imaging synchronization signal (a vertical synchronization signal); causing, by one or more processors, an imager to perform new imaging every time the imaging synchronization signal is generated and causing communication data (transmission image data TrD) corresponding to captured image data output from the imager to be transmitted from a communicator to the image receiver by radio waves; calculating, by the one or more processors, a synchronization deviation time (a reception time) from a generation time-point of the imaging synchronization signal to a reception time-point of the specific communication data for the communicator of the image receiver with respect to each of the imaging synchronization signal generated in the synchronization signal generation function, when communication data to be transmitted is defined as specific communication data at a timing when the display synchronization signal is generated by the image receiver; extracting, by the one or more processors, two pieces of the specific communication data from the specific communication data other than the specific communication data with a maximum synchronization deviation time, among a plurality of pieces of the specific communication data for which the synchronization deviation time is calculated (extracting a minimum reception time and a minimum change reception time in each embodiment); calculating, by the one or more processors, an adjustment value of a cycle of the imaging synchronization signal or the display synchronization signal (a cycle adjustment instruction signal γ) on the basis of a generation time interval of the imaging synchronization signal of the two extracted pieces of the specific communication data and a difference between synchronization deviation times corresponding to the two extracted pieces of the specific communication data, and causing, by the one or more processors, a communication packet for adjusting a cycle of the imaging synchronization signal or adjusting a cycle of the display synchronization signal to be transmitted from the communicator to the image receiver by radio waves on the basis of the adjustment value.

Also, according to each embodiment of the present invention, there is provided a program for causing a computer to execute an image transmission method for use in an image transmitter (e.g., the image transmitter 100) for transmitting communication data corresponding to a display image to an image receiver (e.g., the image receiver 200) configured to display the display image newly generated every time a display synchronization signal is generated by radio waves, the program including: generating, by a synchronization signal generation function an imaging synchronization signal (a vertical synchronization signal); causing, by one or more processors, an imager to perform new imaging every time the imaging synchronization signal is generated and causing communication data (transmission image data TrD) corresponding to captured image data output from the imager to be transmitted from a communicator to the image receiver by radio waves; calculating, by the one or more processors, a synchronization deviation time (a reception time) from a generation time-point of the imaging synchronization signal to a reception time-point of the specific communication data for the communicator of the image receiver with respect to each of the imaging synchronization signal generated in the synchronization signal generation function, when communication data to be transmitted is defined as specific communication data at a timing when the display synchronization signal is generated by the image receiver; extracting, by the one or more processors, two pieces of the specific communication data from the specific communication data other than the specific communication data with a maximum synchronization deviation time, among a plurality of pieces of the specific communication data for which the synchronization deviation time is calculated (extracting a minimum reception time and a minimum change reception time in each embodiment); calculating, by the one or more processors, an adjustment value of a cycle of the imaging synchronization signal or the display synchronization signal (a cycle adjustment instruction signal γ) on the basis of a generation time interval of the imaging synchronization signal of the two extracted pieces of the specific communication data and a difference between synchronization deviation times corresponding to the two extracted pieces of the specific communication data, and causing, by the one or more processors, a communication packet for adjusting a cycle of the imaging synchronization signal or adjusting a cycle of the display synchronization signal to be transmitted from the communicator to the image receiver by radio waves on the basis of the adjustment value.

As described above, according to each embodiment of the present invention, there is provided an image transfer system for wirelessly transferring captured image data between an image transmitter and an image receiver, wherein reception times and orders of a vertical synchronization signal for imaging or display are measured and information of a minimum reception time and a minimum change reception time are selected from among a predetermined number of pieces of information indicating the measured reception times and orders (a predetermined number of pieces of information in which reception times and orders are associated). In each embodiment of the present embodiment, the selected information of the minimum reception time and the minimum change reception time is represented on a time axis having a reference time as the origin and connected by a straight line, and a cycle and a phase of the vertical synchronization signal are estimated on the basis of a slope and an intercept of the straight line. Thereafter, in each embodiment of the present invention, the cycle or the phase of the vertical synchronization signal is adjusted in accordance with the adjustment instruction signal calculated on the basis of the estimated cycle and phase. Thereby, in each embodiment of the present invention, cycles or phases of the vertical synchronization signal for imaging and the vertical synchronization signal for display are synchronized without performing unnecessary timing adjustment of the vertical synchronization signal by sensitively reacting to a sudden change in an arrival time of the captured image data in wireless transfer between the image transmitter and the image receiver, so that the image receiver can stably display an image according to the captured image data included in the transmission image data transmitted after imaging of the image transmitter.

In each embodiment of the present invention, as an example of the predetermined number when the minimum reception time and the minimum change reception time are selected, a case in which reception times of vertical synchronization signals corresponding to two frames of the minimum reception time and the minimum change reception time are selected from reception times of vertical synchronization signals corresponding to five frames has been described. However, the minimum reception time and the minimum change reception time can be selected if there are reception times of vertical synchronization signals corresponding to at least three frames. This is because it can be said that vertical synchronization signals corresponding to two frames of the minimum reception time and the minimum change reception time can be selected if the vertical synchronization signal corresponding to at least one frame whose reception time is greatest is excluded (not selected). However, it is desirable to select the predetermined number (the number of frames) when the minimum reception time and the minimum change reception time are selected from among reception times of vertical synchronization signals corresponding to many frames within an allowable range such as, for example, 10 frames. This is because it is considered that the slope of the straight line connecting the selected information of the minimum reception time and the selected information of the minimum change reception time then becomes gentle, i.e., the deviation of the cycle decreases.

Also, in each embodiment of the present invention, a selection method of selecting information of a minimum reception time and a minimum change reception time of one set (selection data in each embodiment of the present invention) by selecting a reception time of a vertical synchronization signal corresponding to a first frame as a minimum reception time from a predetermined number of pieces of information indicating measured reception times and orders and sequentially calculating time differences between the minimum reception time and reception times of vertical synchronization signals corresponding to second and subsequent frames to select the minimum change reception time has been described. However, the method of selecting the minimum reception time and the minimum change reception time is not limited to the method described in each embodiment of the present invention. For example, all periods between reception times of the vertical synchronization signals corresponding to the frames may be calculated, and the reception times of the vertical synchronization signals corresponding to the two frames with a smallest time difference may be selected as the minimum reception time and the minimum change reception time. More specifically, for example, when selection from among five frames is performed, by calculating time differences between a first frame and second to fifth frames, time differences between the second frame and the third to fifth frames, time differences between the third frame and the fourth and fifth frames, and a time difference between the fourth frame and the fifth frame, the reception times of the vertical synchronization signals corresponding to the two frames with a smallest time difference may be selected as the minimum reception time and the minimum change reception time.

In each embodiment of the present embodiment, a case in which the selected information of the minimum reception time and the minimum change reception time is represented on a time axis having a reference time as the origin and connected by a straight line, and a cycle and a phase of the vertical synchronization signal are estimated on the basis of a slope and an intercept of the straight line has been described. However, the straight line is not limited to a straight line determined according to the method shown in each embodiment of the present invention, i.e., a straight line connecting the selected information of the minimum reception time and the minimum change reception time. For example, a straight line passing between the selected minimum reception time and minimum change reception time may be a straight line for estimating the cycle and the phase of the vertical synchronization signal. In other words, a straight line representing an average of the selected minimum reception time and minimum change reception time may be used as a straight line for estimating the cycle and the phase of the vertical synchronization signal.

Also, in each embodiment of the present invention, a case in which the reception time of the vertical synchronization signal corresponding to the first frame is selected as the minimum reception time has been described. However, the minimum reception time is not limited to the reception time of the vertical synchronization signal corresponding to the first frame as shown in each embodiment of the present invention. This is because the first frame does not necessarily have a small delay in wireless transfer. If the delay of the first frame is larger than the normally assumed delay, the value of the slope of the straight line becomes a negative value. In this case, a reception time which is smallest among reception times for which a slope value of the straight line is a positive value may be selected as the minimum reception time.

Also, for example, the above-described various processes related to the image transfer system 1 of the present embodiment or the synchronization signal generation unit 101 or the data generation unit 103 provided in the image transmitter 100, the synchronization signal generation unit 205, the measurement unit 203, the data selection unit 206, or the estimation unit 204 provided in the image receiver 200 may be performed by recording a program for implementing a process of the image transfer system 1 shown in FIG. 2 or a part thereof, for example, the synchronization signal generation unit 101 or the data generation unit 103 provided in the image transmitter 100, the synchronization signal generation unit 205, the measurement unit 203, the data selection unit 206, or the estimation unit 204 provided in the image receiver 200 on a computer-readable recording medium and causing a computer system to read and execute the program recorded on the recording medium. Also, the "computer system" described here may include an operating system (OS) and hardware such as peripheral devices. Also, the "computer system" is assumed to include a homepage providing environment (or displaying environment) when a World Wide Web (WWW) system is used. Also, the "computer-readable recording medium" refers to a storage device including a flexible disk, a magneto-optical disc, a read only memory (ROM), a writeable non-volatile memory such as a flash memory, a portable medium such as a compact disc (CD)-ROM, and a hard disk embedded in the computer system.

Furthermore, the "computer-readable recording medium" is assumed to include a medium that holds a program for a fixed period of time, such as a volatile memory (for example, a dynamic random access memory (DRAM)) inside a computer system serving as a server or a client when the program is transmitted via a network such as the Internet or a communication circuit such as a telephone circuit. Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit. Also, the above-described program may be a program for implementing some of the above-described functions. Further, the above-described program may be a program capable of implementing the above-described functions in combination with a program already recorded on the computer system, i.e., a so-called differential file (differential program).

While preferred embodiments of the present invention have been described and shown above, the present invention is not limited to the embodiments and modified examples thereof. Within a range not departing from the gist or spirit of the present invention, additions, omissions, substitutions, and other modifications to the configuration can be made.

Also, the present invention is not to be considered as being limited by the foregoing description, and is limited only by the scope of the appended claims.

What is claimed is:

1. An image transfer system having an image transmitter and an image receiver,
    wherein the image transmitter includes a communicator, an imager, a synchronization signal generation function, and one or more processors,
    wherein the image receiver includes a communicator, a monitor, a synchronization signal generation function, and one or more processors,
    wherein the synchronization signal generation function of the image transmitter is configured to generate an imaging synchronization signal,
    wherein the one or more processors of the image transmitter cause the imager to perform new imaging every time the imaging synchronization signal is generated and cause communication data corresponding to captured image data output from the imager to be transmitted from the communicator of the image transmitter to the image receiver by radio waves,
    wherein the synchronization signal generation function of the image receiver is configured to generate a display synchronization signal,
    wherein the one or more processors of the image receiver is configured to generate a display image corresponding to the captured image data from the communication data received by radio waves in the communicator of the image receiver and cause the monitor to display a newly generated display image every time the display synchronization signal is generated,
    wherein the processor of one of the image transmitter and the image receiver causes specific communication data predetermined between the image transmitter and the image receiver to be transmitted from one of the communicator to the other communicator by radio waves after the display synchronization signal is generated every time the imaging synchronization signal or the display synchronization signal is generated in the synchronization signal generation function of the one communicator,
    wherein the processor of one of the image transmitter and the image receiver is configured to calculate a synchronization deviation time from a generation time-point of the imaging synchronization signal or the display synchronization signal to a reception time-point of the specific communication data for the communicator of the image transmitter or the image receiver with respect to each of the imaging synchronization signal or the display synchronization signal generated in the synchronization signal generation function of the image transmitter or the image receiver,
    wherein the processor of one of the image transmitter and the image receiver is configured to extract two pieces of the specific communication data from the specific communication data other than the specific communication data with a maximum synchronization deviation time, among a plurality of pieces of the specific communication data for which the synchronization deviation time is calculated,
    wherein the processor of one of the image transmitter and the image receiver is configured to calculate an adjustment value of a cycle of the imaging synchronization signal or the display synchronization signal generated in the synchronization signal generation function of the one communicator or the other communicator on the basis of a generation time interval of the imaging synchronization signal or the display synchronization signal of the two extracted pieces of the specific communication data and a difference between synchronization deviation times corresponding to the two extracted pieces of the specific communication data, and
    wherein the processor of one of the image transmitter and the image receiver causes a communication packet for adjusting a cycle of the imaging synchronization signal or the display synchronization signal of the one communicator or adjusting a cycle of the imaging synchronization signal or the display synchronization signal of the other communicator on the basis of the adjustment value to be transmitted from the communicator of the one communicator to the other communicator by radio waves.

2. The image transfer system according to claim 1, wherein the processor which extracting the two pieces of the specific communication data is configured to extract the specific communication data with a minimum synchronization deviation time as one of the two pieces of the specific communication data.

3. The image transfer system according to claim 2, wherein the processor which extracting the two pieces of the specific communication data is configured to extract the specific communication data having a minimum value obtained by dividing a difference between the synchronization deviation times by a frame interval in a relationship with the one extracted piece of the specific communication data as the other of the two extracted pieces of the specific communication data.

4. The image transfer system according to claim 1, wherein the specific communication data is one piece of communication data which satisfies a predetermined criterion in communication data corresponding to the captured image data constituting one frame, wherein the processor of the image transmitter causes the specific communication data to be transmitted from the communicator of the image transmitter to the image receiver, and wherein the processor of the image receiver is configured to calculate the synchronization deviation time.

5. The image transfer system according to claim 1, wherein the specific communication data is communication data to be transmitted at a timing when the display synchronization signal has been generated, wherein the processor of the image receiver causes the specific communication data to be transmitted from the communicator of the image receiver to the image transmitter, and wherein the processor of the image transmitter is configured to calculate the synchronization deviation time.

6. The image transfer system according to claim 1, wherein the processor which calculates the adjustment value is configured to calculate the adjustment value of the cycle on the basis of a value obtained by dividing the difference between the synchronization deviation times of the extracted two pieces of the specific communication data by a frame interval of the captured image data corresponding to the specific communication data.

7. The image transfer system according to claim 6, wherein the processor which calculates the adjustment value of the cycle is configured to calculate an adjustment value of a phase on the basis of the synchronization deviation time of each of the two extracted pieces of the specific communication data and frame intervals of the two extracted pieces of the specific communication data.

8. The image transfer system according to claim 7, wherein the processor which calculates the adjustment value of the cycle is configured to calculate the adjustment value of the phase on the basis of a result of multiplying by a weight value based on a frame interval of the captured image data corresponding to the specific communication data at a reception time-point of each of the two extracted pieces of the specific communication data and the frame intervals of the two extracted pieces of the specific communication data, and set a value greater than the weight value by which a larger synchronization deviation time of the synchronization deviation times of reception time-points of the two pieces of the specific communication data is multiplied as the weight value by which a smaller synchronization deviation time thereof is multiplied.

9. An image receiver for receiving communication data corresponding to captured image data output after imaging is newly performed every time an imaging synchronization signal is generated from an image transmitter by radio waves and displaying a display image corresponding to the captured image data,
wherein the image receiver comprising a communicator, a monitor, a synchronization signal generation function, and one or more processors,
wherein the synchronization signal generation function is configured to generate a display synchronization signal, and
generate a display image corresponding to the captured image data from the communication data received by radio waves in the communicator, and cause the monitor to display a newly generated display image every time the display synchronization signal is generated,
wherein, when one piece of communication data satisfying a predetermined criterion among pieces of communication data corresponding to the captured image data is defined as specific communication data, the one or more processors are configured to
calculate a synchronization deviation time from a generation time-point of the display synchronization signal to a reception time-point of the specific communication data for the communicator with respect to each of the display synchronization signal generated in the synchronization signal generation function,
extract two pieces of the specific communication data from the specific communication data other than the specific communication data with a maximum synchronization deviation time, among a plurality of pieces of the specific communication data for which the synchronization deviation time is calculated,
calculate an adjustment value of a cycle of the imaging synchronization signal or the display synchronization signal on the basis of a generation time interval of the display synchronization signal of the two extracted pieces of the specific communication data and a difference between synchronization deviation times corresponding to the two extracted pieces of the specific communication data, and
cause a communication packet for adjusting the cycle of the display synchronization signal or adjusting the cycle of the imaging synchronization signal to be transmitted from the communicator to the image transmitter by radio waves on the basis of the adjustment value.

10. An image transmitter for transmitting communication data corresponding to a display image to an image receiver configured to display the display image newly generated every time a display synchronization signal is generated by radio waves, wherein the image transmitter comprising a communicator, an imager, a synchronization signal generation function, and one or more processors, wherein the synchronization signal generation function is configured to generate an imaging synchronization signal, wherein the one or more processors cause the imager to perform new imaging every time the imaging synchronization signal is generated and cause communication data corresponding to captured image data output from the imager to be transmitted from the communicator to the image receiver by radio waves, and wherein, when communication data to be transmitted is defined as specific communication data at a timing when the display synchronization signal is generated by the image receiver, the one or more processors are configured to calculate a synchronization deviation time from a generation time-point of the imaging synchronization signal to a reception time-point of the specific communication data for the communicator with respect to each of the imaging synchronization signal generated in the synchronization signal generation function, extract two pieces of the specific communication data from the specific communication data other than the specific communication data with a maximum synchronization deviation time, among a plurality of pieces of the specific communication data for which the synchronization deviation time is calculated, calculate an adjustment value of a cycle of the imaging synchronization signal or the display synchronization signal on the basis of a generation time interval of the imaging synchronization signal of the two extracted pieces of the specific communication data and a difference between synchronization deviation times corresponding to the two extracted pieces of the specific communication data, and cause a communication packet for adjusting the cycle of the imaging synchronization signal or adjusting the cycle of the display synchronization signal to be transmitted from the communicator to the image receiver by radio waves on the basis of the adjustment value.

11. An image transfer method for use in an image transfer system having an image transmitter and an image receiver, the image transfer method comprising:

generating, by a synchronization signal generation function of the image transmitter, an imaging synchronization signal;

causing, by one or more processors of the image transmitter, an imager of the image transmitter to perform new imaging every time the imaging synchronization signal is generated and causing communication data corresponding to captured image data output from the imager to be transmitted from a communicator of the image transmitter to the image receiver by radio waves;

generating, by a synchronization signal generation function of the image receiver, a display synchronization signal;

generating, by one or more processors of the image receiver, a display image corresponding to the captured image data from the communication data received by radio waves in a communicator of the image receiver and causing a monitor of the image receiver to display a newly generated display image every time the display synchronization signal is generated;

causing, by the processor of one of the image transmitter and the image receiver, specific communication data predetermined between the image transmitter and the image receiver to be transmitted from one of the communicator to the other communicator by radio waves after the display synchronization signal is generated every time the imaging synchronization signal or the display synchronization signal is generated in the synchronization signal generation function of the one communicator;

calculating, by the processor of one of the image transmitter and the image receiver, a synchronization deviation time from a generation time-point of the imaging synchronization signal or the display synchronization signal to a reception time-point of the specific communication data for the communicator of the image transmitter or the image receiver with respect to each of the imaging synchronization signal or the display synchronization signal generated in the synchronization signal generation function of the image transmitter or the image receiver;

extracting, by the processor of one of the image transmitter and the image receiver, two pieces of the specific communication data from the specific communication data other than the specific communication data with a maximum synchronization deviation time, among a plurality of pieces of the specific communication data for which the synchronization deviation time is calculated;

calculating, by the processor of one of the image transmitter and the image receiver, an adjustment value of a cycle of the imaging synchronization signal or the display synchronization signal generated in the synchronization signal generation function of the one communicator or the other communicator on the basis of a generation time interval of the imaging synchronization signal or the display synchronization signal of the two extracted pieces of the specific communication data and a difference between synchronization deviation times corresponding to the two extracted pieces of the specific communication data; and causing, by the processor of one of the image transmitter and the image receiver, a communication packet for adjusting a cycle of the imaging synchronization signal or the display synchronization signal of the one communicator or adjusting a cycle of the imaging synchronization signal or the display synchronization signal of the other communicator on the basis of the adjustment value to be transmitted from the communicator of the one communicator to the other communicator by radio waves.

12. An image reception method for use in an image receiver for receiving communication data corresponding to captured image data output after imaging is newly performed every time an imaging synchronization signal is generated from an image transmitter by radio waves and displaying a display image corresponding to the captured image data, the image reception method comprising:

generating, by a synchronization signal generation function, a display synchronization signal;

generating, by the synchronization signal generation function, a display image corresponding to the captured image data from the communication data received by radio waves in a communicator, and causing a monitor to display a newly generated display image every time the display synchronization signal is generated;

calculating, by the one or more processors, a synchronization deviation time from a generation time-point of the display synchronization signal to a reception time-point of the specific communication data for the communicator with respect to each of the display synchronization signal generated in the synchronization signal generation function, when one piece of communication data satisfying a predetermined criterion among pieces of communication data corresponding to the captured image data is defined as specific communication data;

extracting, by the one or more processors, two pieces of the specific communication data from the specific communication data other than the specific communication data with a maximum synchronization deviation time, among a plurality of pieces of the specific communication data for which the synchronization deviation time is calculated;

calculating, by the one or more processors, an adjustment value of a cycle of the imaging synchronization signal or the display synchronization signal on the basis of a generation time interval of the display synchronization signal of the two extracted pieces of the specific communication data and a difference between synchronization deviation times corresponding to the two extracted pieces of the specific communication data; and causing, by the one or more processors, a communication packet for adjusting the cycle of the display synchronization signal or adjusting the cycle of the imaging synchronization signal to be transmitted from the communicator to the image transmitter by radio waves on the basis of the adjustment value.

13. A non-transitory computer readable medium having stored thereon a program for causing a computer to execute an image reception method for use in an image receiver for receiving communication data corresponding to captured image data output after imaging is newly performed every time an imaging synchronization signal is generated from an image transmitter by radio waves and displaying a display image corresponding to the captured image data, the program comprising:

generating, by a synchronization signal generation function, a display synchronization signal;

generating, by the synchronization signal generation function, a display image corresponding to the captured image data from the communication data received by radio waves in a communicator, and causing a monitor to display a newly generated display image every time the display synchronization signal is generated;

calculating, by the one or more processors, a synchronization deviation time from a generation time-point of the display synchronization signal to a reception time-point of the specific communication data for the communicator with respect to each of the display synchronization signal generated in the synchronization signal generation function, when one piece of communication data satisfying a predetermined criterion among pieces of communication data corresponding to the captured image data is defined as specific communication data;

extracting, by the one or more processors, two pieces of the specific communication data from the specific communication data other than the specific communication data with a maximum synchronization deviation time, among a plurality of pieces of the specific communication data for which the synchronization deviation time is calculated;

calculating, by the one or more processors, an adjustment value of a cycle of the imaging synchronization signal or the display synchronization signal on the basis of a generation time interval of the display synchronization signal of the two extracted pieces of the specific communication data and a difference between synchronization deviation times corresponding to the two extracted pieces of the specific communication data; and causing, by the one or more processors, a communication packet for adjusting the cycle of the display synchronization signal or adjusting the cycle of the imaging synchronization signal to be transmitted from the communicator to the image transmitter by radio waves on the basis of the adjustment value.

14. An image transmission method for use in an image transmitter for transmitting communication data corresponding to a display image to an image receiver configured to display the display image newly generated every time a display synchronization signal is generated by radio waves, the image transmission method comprising:

generating, by a synchronization signal generation function, an imaging synchronization signal;

causing, by one or more processors, an imager to perform new imaging every time the imaging synchronization signal is generated and causing communication data corresponding to captured image data output from the imager to be transmitted from a communicator to the image receiver by radio waves;

calculating, by the one or more processors, a synchronization deviation time from a generation time-point of the imaging synchronization signal to a reception time-point of the specific communication data for the communicator of the image receiver with respect to each of the imaging synchronization signal generated in the synchronization signal generation function, when communication data to be transmitted is defined as specific communication data at a timing when the display synchronization signal is generated by the image receiver;

extracting, by the one or more processors, two pieces of the specific communication data from the specific communication data other than the specific communication data with a maximum synchronization deviation time, among a plurality of pieces of the specific communication data for which the synchronization deviation time is calculated;

calculating, by the one or more processors, an adjustment value of a cycle of the imaging synchronization signal or the display synchronization signal on the basis of a generation time interval of the imaging synchronization signal of the two extracted pieces of the specific communication data and a difference between synchronization deviation times corresponding to the two extracted pieces of the specific communication data, and causing, by the one or more processors, a communication packet for adjusting a cycle of the imaging synchronization signal or adjusting a cycle of the display synchronization signal to be transmitted from the communicator to the image receiver by radio waves on the basis of the adjustment value.

15. A non-transitory computer readable medium having stored thereon a program for causing a computer to execute an image transmission method for use in an image transmitter for transmitting communication data corresponding to a display image to an image receiver configured to display the display image newly generated every time a display synchronization signal is generated by radio waves, the program comprising:

generating, by a synchronization signal generation function, an imaging synchronization signal;

causing, by one or more processors, an imager to perform new imaging every time the imaging synchronization signal is generated and causing communication data corresponding to captured image data output from the imager to be transmitted from a communicator to the image receiver by radio waves;

calculating, by the one or more processors, a synchronization deviation time from a generation time-point of the imaging synchronization signal to a reception time-point of the specific communication data for the communicator of the image receiver with respect to each of the imaging synchronization signal generated in the synchronization signal generation function, when communication data to be transmitted is defined as specific communication data at a timing when the display synchronization signal is generated by the image receiver;

extracting, by the one or more processors, two pieces of the specific communication data from the specific communication data other than the specific communication data with a maximum synchronization deviation time, among a plurality of pieces of the specific communication data for which the synchronization deviation time is calculated;

calculating, by the one or more processors, an adjustment value of a cycle of the imaging synchronization signal or the display synchronization signal on the basis of a generation time interval of the imaging synchronization signal of the two extracted pieces of the specific communication data and a difference between synchronization deviation times corresponding to the two extracted pieces of the specific communication data, and causing, by the one or more processors, a communication packet for adjusting a cycle of the imaging synchronization signal or adjusting a cycle of the display synchronization signal to be transmitted from the communicator to the image receiver by radio waves on the basis of the adjustment value.

\* \* \* \* \*